July 1, 1941.   J. D. LEWIS ET AL   2,247,955
ELEVATOR CONTROL SYSTEM
Filed June 5, 1940   24 Sheets-Sheet 8
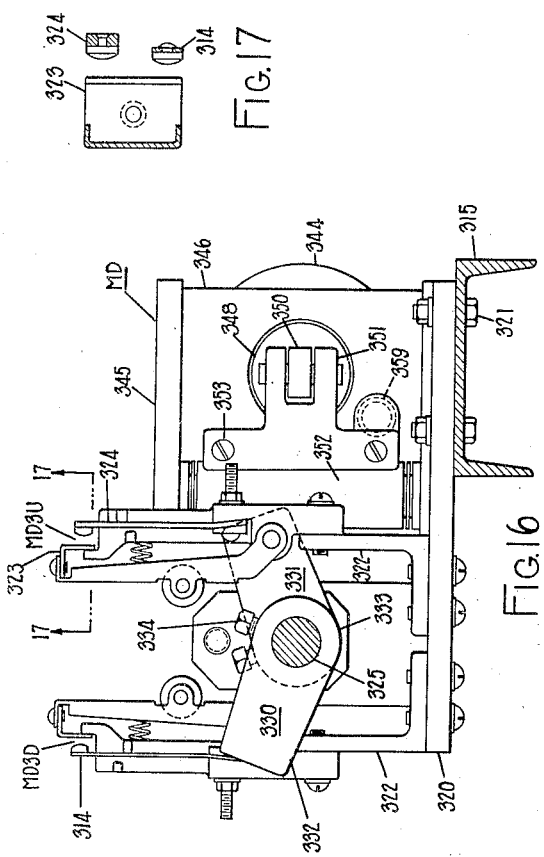
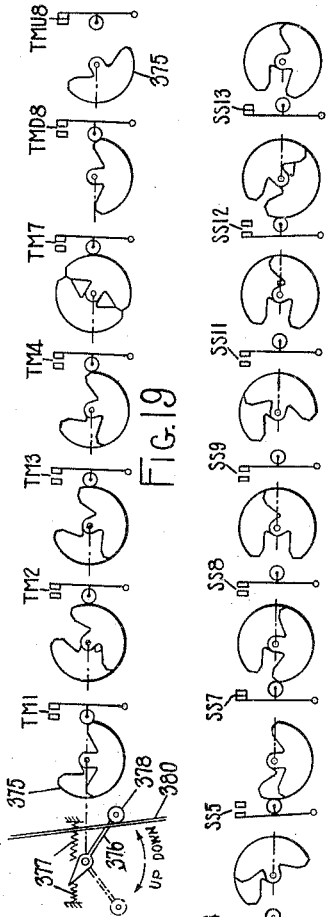
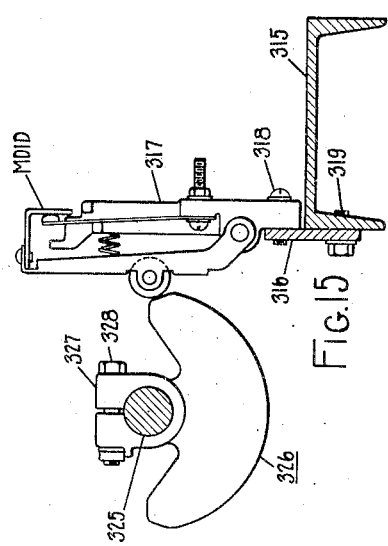
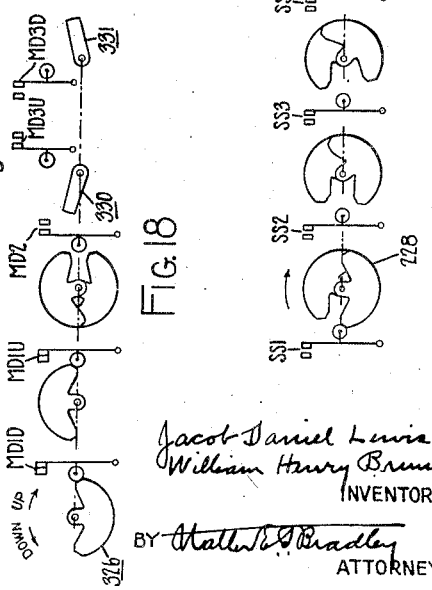
Jacob Daniel Lewis
William Henry Bruns
INVENTORS
BY Mathew T. S. Bradley
ATTORNEY July 1, 1941.  J. D. LEWIS ET AL  2,247,955
ELEVATOR CONTROL SYSTEM
Filed June 5, 1940  24 Sheets-Sheet 9
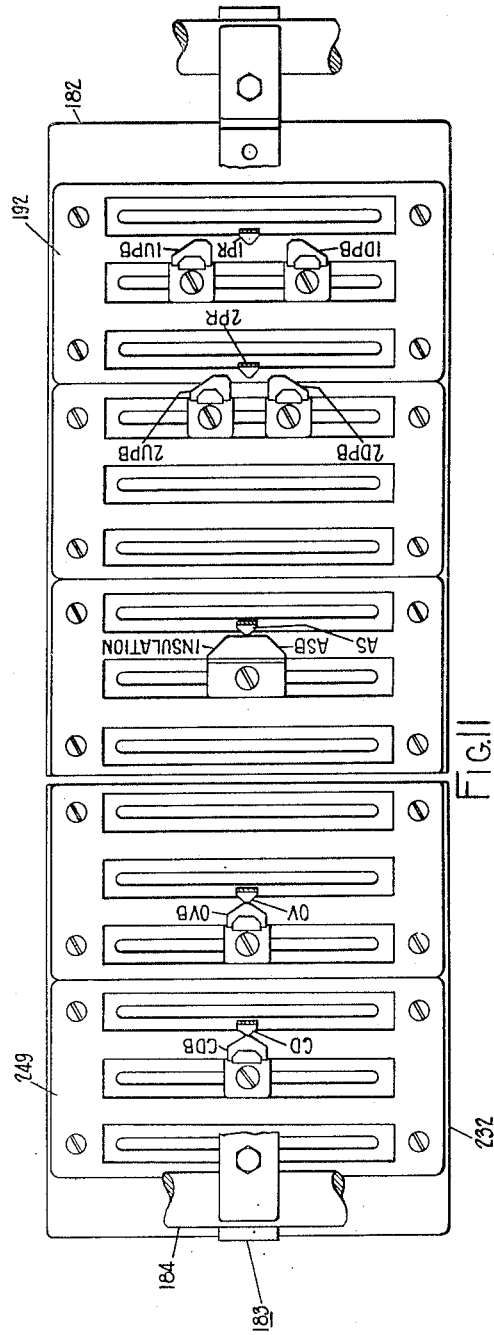
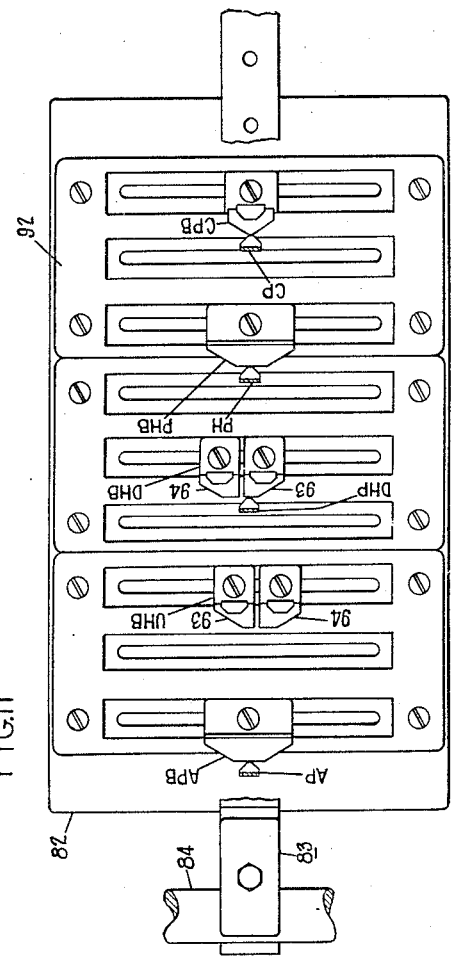
Jacob Daniel Lewis
William Henry Bruns  } INVENTORS
BY Walter E. Bradley  ATTORNEY July 1, 1941.  J. D. LEWIS ET AL  2,247,955
ELEVATOR CONTROL SYSTEM
Filed June 5, 1940   24 Sheets-Sheet 10
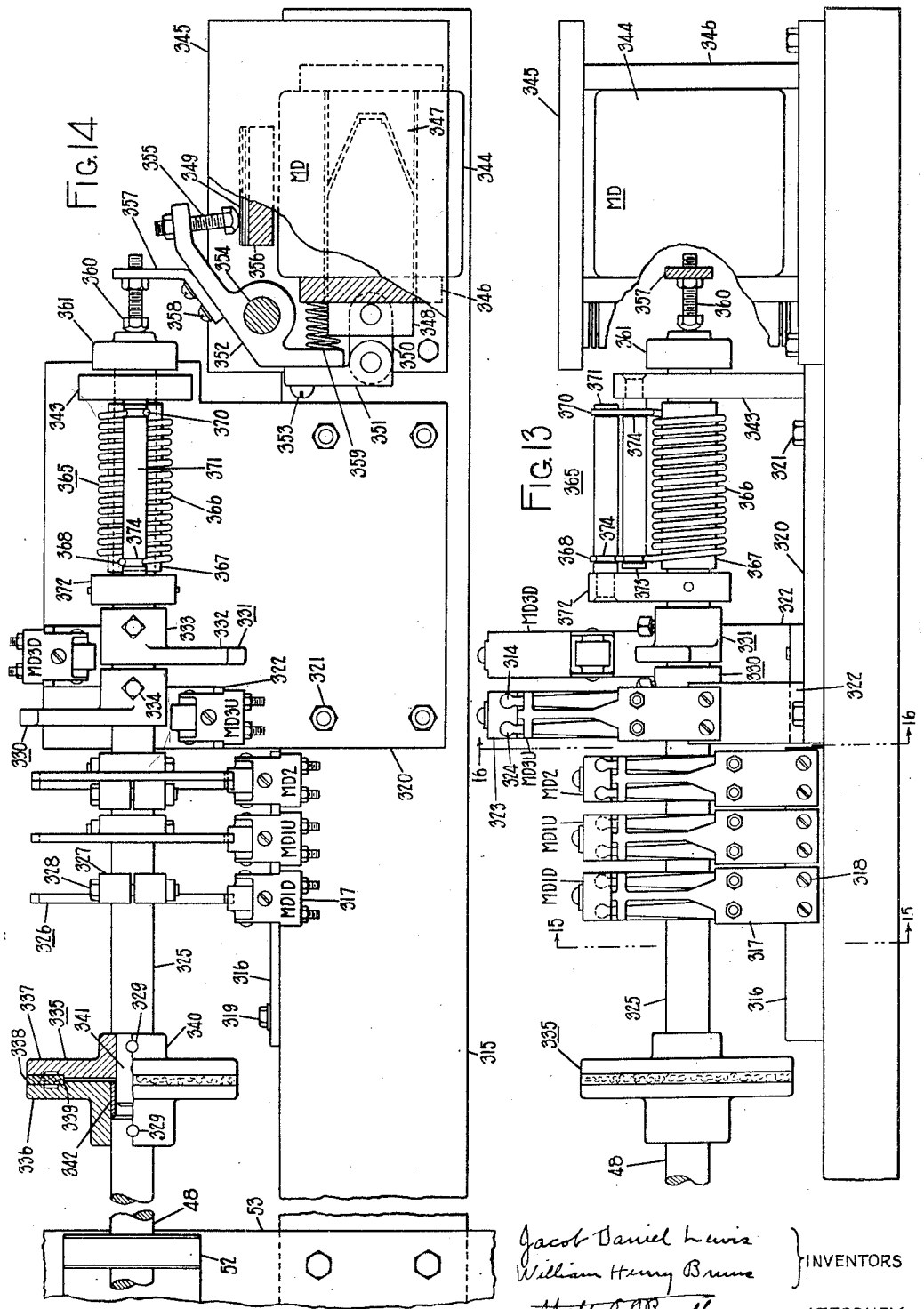
Jacob Daniel Lewis
William Henry Brune } INVENTORS
BY Walter B. Bradley  ATTORNEY July 1, 1941.  J. D. LEWIS ET AL  2,247,955

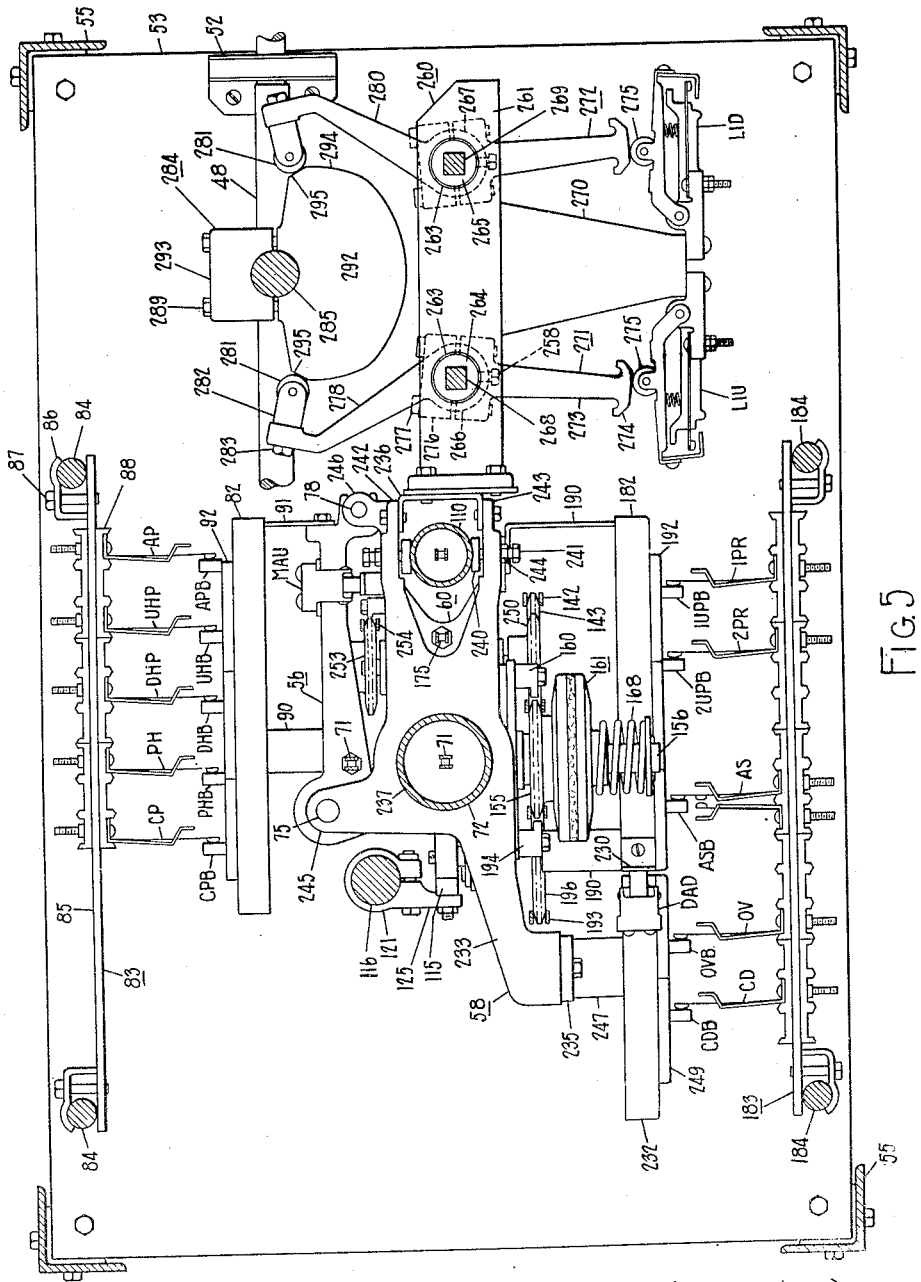

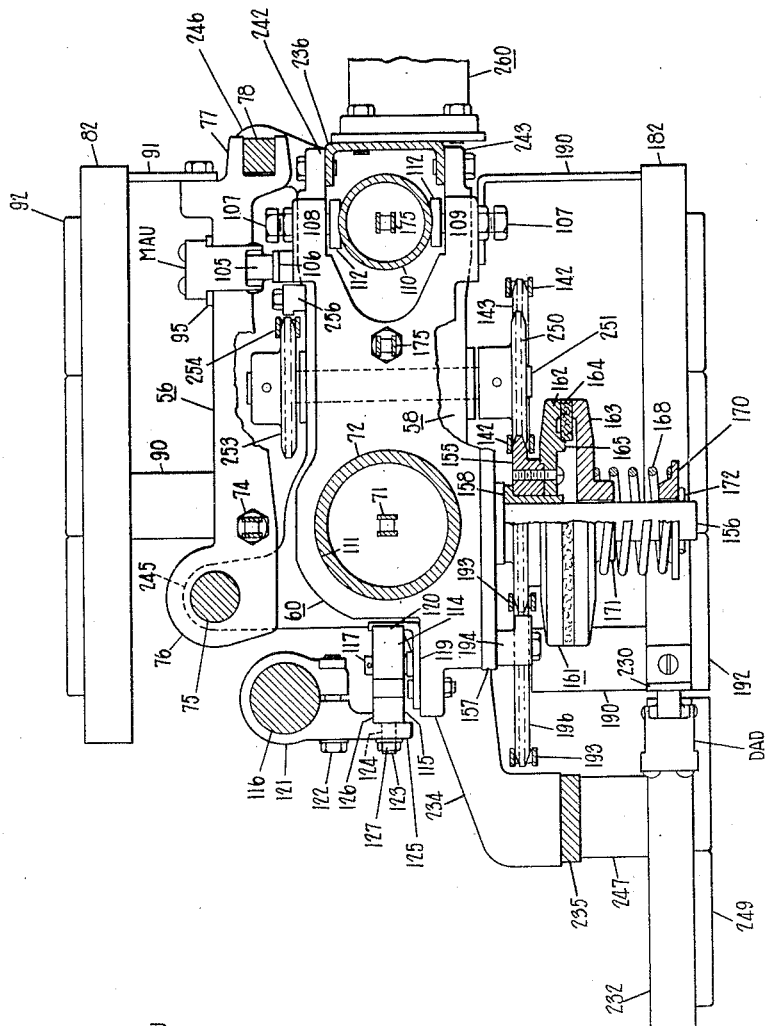

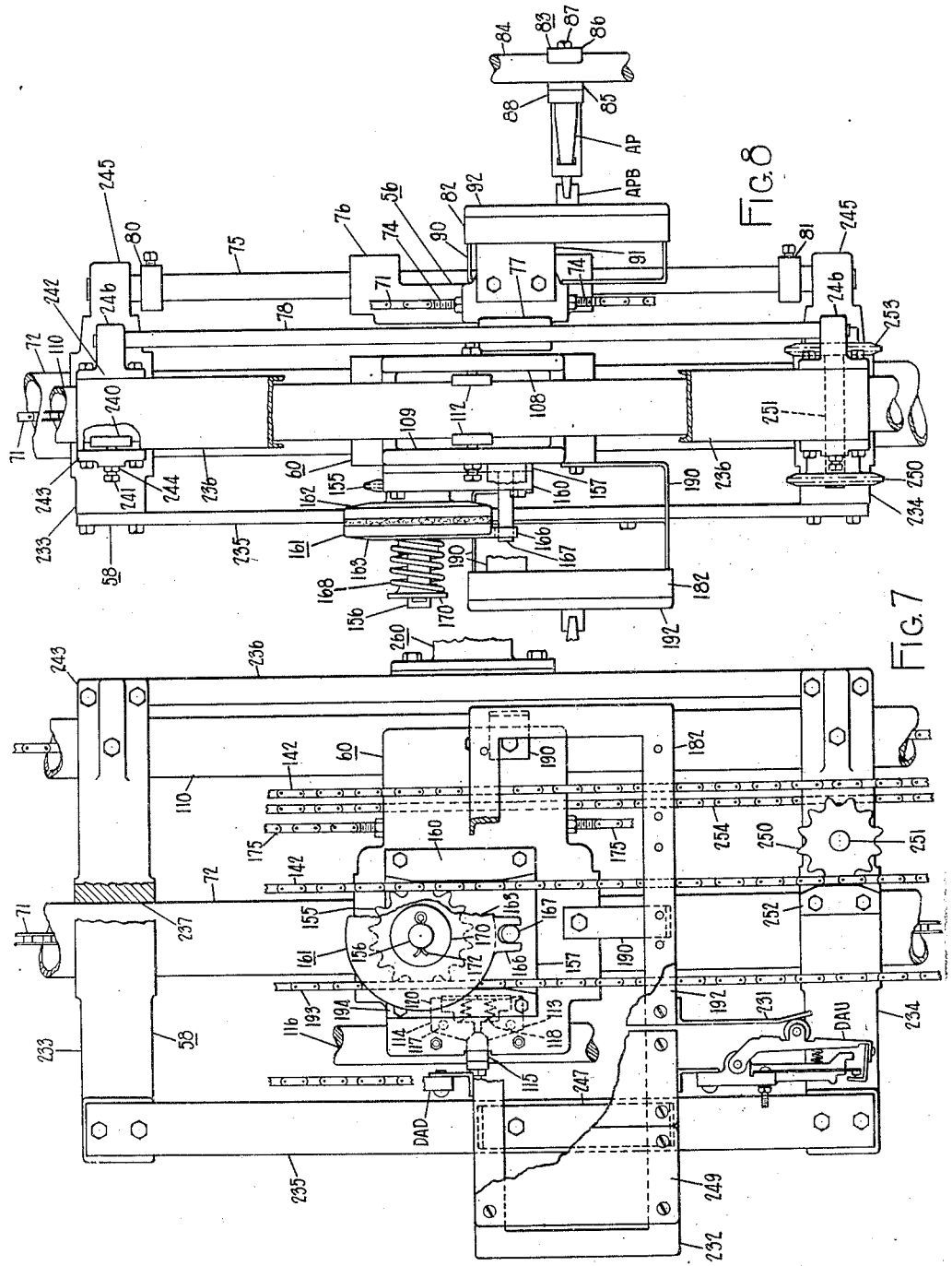

ELEVATOR CONTROL SYSTEM

Filed June 5, 1940   24 Sheets-Sheet 14

FIG. 22a

Jacob Daniel Lewis
William Henry Bruns } INVENTORS

BY [signature] ATTORNEY

July 1, 1941.  J. D. LEWIS ET AL  2,247,955

ELEVATOR CONTROL SYSTEM

Filed June 5, 1940  24 Sheets-Sheet 16

Jacob Daniel Lewis
William Henry Bruns } INVENTORS

BY _____ ATTORNEY

July 1, 1941. J. D. LEWIS ET AL 2,247,955
ELEVATOR CONTROL SYSTEM
Filed June 5, 1940 24 Sheets-Sheet 17

Jacob Daniel Lewis
William Henry Bruns } INVENTORS

BY Walter E. Bradley ATTORNEY

July 1, 1941.   J. D. LEWIS ET AL   2,247,955
ELEVATOR CONTROL SYSTEM
Filed June 5, 1940   24 Sheets-Sheet 18

Jacob Daniel Lewis
William Henry Bruns
} INVENTORS

BY Matthew G. Bradley   ATTORNEY

July 1, 1941.  J. D. LEWIS ET AL  2,247,955
ELEVATOR CONTROL SYSTEM
Filed June 5, 1940  24 Sheets-Sheet 20

Jacob Daniel Lewis
William Henry Bruns } INVENTORS

BY Walter E. Bradley  ATTORNEY

July 1, 1941. J. D. LEWIS ET AL 2,247,955
ELEVATOR CONTROL SYSTEM
Filed June 5, 1940  24 Sheets-Sheet 24

Jacob Daniel Lewis
William Henry Bruns } INVENTORS

BY Walter T. Bradley  ATTORNEY

Patented July 1, 1941

2,247,955

UNITED STATES PATENT OFFICE 2,247,955

ELEVATOR CONTROL SYSTEM

Jacob Daniel Lewis, Yonkers, and William Henry Bruns, Lincolndale, N. Y., assignors to Otis Elevator Company, New York, N. Y., a corporation of New Jersey Application June 5, 1940, Serial No. 338,872

171 Claims. (Cl. 172—152)

The invention relates to control systems and especially to control systems for elevators.

In the operation of passenger elevators, especially those operating at higher speeds, there are several factors that are important. These are the smoothness of operation of the car, the time consumed in making a run, the size of the machines and the elaborateness of the control equipment. These factors are interdependent and many of the improvements which have been made in the past in one or more of them have been effected at the expense of one or more of the others.

It is the object of the invention to improve elevator control systems from the standpoint of all of these factors.

A variable voltage system, that is, one in which direct current is supplied to the elevator hoisting motor from variable voltage dynamo electric generating means, is utilized in carrying out the invention. The car is accelerated by increasing the voltage applied to the motor and retarded by decreasing this voltage. The voltage is controlled so as to cause smooth acceleration and retardation for all lengths of runs, for both directions and for all loads, and at a rate which is as fast as possible without being objectionable to the average passenger.

The dynamo electric generating means may comprise one or more generators depending upon the duty and characteristics of the particular installation. Where more than one generator is employed, the armatures of the generators are connected in series relation. The generator, or each of the generators in case more than one is utilized, is of a size to enable field changes faster than required to provide the desired acceleration and retardation, to be readily obtained. It has a separately excited field winding the energization of which is increased to accelerate the car and decreased to retard the car, a series field winding for providing load compensation, and a self-excited field winding for amplifying the excitation due to both the separately excited and series field windings and for delaying changes in the generator voltage. The control of the separate excitation for accelerating the car is effected in accordance with the position of the car with respect to the floor from which it is started and for retarding the car is effected in accordance with the position of the car with respect to the floor at which the stop is to be made. In other words, the separate excitation is increased in steps as the car reaches points given distances from the starting floor and decreased in steps as the car reaches points given distances from the stopping floor. The amount of separate excitation at each of such points amplified by self-excitation is such that for a certain load in the car the desired acceleration and retardation are obtained. The amount of series excitation amplified by self-excitation is such as to compensate for the load in the car. The slope of the resistance line of the self-excited field winding is greater than that of the magnetization curve of the generator field so as to enable the acceleration and retardation to be controlled. The self-excited field winding also acts to delay the voltage changes so as to enable the acceleration and retardation to be effected in a minimum number of steps and to damp out any current surges in the current in the motor armature circuit.

In order to effect short floor runs in a minimum of time, the car is caused to accelerate the same as on a full speed run up to a certain point dependent upon the length of the run. When this point is reached, the generator excitation is decreased an amount such as to bring the car from its state of acceleration into a state of retardation from which the remainder of the retardation may be effected. This decrease in excitation exists for a fixed time interval, the extent of which is such as to effect the change as quickly as possible without discomfort to the passengers. The point at which the decrease in excitation begins is chosen so that the car may be brought to the floor without causing objectionable oscillations, regardless of the length of the less than full speed run.

The brake is partially deenergized prior to the final stopping to enable it to be quickly applied. The motor is controlled so that during the brake application the change in motor torque is the same regardless of load. These factors enable the stopping to be effected from a higher speed, thereby increasing the range of speeds from which the car may be stopped within the final stopping or dead zone. The voltage applied to the elevator motor just prior to the application of the brake is controlled so as to minimize variations in speed. This insures the car being brought within the speed range for the application of the brake. With this arrangement, the time consumed in the final stopping operation is reduced to a minimum.

The brake is partially energized prior to starting, which enables the brake to be quickly released. Also, generator field excitation is forced until the car starts. Thus the time consumed in starting is minimized.

For a further discussion of features and advantages of the invention, reference may be had to the summary at the end of the specification. The invention will be understood from the following description, with reference to a particular application of the invention, and from the appended claims.

In the drawings:

Figure 5 is a sectional view taken between the top and base plates of the selector machine and above the selector machine crossheads;

Figure 6 is an enlarged detail similar to Figure 5 of the selector machine crossheads;

Figure 7 is a side view of the synchronous and distance advance crossheads and the driving arrangement therefor;

Figure 8 is an end view of the same;

Figure 9 is an enlarged detail of switches operated by relative movement of the motor advance and distance advance crossheads;

Figure 10 illustrates the settings of the operating cams for the selector switches;

Figure 11 is a view illustrating the arrangement of the brushes carried by the synchronous and distance advance panels;

Figure 12 is a similar view illustrating the arrangement of the brushes carried by the motor advance panel;

Figure 13 is a side view of the motion device;

Figure 14 is a top view of the same;

Figure 15 is a detail of one of the motion device switches and its operating cam taken along the line 15—15 of Figure 13;

Figure 16 is a view taken along the line 16—16 of Figure 13;

Figure 17 is a detail view taken along the line 17—17 of Figure 16;

Figure 18 illustrates the settings of the operating cams for the switches of the motion device;

Figure 19 illustrates the settings of the operating cams for the switches of the terminal stopping switch;

Figure 26:
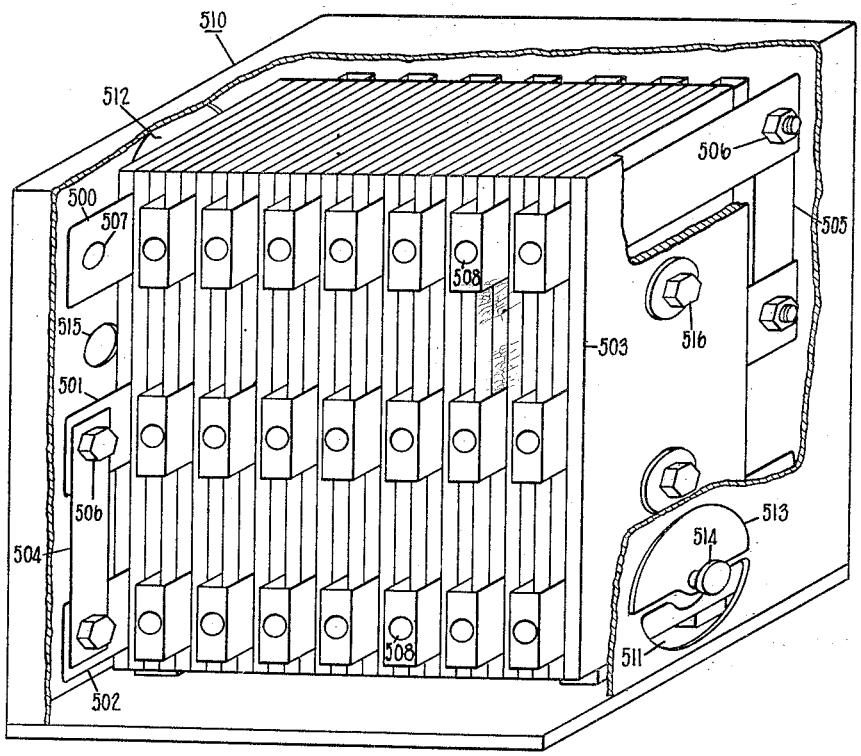
Figure 22:
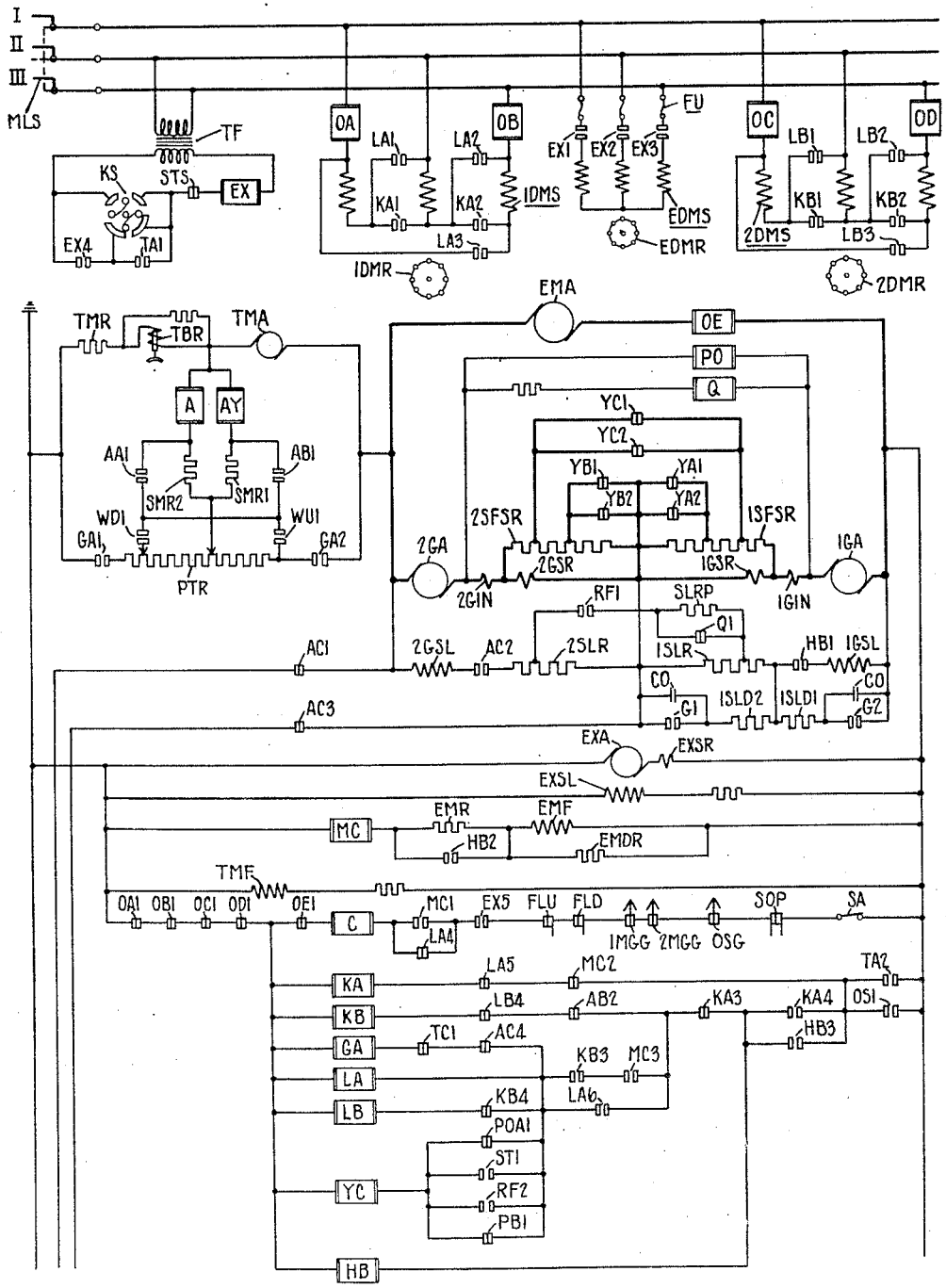
Figure 22B:
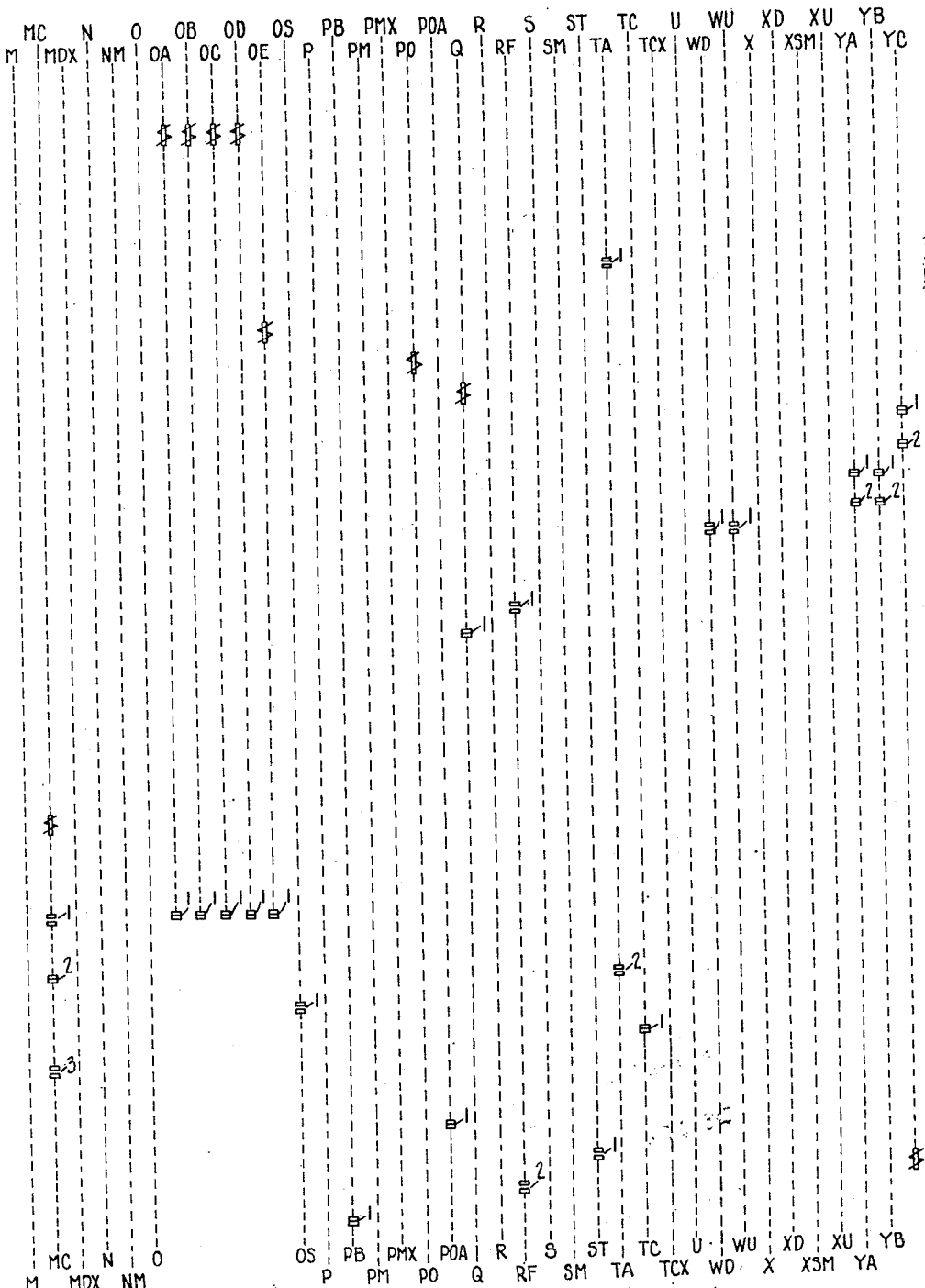
Figure 23:
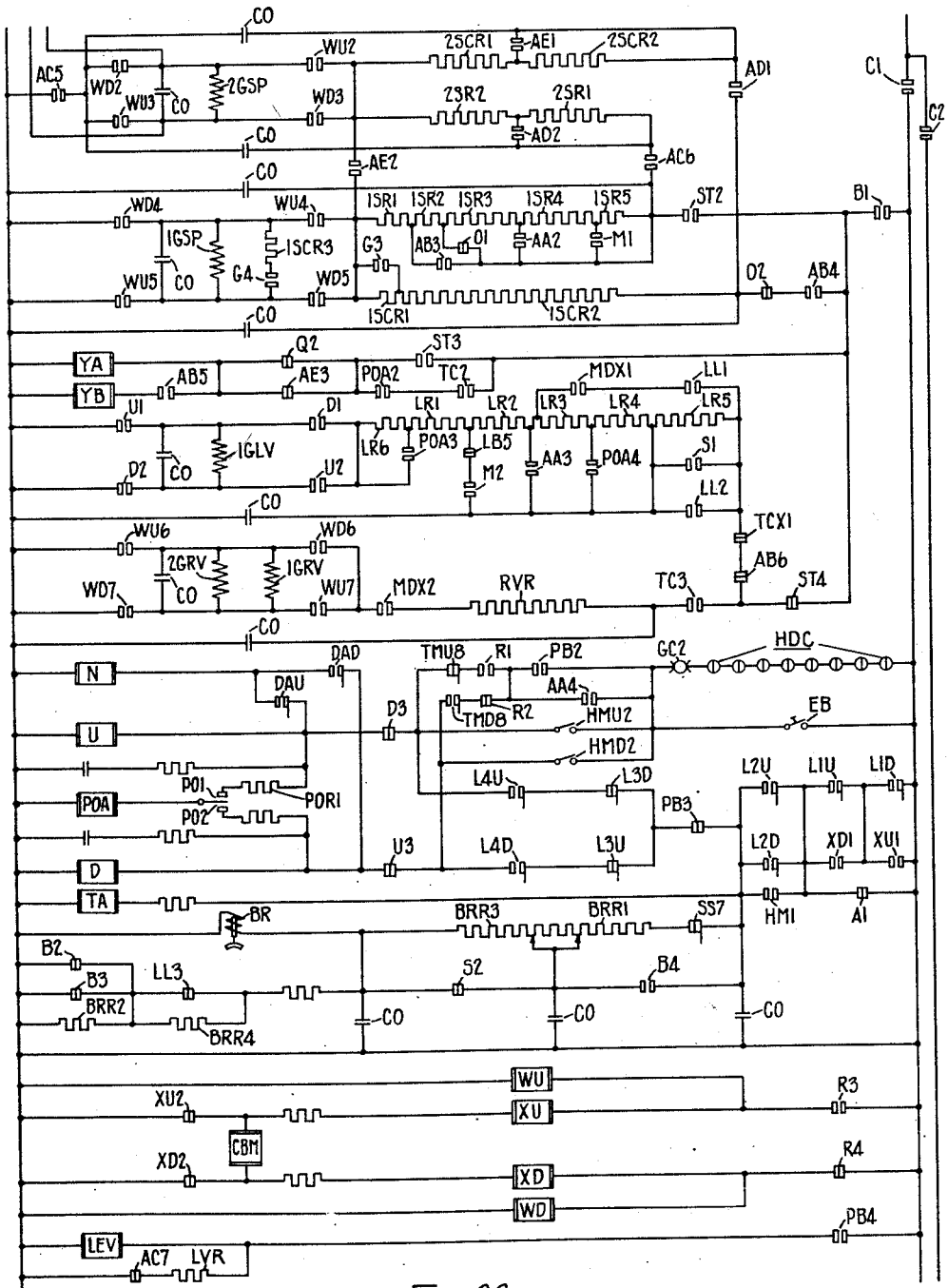
Figure 23A:
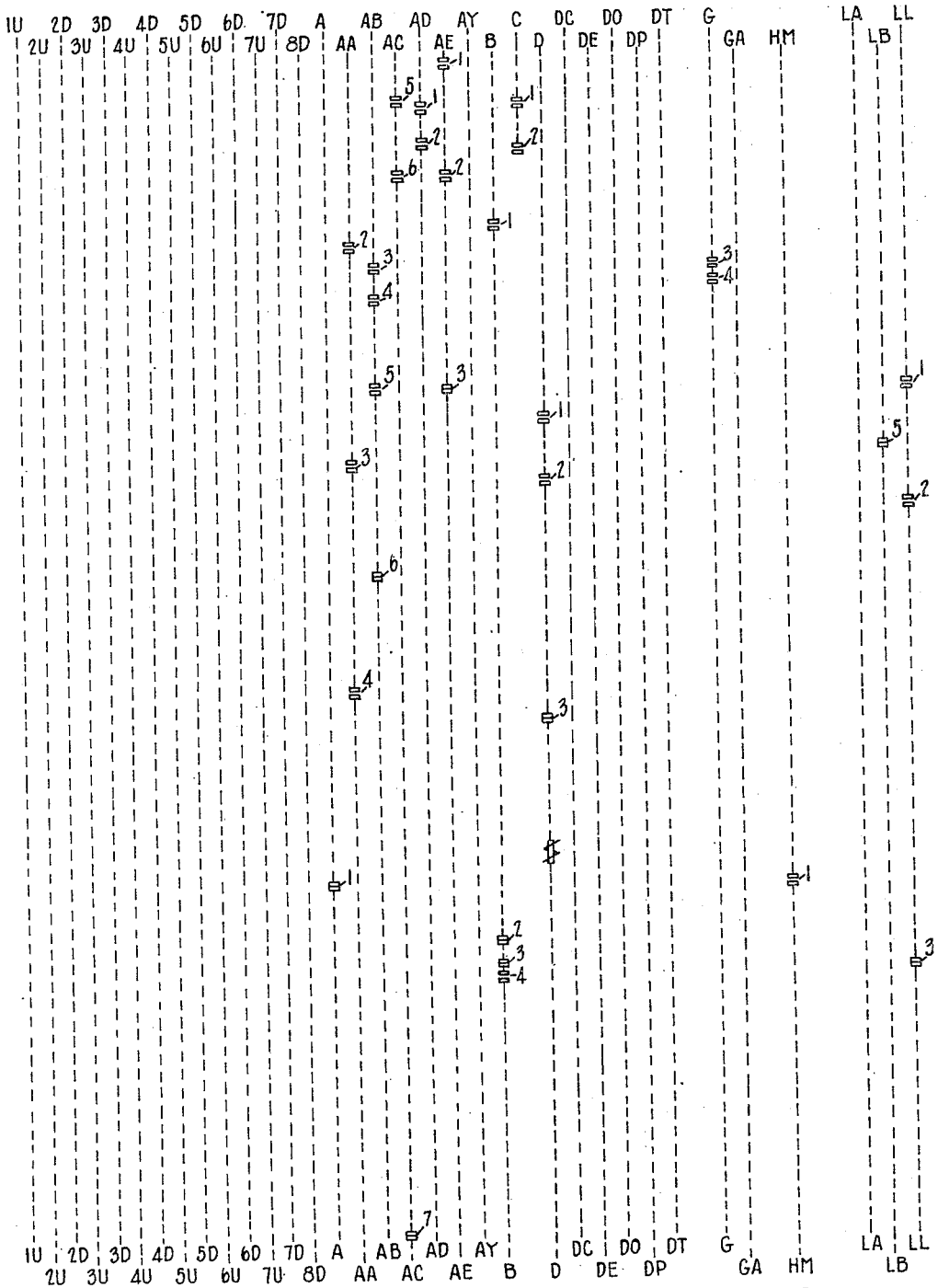
Figure 23B:
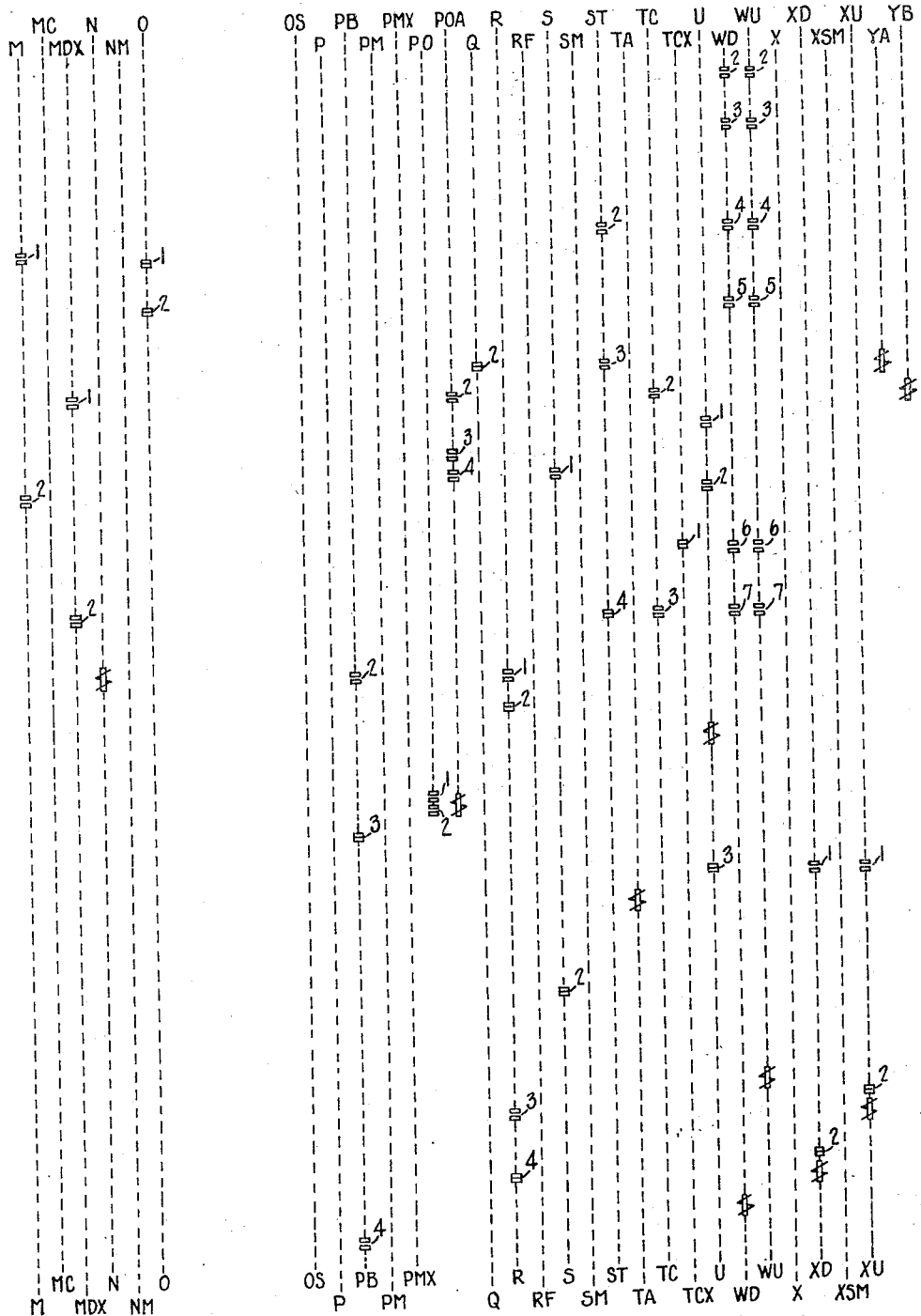
Figure 24:
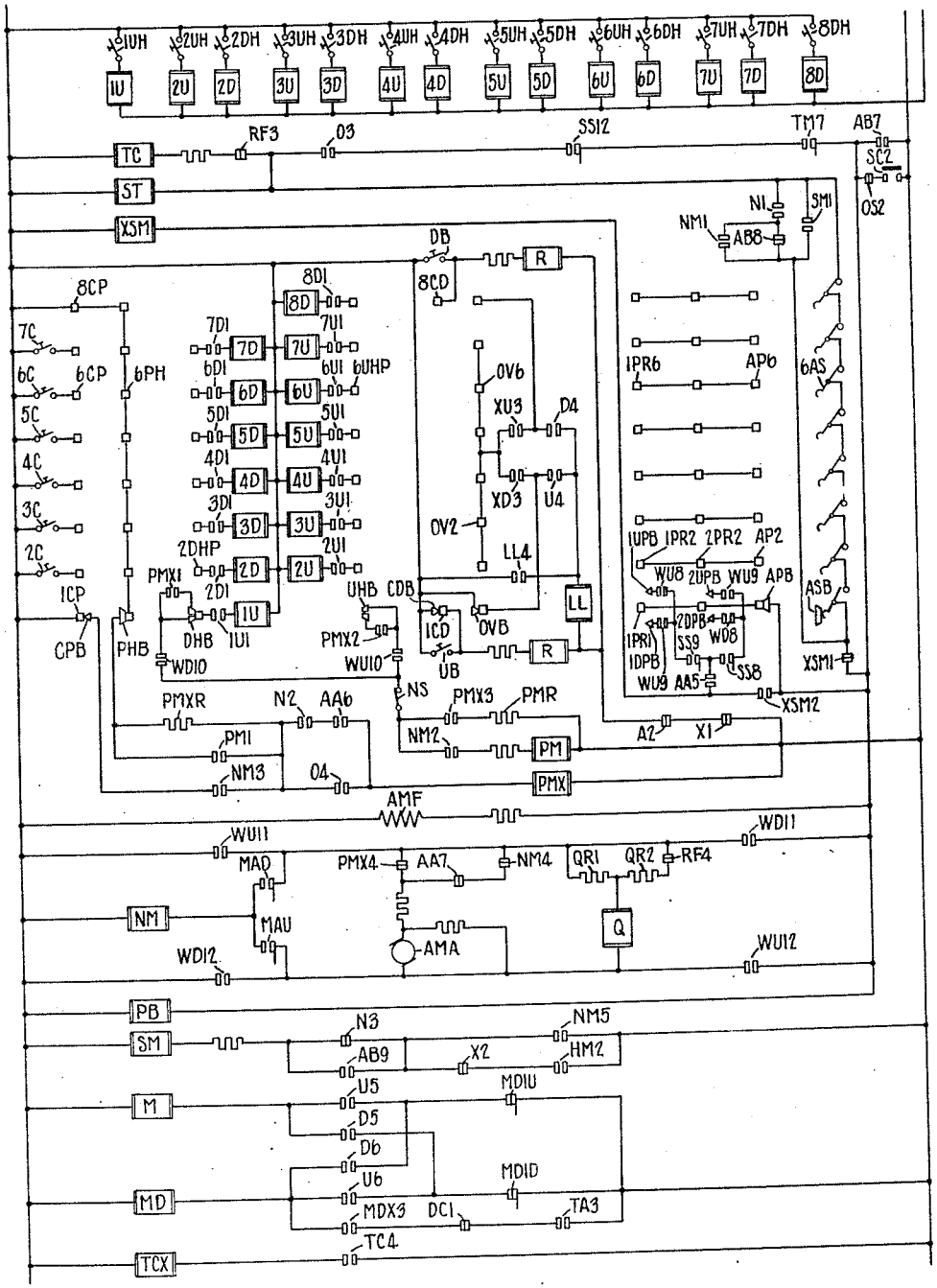
Figure 24A:
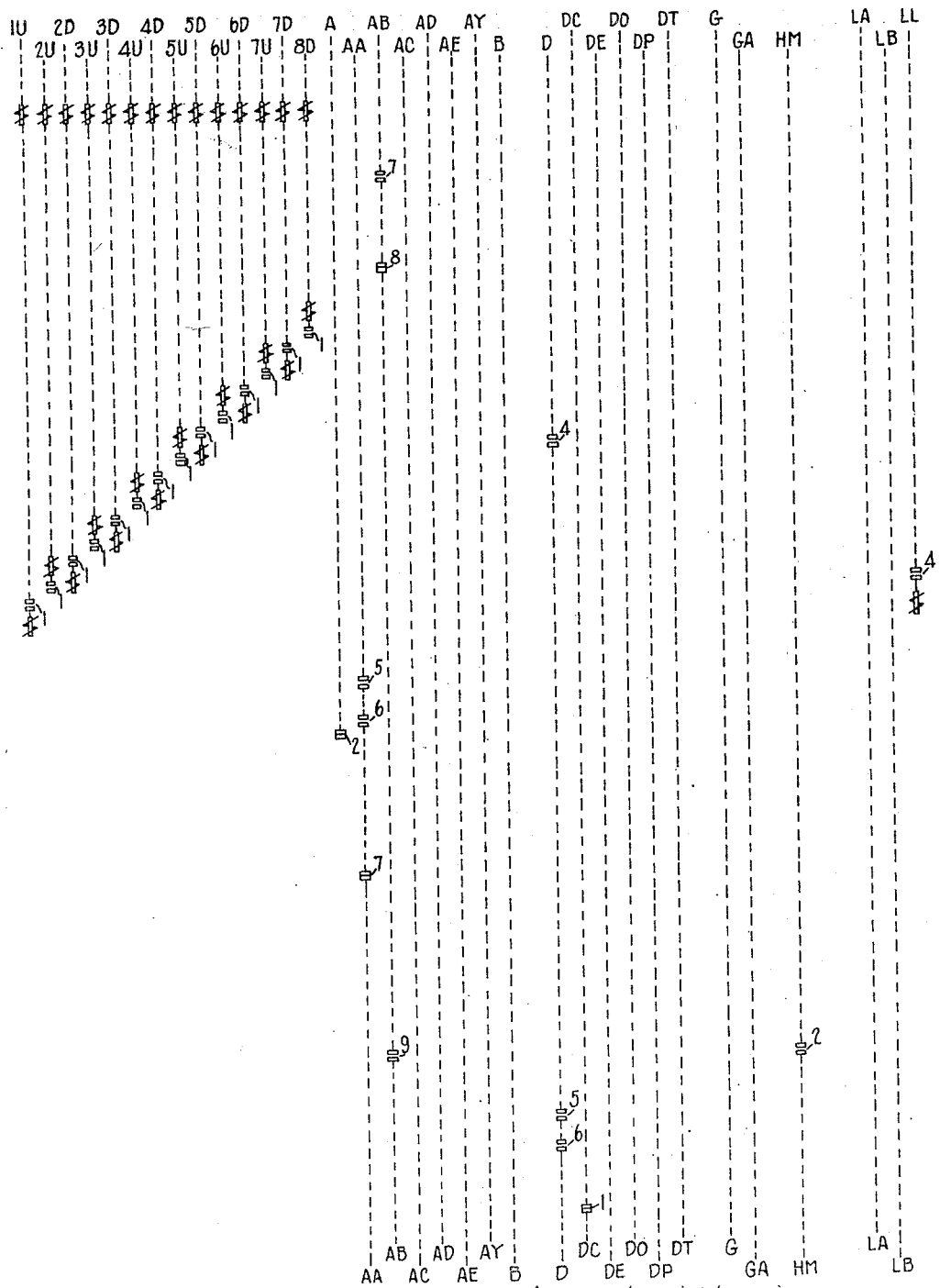
Figure 24B:
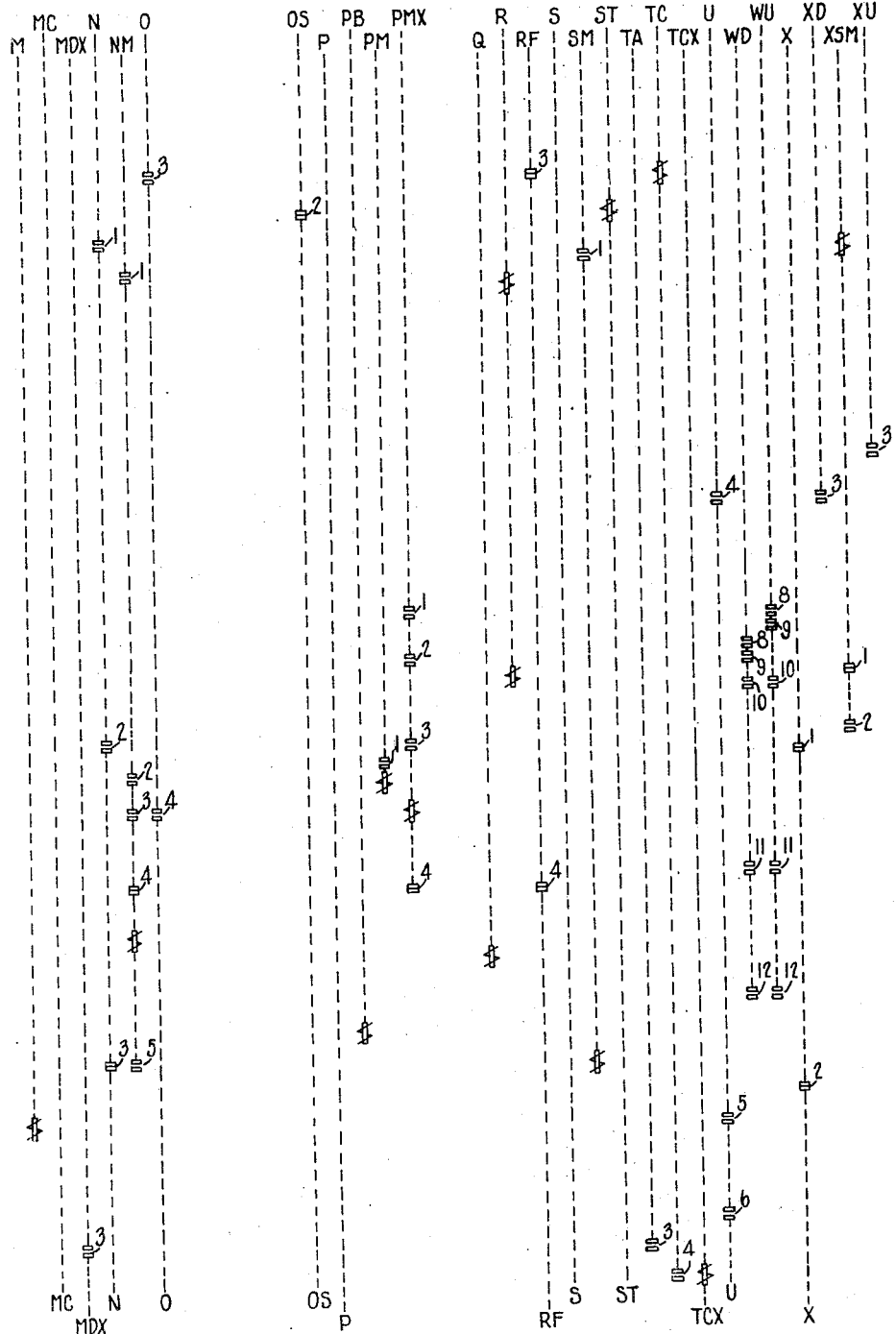
Figure 25:
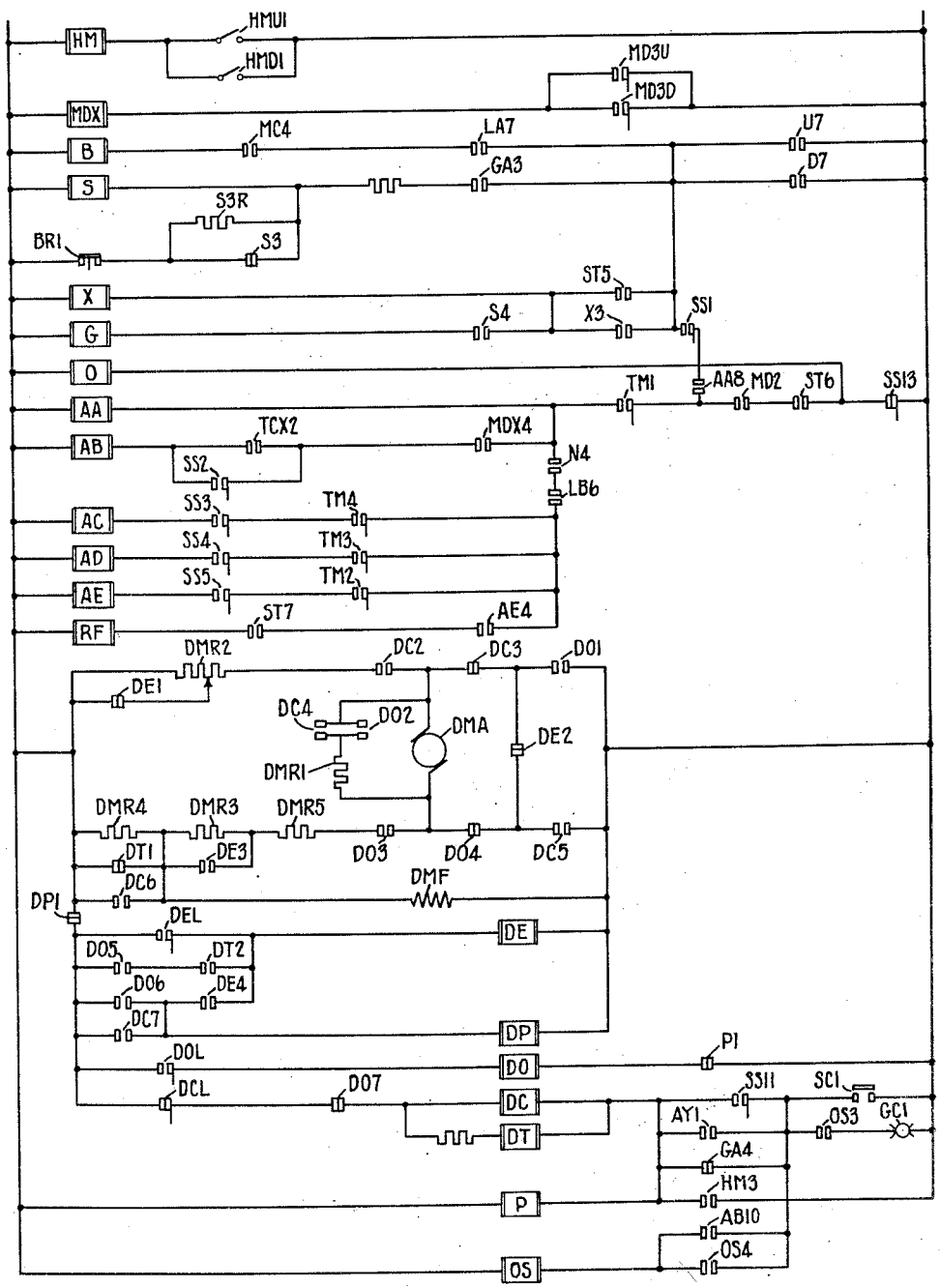
Figure 25A:
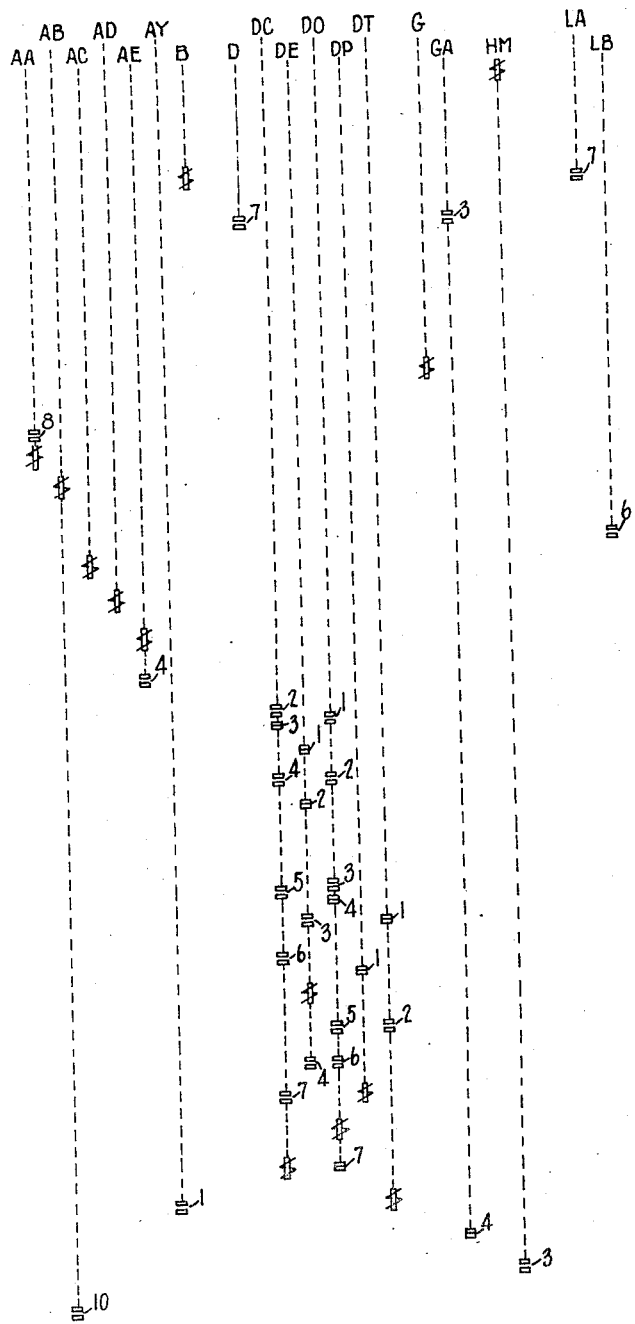
Figure 25B:
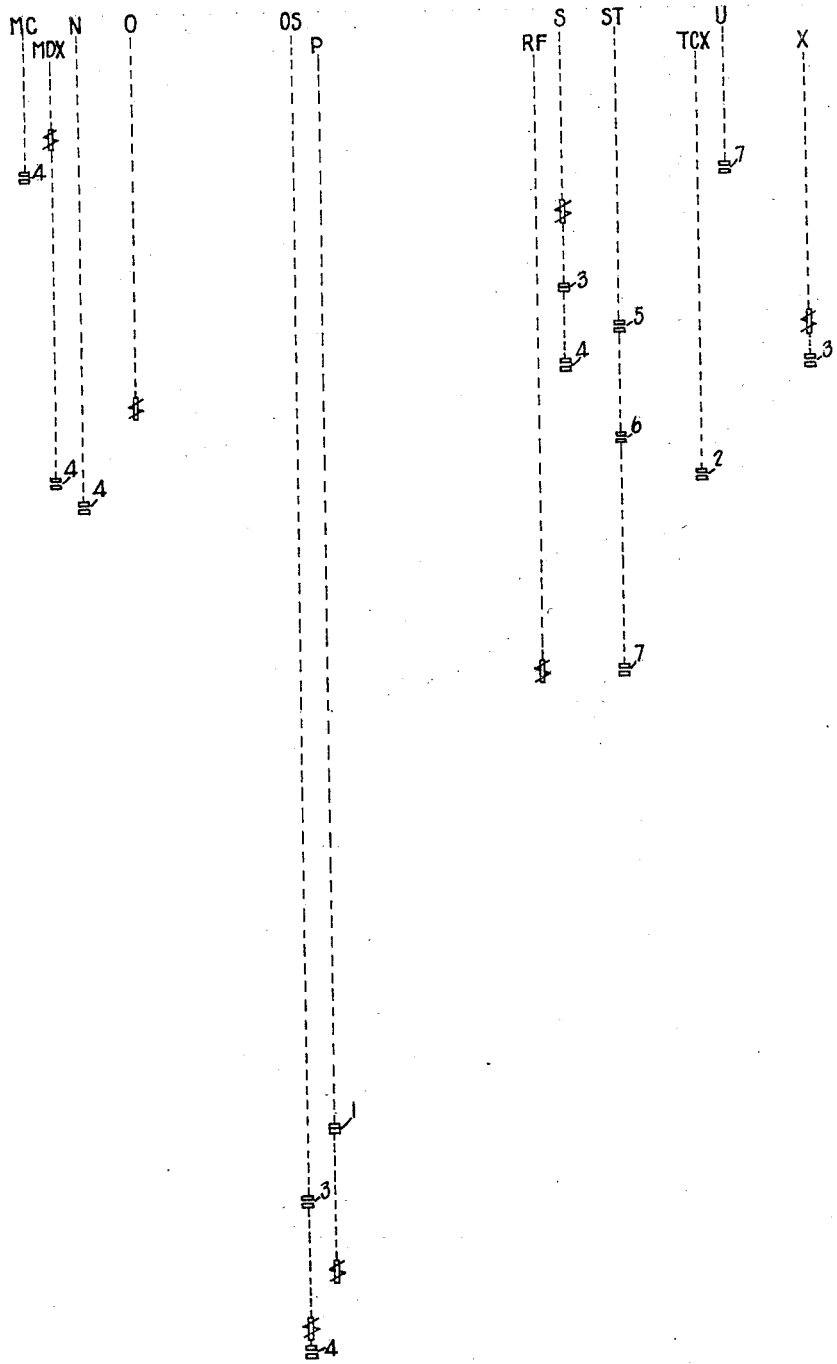

Figures 22, 23, 24 and 25 taken together constitute a simplified diagram of the power and control circuits;

Figures 22a and b, 23a and b, 24a and b and 25a and b are key sheets for Figures 22, 23, 24 and 25 respectively showing the electromagnetic switches in spindle form with the contacts and coils on the spindles in horizontal alignment with the corresponding contacts and coils on the wiring diagram; and Figure 26 is an isometric view of a shunt for the series field windings of the generator.

Figure 1:
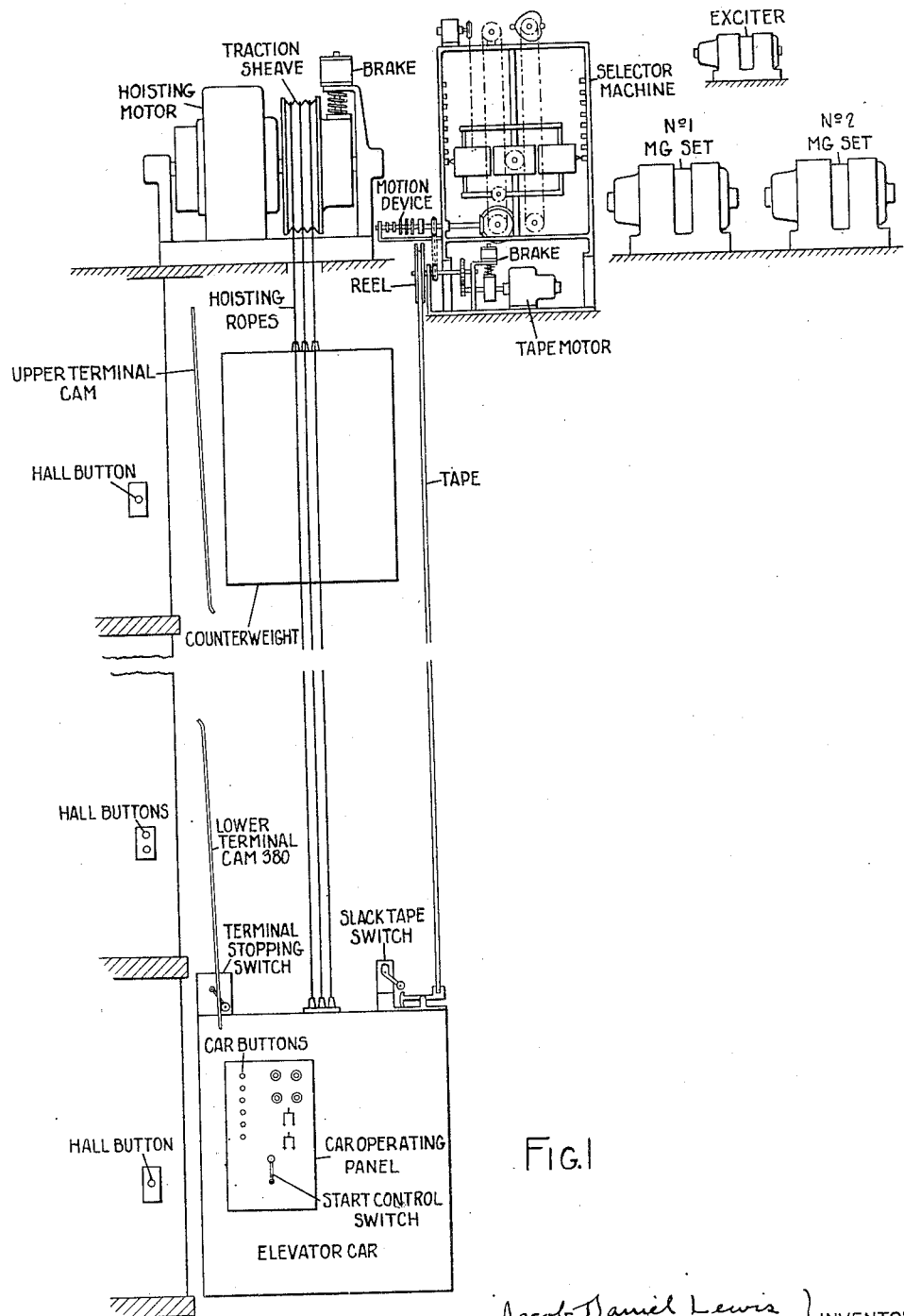
Figure 1 is a simplified schematic representation of an elevator installation in accordance with the invention.

For a general understanding of the invention, reference may be had to Figure 1, wherein various parts of the system chosen to illustrate the principles of the invention are indicated by legend. The car is raised and lowered by means of the hoisting motor, which drives a traction sheave over which pass hoisting ropes for the car and counterweight. An electromechanical brake is provided and is applied in stopping the car and holding the car when at rest. In the arrangement which will be described, current is supplied to the hoisting motor by two generators having their armatures connected in series relation. The two motor generator sets are designated No. 1MG set and No. 2MG set. The generators will hereinafter be referred to as the No. 1 and No. 2 generators. An exciter set is provided, the exciter supplying the current for certain of the field windings and control apparatus. A terminal stopping switch is mounted on the car and is operated by cams at the terminals which engage a roller mounted on the operating arm of the switch to swing it from one operating position to the other.

The invention is illustrated as applied to a system in which the starting of the car is under the control of an attendant in the car, while stops are made in response to buttons pressed by intending passengers at the landings and by buttons pressed in the car by the attendant under the direction of the passengers. The push buttons at the landings, which will hereinafter be termed hall buttons, are arranged in push button boxes, an up and a down push button being provided at each intermediate floor and one push button at each terminal floor. The push buttons within the car, which will hereinafter be termed car buttons, are arranged on a car operating panel. On this panel are also arranged the start control switch and several auxiliary switches such as the non-stop switch, safety switch, emergency operating switch, micro switch and reversal buttons.

In such a system mechanism actuated in accordance with car movement is utilized. This mechanism is illustrated as in the form of a selector machine driven by a flexible tape secured at one end to the top of the elevator car and at the other end to a reel upon which it is wound and unwound in the driving operation. This reel is mounted on a shaft connected to the selector drive shaft by a chain. Slack in the tape is taken up by a torque motor, which will hereinafter be referred to as the tape motor. A tape motor brake is applied when the tape motor is deenergized. Should slack develop in the tape, a slack tape switch, through which the tape is attached to the car, is opened to shut down the system. Mechanism is mounted on the end of the selector drive shaft for operating contacts in accordance with motion of the elevator car and its direction of travel. This mechanism will hereinafter be termed the motion device.

Figure 2:
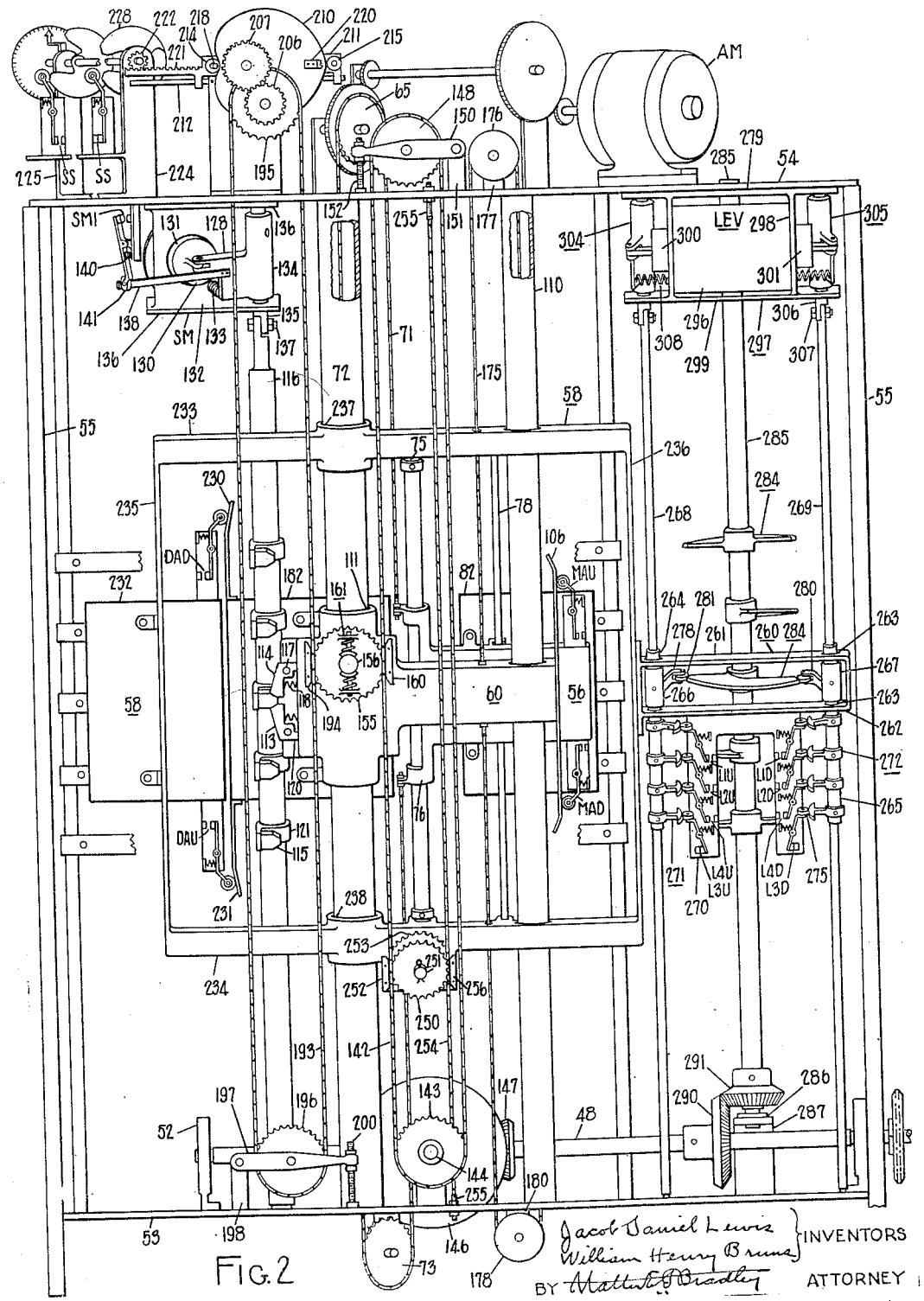
Figure 2 is a schematic representation of the selector machine used in the control system.

Reference may now be had to Figure 2, which illustrates schematically a selector machine of preferred construction. This figure is for the purpose of giving a comprehensive understanding of the machine and its operation. It is not intended to show details of construction, such details being illustrated in Figures 3 to 12 inclusive. In the drawings showing details of construction, certain parts not involved in the portion of the mechanism illustrated in any particular figure of drawings are not shown in that figure in order that the construction and operation of the mechanism may be readily understood. For convenience, the selector machine is shown for a five floor installation.

Figure 3:
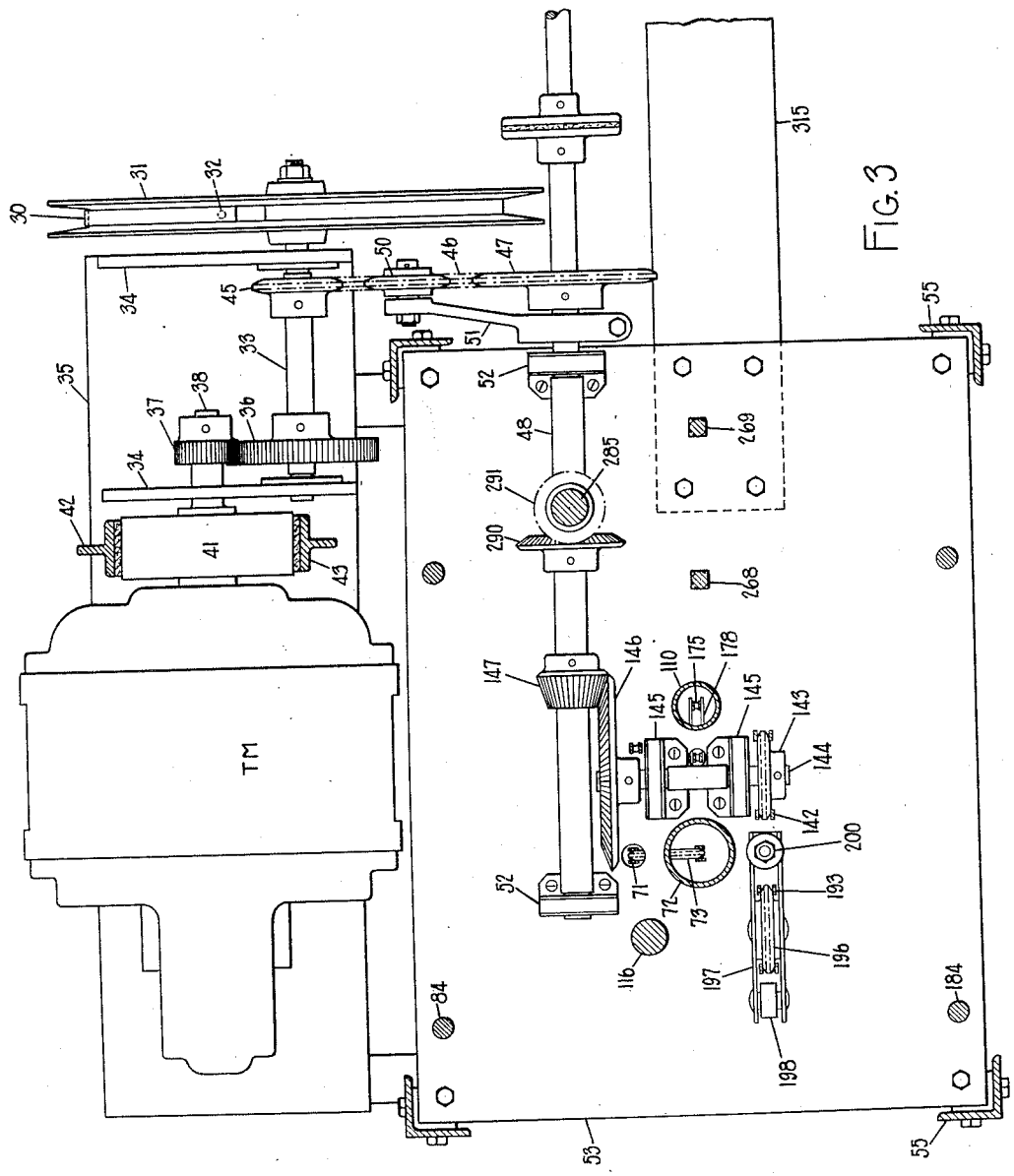
Figure 3 is a view of the base plate of the selector machine illustrating particularly the driving arrangement.

Referring also to Figure 3, the drive tape 30 which winds on and unwinds from reel 31 is secured to this reel by a pin 32. The reel is secured to a shaft 33 supported in bearing plates 34 mounted on a base 35. This shaft is connected through gears 36 and 37 to the shaft 38 of tape motor TM. Also arranged on this shaft is the brake pulley 41 to which the tape motor brake shoes 42 and 43, shown in section, are applied. The tape motor is energized while the car is in service to exert a torque in a direction tending to wind up the tape on the reel, that is, to turn the reel counterclockwise as viewed from the right in Figure 3. Thus, during upward movement of the car the tape motor winds up the tape on the reel, while during downward movement the tape is unwound from the reel by the car against the torque of the tape motor.

Also secured to shaft 33 is a sprocket wheel 45. This sprocket wheel is connected by sprocket chain 46 to another sprocket wheel 47 secured to selector drive shaft 48. Thus shaft 48 is driven counterclockwise, as viewed in Figure 3, during upward movement of the car. A tensioning sprocket wheel 50 is mounted on an arm 51 rotatively mounted on drive shaft 48. The drive shaft is supported by bearing stands 52 mounted on the selector base plate 53. The base plate is connected to the top plate 54 by angle members 55 secured to these plates at the corners (see also Figure 4), thereby forming a frame.

The selector machine has three moving crossheads, indicated in Figure 2. One of these crossheads, designated 56, is driven by means of a motor AM mounted on the top of top plate 54. This crosshead will be hereinafter termed the motor advance crosshead and the motor the advancer motor. The other two of these crossheads are actuated in accordance with car movement. One of them, designated 58, will be termed the synchronous crosshead and the other, designated 60, being driven in the ratio of 2:1 with respect to the synchronous crosshead, will be termed the distance advance crosshead.

Referring also to Figures 4, 5, 6 and 8, the advancer motor AM operates through reduction gears 61, 62, 63 and 64 to drive a sprocket wheel 65. The sprocket wheel and gear 64 are secured to a shaft 66 supported by bearing plates 67 secured to the base 68 for the motor. Gears 62 and 63 are mounted on another shaft 70, also supported by bearing plates 67, while gear 61 is secured to the end of the motor shaft. The sprocket wheel drives a sprocket chain 71 secured at one end to the top of the motor advance crosshead 56, from which it extends upwardly and around the sprocket wheel downwardly through a cylindrical tube 72 extending between the top and bottom plates, thence around an idler sprocket 73 secured to the bottom of the base plate 53 and thence upwardly to the bottom of the motor advance crosshead, to which the other end of the chain is secured. The ends of the chain are secured to the crosshead by adjusting bolts 74 to enable any slack in the chain to be taken up. A counterweight (not shown) for the motor advance crosshead is arranged within tube 72 and connected to the sprocket chain.

The motor advance crosshead is guided in its movement by a rod 75 extending between the top 233 and bottom 234 of the synchronous crosshead 58. This rod extends through apertures in guide members 76 formed on the crosshead. The opposite end of the crosshead is formed with prongs 77 to span a bar 78 extending between the top and bottom of the synchronous crosshead, thereby forming a supplementary guide for the motor advance crosshead. Stops 80 and 81, adjustably mounted on rod 75, limit the movement of the motor advance crosshead with respect to the synchronous crosshead.

The motor advance crosshead carries a frame 82 upon which are mounted a plurality of circuit controlling elements for cooperating with stationary circuit controlling elements mounted on floor bars 83, one for each floor served by the car. These floor bars are spaced in accordance with the distance between the floors for which they are provided and are mounted on rods 84 secured to the bottom and top plates of the selector machine. Each floor bar comprises an elongated flat bar 85 spanning rods 84 and secured thereto by means of angle clamps 86 and screws 87, as shown in Figure 5. The bar is provided with a plurality of spaced apertures utilized in the present arrangement for mounting a plurality of spring contacts. These spring contacts are mounted on the floor bars through insulating bases 88 in the same manner as disclosed in the co-pending application of Edward Lee Dunn, Serial No. 214,271, filed June 17, 1938, in connection with Figure 13 thereof. Also, the construction of the spring contacts is the same as that of spring contact 193 of that application. It is believed, therefore, that these spring contacts need not be further described here.

One of these spring contacts, designated CP, serves for an intermediate floor as a call pick up contact for calls registered by the pressing of the car button for that floor. There is one of these contacts on each floor bar. The next spring contact to the right, as viewed in Figure 5, which is designated PH, serves as a call pick up holding contact. There is one of these contacts on each floor bar. The next spring contact to the right, designated DHP, serves as a down hall call pick up contact. There is one of these contacts on each of the floor bars except the floor bar for the upper terminal floor. The next spring contact to the right, designated UHP, serves as an up hall call pick up contact. There is one of these contacts on each of the floor bars except the floor bar for the lower terminal floor. The last spring contact, designated AP, serves as an auxiliary pre-retardation control contact. There is one of these contacts on each floor bar.

The crosshead frame 82, which carries the various elements for contacting with the spring contacts above described, is secured to the crosshead by means of strap 90 and angle 91. The frame is provided with a mounting panel for the contacting elements. Referring also to Figure 12, this panel, which is of insulating material, is arranged in duplicate sections 92 secured to the frame in abutting relationship. This panel will hereinafter be referred to as the motor advance panel. The various contacts cooperating with the spring contacts on the floor bars are secured to brackets adjustably mounted in slots in the panels. This arrangement is the same as that described in the aforementioned co-pending Dunn application, and will not be further described. The contact for engaging spring contacts CP is designated CPB and will hereinafter be referred to as the car call pick up brush. The contact for cooperating with spring contacts PH is designated PHB and will hereinafter be referred to as the call pick up holding brush. This brush is a relatively long one as compared with brush CPB. The brushes for cooperating with spring contacts DHP and UHP are designated DHB and UHB respectively, these contacts being hereinafter referred to as the down hall call pick up brush and the up hall call pick up brush respectively. These brushes also are relatively long and each is divided into a leading section 93 and a trailing section 94. The contact for cooperating with spring contacts AP is designated APB and will hereinafter be known as the auxiliary pre-retardation control brush. This brush also is a relatively long brush.

The motor advance crosshead also carries a pair of switches (see Figure 9), one effective for upward movement of the crosshead and the other for downward movement. The up motor advance switch, designated MAU, extends upwardly from the crosshead, while the down motor advance switch, designated MAD, extends downwardly from the crosshead. These switches are mounted on a mounting plate 95 secured to the crosshead. Each of these switches is of the same construction which is described in the aforementioned co-pending Dunn application wherein the switches are shown in Figures 10 and 14.

Each switch comprises a frame 96 of molded insulating material secured to the mounting plate. A pair of leaf springs 97 is secured by terminal screws to the frame. Protecting stops 98 are formed on each side of the frame, between which the contact springs extend. The movable contact comprises a lever 100 pivotally mounted on a pin supported on the frame and having its upper end 101 bent toward the contact springs. A bridging member in the form of an angle 102 is secured to the bent end of the lever. The lever is biased by a spring 104 in position where member 102 bridges the contact tips of the contact springs. The lever is channel shaped and lugs are formed on the sides of the channel to form a support for the pivot pin of operating roller 105. This roller is positioned in the path of movement of cam 106 secured to distance advance panel 60, the arrangement being such that with the car stopped at the floor the rollers of both switches are engaged, causing these switches to be open.

Reference may now be had to Figures 2, 5, 6, 7 and 8. The distance advance crosshead 60 is guided in its movement on the cylindrical tube 72 and on another cylindrical tube 110, also extending between the top and base plates of the selector. An aperture 111 is provided in the crosshead through which tube 72 extends. Guide shoes 112 engage tube 110, these guide shoes being held in place by screws 107 extending through arms 108 and 109 formed by bifurcating the crosshead, the screws being held in position by lock nuts.

The distance advance crosshead carries a pair of oppositely disposed pawls 113 and 114 for co-operating with stopping lugs 115 mounted on an elongated rod 116. Each pawl is pivotally mounted on a pivot pin 117 extending from a bracket 119 secured to the crosshead. Each pawl is provided with a spring 118 for biasing it into position for cooperation with the stopping lugs. Lug 120 formed on each pawl cooperates with bracket 119 to limit the outward movement of the pawl.

The stopping lugs 115 are carried by collars 121 adjustably mounted on rod 116. A stopping lug is provided for each floor, the collars being in spaced relation on rod 116 in accordance with the distance between the floors for which they are provided. The collars are split to permit adjustment and clamping thereof to the rod, the collars being clamped in adjusted positions by bolts 122. Each stopping lug is provided with a threaded stem 123 which extends through an aperture 124 in supporting arm 125 formed on the collar. A shoulder 126 is formed on this arm, against which the lug fits to prevent rotative movement thereof. The lug is clamped in its proper position by means of a nut 127 on the threaded end of the stem.

Figure 4:
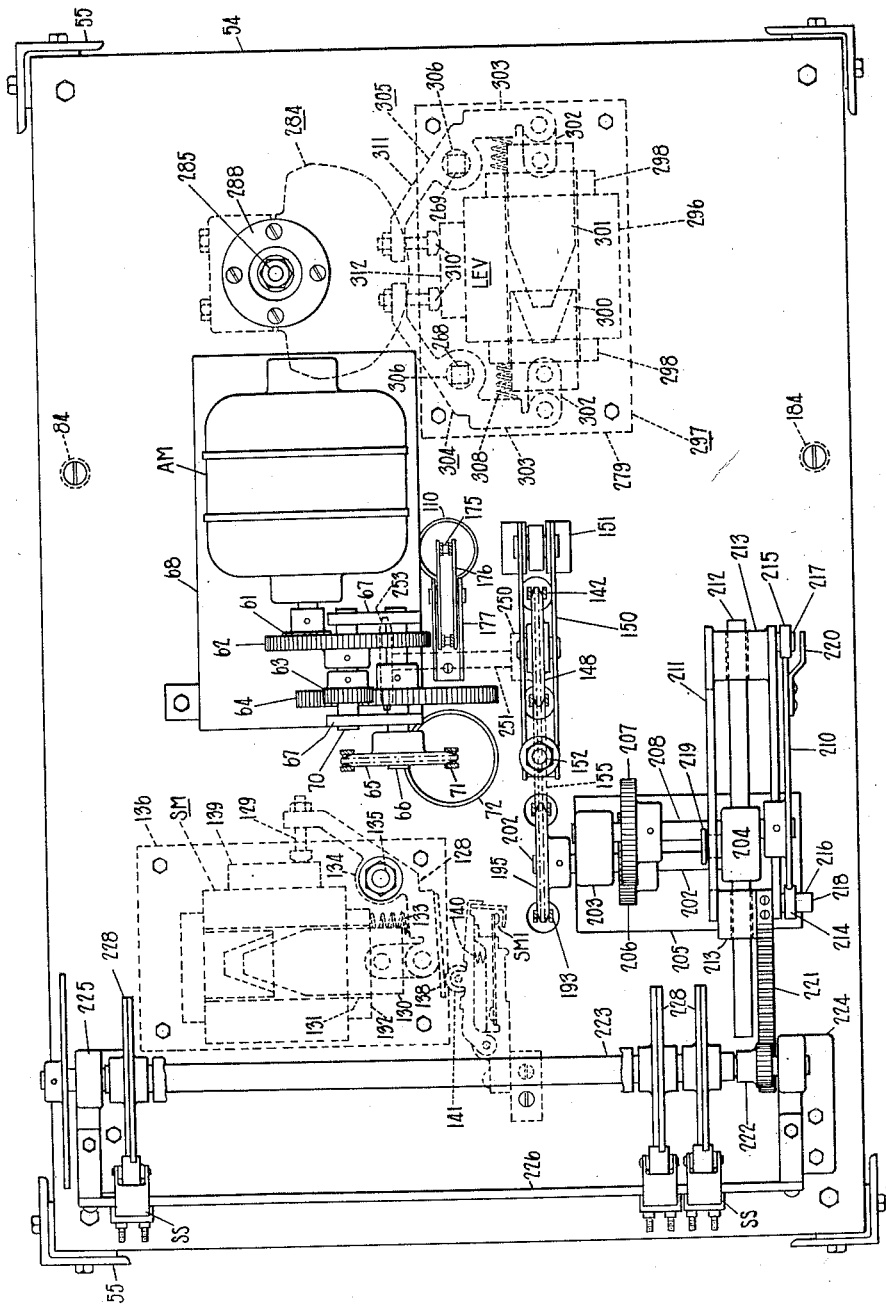
Figure 4 is a view of the mechanism mounted on the top plate of the selector machine.

The stopping lugs are retracted during movement of the crosshead into position where the pawls clear the lugs. The lugs are maintained retracted until the car arrives at a certain distance from the landing at which a stop is to be made. When this condition is reached, the lugs are released and move into position for cooperation with the pawls. This operation is controlled by an electromagnet, hereinafter termed the pawl magnet and designated SM, mounted on the bottom of top plate 54. This magnet, as shown in Figures 2 and 4, operates a lever 128 pivotally connected to the movable core 130 which extends into the magnet through an aperture 131 in the magnet frame 132. The lever is biased to unattracted position by a spring 133 arranged between the lever and the magnet frame. A screw 129 adjustably mounted on the other end of the lever engages an abutment 139 extending between the top and bottom plates of the magnet frame to limit the movement of the lever by spring 133. The lever is formed on a sleeve 134 secured as by a pin to a pivot shaft 135 rotatably mounted in the top and bottom plates 136 of the magnet frame. The pivot shaft extends below the magnet frame, where it is secured by bolt 137 to the rod 116, the rod in turn being pivoted in the base plate 53 of the selector.

A bar 138 secured to lever 128 controls the operation of pawl magnet switch SM1. This switch, which is of the same construction as the switch shown in Figure 9, is pivotally mounted on selector top plate 54 and is biased by spring 140 to closed position. Operating roller 141 of the switch is engaged by bar 138 when the pawl magnet is deenergized to maintain the switch in open position against the force of spring 140.

Upon energization of the pawl magnet its movable core is pulled inwardly or clockwise as viewed in Figure 2 causing clockwise rotative movement of lever 128. This moves bar 138 away from roller 141 permitting spring 140 to close switch SM1. It also rotates rod 116 clockwise, which retracts the stopping lugs into position where they are clear of the pawls. When this has been done, the distance advance crosshead is free to move.

The distance advance crosshead is driven from the selector drive shaft 48 through the intermediary of a sprocket chain 142. This chain is driven by a sprocket wheel 143 which is secured to a shaft 144. As shown in Figure 3, this shaft is supported by bearing stands 145 mounted on selector base plate 53. The shaft is driven by a bevelled gear 146 secured to the shaft, this gear in turn being driven by a small bevelled gear 147 secured to selector drive shaft 48. Thus sprocket wheel 143 is driven clockwise, as viewed in Figure 2, during upward car movement and counterclockwise during downward car movement.

Sprocket chain 142 is an endless chain extending upwardly from sprocket wheel 143 around an idler sprocket wheel 148 above the top plate of the selector. This wheel is rotatably mounted on lever 150, in turn pivoted to bracket 151 secured to top plate 54. The opposite end of the lever is held between two nuts arranged on an adjusting screw 152 secured to top plate 54, this arrangement being provided to take up any slack in the chain.

Chain 142 engages a sprocket wheel 155 pivotally mounted on a stub shaft 156 secured to a plate 157 which, in turn, is secured to distance advance crosshead 60, as shown in Figures 6, 7 and 8. A bushing 158 is provided in an aperture in the sprocket wheel to form a bearing. The chain is maintained in meshing relationship with the sprocket by a shoe 160 secured to plate 157. A clutch device 161 is provided to hold sprocket 155 against rotative movement with respect to stub shaft 156. This clutch comprises two discs 162 and 163 with a ring 164 of brake lining material arranged between them. The inner disc 162 is secured as by screws to the sprocket wheel 155. It is provided with an annular shoulder 165 to locate the ring 164. The outer disc 163 is formed with a pair of lugs 166 which straddle a pin 167 secured to plate 157. This prevents the rotative movement of disc 163 with respect to stub shaft 156, while allowing linear movement of the disc on the shaft. The discs and ring are pressed together by the spring 168 arranged on the stub shaft between a spring seat 170 and a boss 171 formed on disc 163. A cotter pin 172 holds spring seat 170 in position to maintain spring 168 in a state of compression. With this arrangement, upon movement of sprocket chain 142, rotation of sprocket wheel 155 is prevented by the clutch device so that the distance advance crosshead 60 is carried along with sprocket chain 142 in accordance with movement of the elevator car.

As shown in Figure 2, a chain 175 is adjustably secured at one end to the top of distance advance crosshead 60, from which it extends upwardly to and around an idler pulley 176 pivotally mounted on a bracket 177 secured to top plate 54. From this pulley, the chain extends downwardly through cylindrical tube 110 to and around another idler pulley 178 pivotally mounted on a bracket 180 secured to the bottom of base plate 53 and thence upwardly to the bottom of crosshead 60 to which the other end is adjustably secured. A counterweight (not shown) for the distance advance crosshead is provided within tube 110 and connected to this sprocket chain.

The distance advance crosshead carries a frame 182 similar to frame 82 and carrying a plurality of circuit controlling elements for cooperating with stationary circuit controlling elements on floor bars 183, one for each floor served by the car. These floor bars are spaced in accordance with the distance between the floors for which they are provided and are mounted on rods 184 secured to the bottom and top plates of the selector machine. These floor bars are of the same construction and are secured in the same way to the rods as floor bars 83. Also, spring contacts are mounted on these floor bars the same as on floor bars 83. Four spring contacts are arranged on each floor bar (see Figure 5). Two of these contacts are of the same construction as spring contact 193 of the aforementioned co-pending Dunn application. The other two contacts are arranged for mutual co-operation and are of the same construction as spring contacts 186 and 187 of the aforementioned co-pending Dunn application. The spring contact designated 1PR serves as the first pre-retardation control contact for the floor for which it is provided. The spring contact designated 2PR serves as the second pre-retardation control contact for the floor for which it is provided. The remaining mutually cooperating spring contacts, which are designated AS, serve as auxiliary starting relay control contacts for the particular floor for which they are provided.

The crosshead frame 182 which carries the elements contacting with the spring contacts just referred to is secured to the distance advance crosshead by means of straps 190 and is provided with a panel hereinafter termed the distance advance panel. Referring to Figure 11, this panel, as in the case of the motor advance panel, is arranged in duplicate sections 192 in abutting relationship. The contacts are mounted on these sections the same as the contacts on section 92. Two spaced contacts are provided for engaging spring contacts 1PR, one effective for up car travel and one effective for down car travel. The up contact is designated 1UPB and will hereinafter be referred to as the first up pre-retardation brush. The down contact is designated 1DPB and will hereinafter be referred to as the first down pre-retardation brush. Two spaced contacts are provided for engaging spring contacts 2PR, one effective for up car travel and one effective for down car travel. The up contact is designated 2UPB and will hereinafter be referred to as the second up pre-retardation brush. The down contact is designated 2DPB and will hereinafter be referred to as the second down pre-retardation brush. One of the spring contacts AS for each floor is provided with an outer contact tip which is engaged by an elongated contact designated ASB mounted on one of panel sections 192. This contact will hereinafter be referred to as the auxiliary starting relay control brush.

Sprocket wheel 155 meshes with another sprocket chain 193 arranged on the side of the sprocket wheel opposite from chain 142. Chain 193 is maintained in meshing relationship with the sprocket by shoe 194 secured to plate 157. The chain is an endless one, extending around sprocket wheels 195 and 196 at the top and bottom respectively of the selector machine. Sprocket wheel 196 is rotatably mounted on lever 197, in turn pivoted to bracket 198 secured to base plate 53. The opposite end of the lever is held between two nuts arranged on an adjusting screw 200 secured to base plate 53, this arrangement being provided to take up any slack in the chain.

Referring to Figure 4, sprocket wheel 195 at the top of the selector is mounted on a shaft 202 rotatably supported in bearing stands 203 and 204 provided on base 205 secured to top plate 54. Ratio gears 206 and 207 are provided for transmitting the rotation of shaft 202 to another shaft 208 also supported in bearing stands 203 and 204, gear 206 being secured to shaft 202 and gear 207 being secured to shaft 208. Arranged on the other end of shaft 208 beyond bearing stand 204 is a uniform motion cam 210, the contour of which is shown in Figure 2. This cam is arranged to effect linear movement of a frame 211 through the intermediary of rollers 214 and 215 pivotally mounted on the frame. This frame slides on a rod 212 secured to bearing stand 204. The frame comprises two side plates connected by yokes 213. These yokes are provided with apertures through which rod 212 extends. A screw 219, extending through a slot in one of the side plates and secured to stand 204, prevents the frame from turning on the rod. The rollers are mounted on stub shafts 216 and 217 secured to frame 211. Stub shaft 216 has an extension 218, which is to be engaged by stop member 220 secured to cam 210 to bring the cam to a stop, upon its rotation in either direction from the neutral position illustrated in Figure 2 through an angle slightly less than 180°.

With this arrangement, movement of distance advance crosshead 60 by chain 142 causes movement of chain 193 along with the crosshead. This causes rotation of cam 210 through sprocket wheel 195 and ratio gears 206 and 207 in a direction from neutral depending upon the direction of movement of the distance advance crosshead. Upon the engagement of stop member 220 with extension 218, cam 211 is brought to a stop, which brings chain 193 to a stop. Continued movement of chain 142 causes sprocket wheel 155 to roll on chain 193 as a rack, clutch 161 yielding to permit rotation of sprocket wheel 155 on shaft 156. Thus, after movement of chain 193 is stopped by the engagement of stop member 220 with extension 218, continued movement of the distance advance crosshead takes place at half the speed of chain 142 instead of the same speed as it did prior to the stopping of chain 193.

Uniform motion cam 210 is utilized to effect the operation of a plurality of switches arranged on the top of the selector machine. A rack 221 is secured to frame 211 so as to move linearly therewith. This rack engages a pinion 222 arranged on a cross shaft 223 supported by bearing stands 224 and 225 secured to top plate 54. The switches are operated by cams arranged on the cross shaft to be operated by the rack and pinion. These switches are mounted in spaced relationship on a cross bar 226 extending between and supported by bearing stands 224 and 225. The switches are of the same construction as that illustrated in Figure 9, seven of them being provided with making contacts and four of them with breaking contacts. The making contacts are provided by placing the contact tip on the end of the contact spring 97 on the other side, and shortening the angle member 102 so as to be in position to engage and bridge the contact tips on operation of the switch. Such construction is illustrated in Figure 16, which will be referred to later. These switches are principally for controlling acceleration and retardation of the elevator car and will hereinafter be referred to as selector switches.

By effecting rotative movement of shaft 223 upon which the operating cams for the selector switches are mounted, by a uniform motion cam, the motion of shaft 223 is effected in direct proportion to the movement of the distance advance crosshead and therefore to the movement of the elevator car. Also, shaft 223 is rotated in the same direction by this cam during its movement from neutral position, regardless of the direction of rotation of the cam and therefore regardless of the direction of travel of the car. The size of pinion 222 is chosen so that shaft 223 rotates at twice the speed of shaft 208. Thus nearly a full revolution of shaft 223 is effected before the uniform motion cam is brought to a stop. This is an advantage in setting the operation of the selector switches. Also, with this arrangement cams of uniform construction can be employed for operating all the switches. A pair of cams 228 are provided for each switch, these cams being arranged on shaft 223 in position to engage the operating rollers of the switches for which the cams are provided. Each cam is a 180° cam, provided with a split hub, a screw extending across the split portion of the hub being provided to clamp the cam to the shaft. Such arrangement is shown in Figure 15 in connection with another portion of the mechanism, wherein the split hub is designated 327 and the screw 328, this mechanism being described later. Inasmuch as shaft 223 is rotated in the same direction for each direction of car travel, a correct setting of each cam for one direction of car movement is correct for the opposite direction of movement.

In the control system which will be described later, only a certain number of the selector switches which may be provided on the top of the selector are utilized. A sequence diagram for the switches utilized is indicated in Figure 10. Each of these switches is designated by the letters SS with a numeral appended thereto to differentiate between them. These switches, being operated in accordance with the movement of the elevator car, are operated when the car reaches points certain distances from the floor as the car leaves that floor in starting. These distances are determined by the setting of the cams, in turn determined by the particular control operations performed. As will be shown later, reverse operation of these switches takes place during stopping of the car at a floor as the car reaches points the same distances from this floor as the distances of the points at which these switches operated during starting from the floor from which the car started.

Selector switches SS3, SS4 and SS5 control the acceleration of the car while these switches and switches SS1 and SS2 control retardation. Switch SS7 controls the operation of the brake under certain conditions. Switches SS8 and SS9 control the effectiveness of the first and second pre-retardation brushes. Switch SS11 controls the automatic opening of the hatchway door and car gate in stopping. Switch SS12 controls initiation of slow down from a full speed run. Switch SS13 controls the circuits for certain of the accelerating switches. The actual setting of the switches is determined by the particular installation. In the control system illustrated in Figures 22, 23, 24 and 25, it has been found that for certain apparatus and a full speed of 800 feet per minute the cams may be set to operate their switches substantially as follows: switch SS1 upon 6° of rotative movement of the operating cams out of neutral; switch SS2 upon 27° of rotative movement; switch SS3 upon 43° of rotative movement; switch SS4 upon 95° of rotative movement; switch SS5 upon 186° of rotative movement; switch SS7 upon 1° of rotative movement; switch SS8 upon 28° of rotative movement; switch SS9 upon 75° of rotative movement; switch SS11 upon 18° of rotative movement; switch SS12 upon 308° of rotative movement; and switch SS13 upon 10° of rotative movement. The uniform motion cam is brought to a stop after approximately 315° of rotative movement of the cams. For 800 feet per minute full operating speed of the car, this 315° movement of the cams is effected in 25 feet of car travel, the ratio of gears 206 and 207 being chosen so that for a given size sprocket wheel 195 this relationship is obtained.

The distance advance crosshead carries cam members 230 and 231 for operating switches carried by the synchronous crosshead 58. These cam members are secured to the top and bottom of frame 182. The switches operated by these cam members are of the same construction as those illustrated in Figure 9 and therefore will not be described. One of these switches is effective for upward movement of the distance advance crosshead and the other for downward movement. These switches will be hereinafter referred to as up distance advance switch DAU and down distance advance switch DAD. These switches are mounted on the panel mounting frame 232 carried by the synchronous crosshead.

The synchronous crosshead comprises an upper cross member 233 and a lower cross member 234 joined by side members 235 and 236. This crosshead is guided by the cylindrical members 72 and 110, an aperture 237 being provided in the top member of the crosshead and another aperture 238 being provided in the bottom member of the crosshead to receive cylindrical member 72. Both the top member and the bottom member of the crosshead are provided with guide shoes 240 for engaging tube 110, these guide shoes for each member being held in place by screws 241 extending through arms 242 and 243 formed by bifurcating this portion of the crosshead, the screws being held in position by lock nuts 244. Side member 236 is in the form of a channel and is secured to the arms 242 and 243 of the top and bottom members. The guide rod 75 for the motor advance crosshead is secured in lugs 245 formed on the top and bottom members of the synchronous crosshead. The guide bar 78 for the motor advance crosshead is secured in lugs 246 formed on the top and bottom members of the synchronous crosshead.

Side member 235 of the synchronous crosshead is in the form of a plate extending from the top and bottom members of the synchronous crosshead. The frame 232 is secured to this plate by means of a strap 247. Spring contacts of the same construction as spring contacts CP are mounted on floor bars 183. One of these contacts serves to control certain levelling operations upon an overrun and is designated OV. There is one of these contacts for each floor. The other spring contact controls direction and is designated CD, these contacts being provided only in the floor bars for the terminal floors. These spring contacts are adapted to be engaged by contacts mounted on duplicate panel sections 249 secured to frame 232. The contact for engaging spring contacts OV is designated OVB, while the contact for engaging spring contacts CD is designated CDB.

The synchronous crosshead is driven by chain 142. A sprocket wheel 250 is secured to a jack shaft 251 rotatably supported in the bottom member 234 of the crosshead. This sprocket wheel meshes with the left hand run of the chain, a shoe 252 being secured to the bottom member of the crosshead in position to maintain the chain in meshing relationship with the sprocket wheel. Secured to the other end of shaft 251 is a similar sprocket wheel 253. On the right hand side as viewed in Figure 2, this sprocket wheel meshes with a stationary chain 254, a shoe 256 being secured to the bottom member of the crosshead in position to maintain the chain in meshing relationship with the sprocket wheel. This chain is secured to and extends between base plate 53 and top plate 54 of the selector, adjusting screws 255 being provided to secure the chain to the plates. With this arrangement, upon movement of drive chain 142, sprocket wheel 253 is driven through sprocket wheel 250 and shaft 251, causing it to roll on stationary chain 254 as a rack. This movement occurs in the same direction as the movement of the left hand run of chain 142 as viewed in Figure 2, but at one-half the speed. The floor bars, as previously pointed out, are spaced in accordance with the distances between the floors for which they are provided. The setting of the floor bars is in accordance with the ratio of the movement of the synchronous panel with respect to the movement of the elevator car. Thus, from the standpoint of the setting of the floor bars, the distance advance crosshead initially moves at twice the speed of the elevator car until stop member 220 on the uniform motion cam 210 engages extension 218 of the stub shaft 216. From then on, due to the slipping of clutch device 161, the distance advance panel moves at the same speed as the elevator car, in unison with the synchronous panel.

When the car is stopped at a floor all the crossheads and therefore all the panels are in neutral position with respect to the floor bar for the floor at which the car is stopped. In the control system illustrated, in starting the car, the advancer motor is energized, prior to the starting of the car, to move the motor advance panel upwardly if the car is being started in the up direction, and downwardly if the car is being started in the down direction. Movement of the motor advance panel takes place rapidly. During the initial movement of the motor advance panel, the motor advance switch for the corresponding direction of travel is closed by the disengagement of its operating roller from cam 106. If the car is being started in the up direction switch MAU is closed and if the car is being started in the down direction switch MAD is closed. The closing of either switch causes the energization of pawl magnet SM to retract the stopping lugs, which frees the distance advance panel for movement. Upon the motor advance crosshead engaging its stopping collar, the advance of the motor advance panel is discontinued. This preferably takes place before the car is actually started.

As the car starts, the synchronous panel and the distance advance panel are both moved in the direction in which the car is started, the synchronous panel moving in accordance with the speed of the elevator car with respect to the floor bars and the distance advance panel moving at twice car speed with respect to the floor bars. Movement of the synchronous panel permits movement of the motor advance panel to keep the motor advance crosshead against its stop. As relative movement of the distance advance and synchronous panels takes place, distance advance switch DAU or DAD for the direction in which the car is moving is closed by the disengagement of its operating roller from cam member 230 or 231 respectively. Movement of the distance advance crosshead causes operation of the selector switches in sequence, thereby controlling the acceleration of the car in accordance with the distance the car moves. Assuming that a run is to be made which will permit the car to attain full speed, the distance advance panel continues its advance with respect to the synchronous panel until fully advanced, whereupon relative movement between the distance advance panel and the synchronous panel is stopped by the engagement of stop member 220 with extension 218. From this point on until a call is picked up, the three panels move as a unit at the same speed.

When a call is picked up the advancer motor is deenergized. A call is picked up by the engagement of brush CPB with an "alive" one of contacts CP or by the engagement of up brush UHB during up car travel or down brush DHB during down car travel with an "alive" one of its cooperating stationary contacts. When the advancer motor becomes deenergized, the motor advance panel comes to a stop. This takes place very quickly, so that the motor advance panel comes to rest in neutral position with respect to the floor bar for the floor for which the call is picked up and the brushes on the panel are maintained in engagement with the contacts for the floor for which the call is picked up. The distance advance panel and synchronous panel continue to move in accordance with car movement, catching up with the motor advance panel.

Just before the distance advance panel catches up with the motor advance panel, the operated motor advance switch MAU or MAD is opened, which causes the deenergization of pawl magnet SM. This releases the stopping lugs 115 to extend them into the path of movement of the pawls. The stopping lug for the floor for which the call has been picked up is thereupon engaged by the pawl for the direction in which the car is travelling, pawl 113 serving as the up pawl and pawl 114 serving as the down pawl. This brings the distance advance crosshead to a stop. This is in neutral position with respect to the floor bar for the floor at which the stop is to be made, at which time the auxiliary starting relay control contacts AS for that floor are opened by their brush ASB.

Inasmuch as the car continues in motion after the distance advance crosshead is brought to a stop, chain 142 continues to drive the synchronous crosshead in accordance with movement of the elevator car. Owing to the fact that the distance advance crosshead is stopped, chain 142 also acts to rotate sprocket wheel 155 counter-clockwise as viewed in Figure 2 in case of up car travel and clockwise in case of down car travel, clutch device 161 yielding to permit this rotative movement. In doing so, sprocket wheel 155 drives the right hand run of chain 193 downwardly in case of up car travel and upwardly in case of down car travel. Considered from the standpoint of distance between floor bars, this occurs at twice the speed of the elevator car. Thus as the car continues its movement, the operated cams for the selector switches are gradually returned to neutral position, causing restoration of the selector switches to their former positions at distances from the floor at which the stop is being made corresponding to the distances from the floor from which the car was started that these switches were respectively operated. This causes the car to be slowed down, providing distance control of the retardation of the car. The final stopping of the car at the floor is controlled by the levelling mechanism, which will be described later. Just before the car reaches the floor, selector switch SS11 opens to cause the opening of the car gate and hatchway door. During this slow down operation, the synchronous crosshead, continuing its movement, gradually catches up with the distance advance and motor advance crossheads. Just before the car comes to a stop the operated distance advance switch DAU or DAD is opened. When the car is brought to a stop at the floor the synchronous crosshead also stops, this occurring with the synchronous panel in neutral position with respect to the floor bar for the floor at which the stop is being made.

It may happen that a call is picked up by a brush on the motor advance panel before this panel reaches fully advanced position. Under such circumstances the advancer motor is immediately deenergized, bringing the motor advance panel to a stop with its brushes in engagement with the stationary contacts for the floor for which the call is picked up. Upon the car being started, the synchronous panel and distance advance panel are moved by the car in the same manner as on the full speed run above described. However, when making a short floor run, the pre-retardation brushes PB, in cooperation with their respective stationary contacts for the floor for which the call is picked up, the effective pre-retardation brush being dependent upon the direction of car travel and the length of the run, act in advance of the point at which slow down begins to decrease the rate of acceleration. Just before the distance advance panel catches up with the motor advance panel, operated switch MAU or MAD opens, causing deenergization of the pawl magnet SM. The stopping lugs are released and the lug for the floor for which the call is picked up is engaged by the pawl for the direction in which the car is travelling. This causes reverse operation of the operated selector switches to slow down the car and finally bring it to a stop at the floor for which the call has been picked up. Thus on a short floor run as well as a full speed run distance control of acceleration and retardation is provided.

Reference may now be had to Figures 2, 4 and 5, which illustrate the mechanism for bringing the car to an exact landing level. This levelling mechanism is illustrated as arranged on the selector machine. The synchronous crosshead 58 carries a frame 260. The top and bottom members 261 and 262 of the frame are provided with vertically aligned apertures 263 to receive tubular members 264 and 265. These tubular members are rotatably mounted in the apertures, bushings (not shown) being provided in the apertures to form bearings for the tubular members. Sleeves 266 and 267 are secured as by screws 258 to tubular members 264 and 265 respectively. These sleeves are positioned between the top and bottom members of frame 260, thereby holding the tubular members in definite positions vertically with respect to the frame. The tubular members are arranged to slide vertically on square rods 268 and 269 extending between the top and base plates of the selector machine. These rods are rotatably supported in bearings provided in the base plate 53 and are likewise rotatably supported at the top through extension members which will be described later. Although the tubular members slide upon the rods as movement of the synchronous crosshead takes place, they cannot turn with respect to the rods, so that any pivotal movement of these members is imparted to the rods and any pivotal movement of the rods is in turn imparted to the tubular members.

Secured to bottom member 262 of the frame 260 is a bracket 270. This bracket extends downwardly from the frame and has mounted thereon eight switches arranged in columns of four each. These switches are of the same type as those illustrated in Figure 9, three of them in each column being spring biased to contact engaging position and the other in each column being biased into position with the contacts separated. The switches in the left hand column as viewed in Figure 2, designated L1U, L2U, L4U and L3U, serve as up levelling switches, while those in the right hand column, designated L1D, L2D, L4D and L3D, serve as down levelling switches. Each of the up levelling switches is provided with an operating cam 271 adjustably clamped to the tubular member 264. Each of the down levelling switches is provided with an operating cam 272 adjustably clamped to the tubular member 265. Each of these cams is of the same construction and comprises a lever 273 having a cam formation 274 on its outer end for engaging the operating roller 275 of the switch for which it is provided. The inner end of the lever and a yoke member 276 form a split hub which is clamped to the tubular member by screws 277.

Rotative movement of the tubular members to operate the levelling switches during the levelling operation is effected by operating arms 278 and 280 formed on sleeve members 266 and 267 respectively. Each arm is provided with a roller 281 at its outer end, this roller being supported by roller carrier 282 secured to the end of the arm by a screw 283. These operating arms are operated by a plurality of cams 284, one for each floor. These cams are arranged in spaced relation on a vertical shaft 285. This shaft is rotatably supported at its lower end by thrust bearing 286 arranged in bearing stand 287 secured to base plate 53. At the top this shaft is similarly supported in a bearing 288, the housing for which is secured to the top plate 54. This shaft is driven by shaft 48 through bevelled gears 290 and 291, gear 290 being pinned to shaft 48 and gear 291 being pinned to shaft 285.

The cams are spaced along the cam shaft so that the distances between adjacent cams are in accordance with the distances between the respective floor landings considered from the standpoint of travel of the synchronous crosshead 58. These cams are all similar in construction and each comprises a cam portion 292 and a yoke portion 293. Screws 289 extend through apertures in the yoke portion and are threaded into the cam portion to bind the cam to the cam shaft. The cam portion forms substantially a 180° cam. The radius of the working face 294 of each cam is a maximum at the central portion thereof and a minimum at the end portions. The end portions are bevelled at 295. Each of the cams is helical and has a pitch equal to the travel of the synchronous crosshead per revolution of the cam shaft. Each cam is set radially so that when the car is at rest at the floor for which the cam is provided, the operating rollers 281 on the ends of operating arms 278 and 280 are at points immediately adjacent the end portions 295 of the cam. As will be seen from later description, these rollers are disengaged from the effective surface of the cam at this time. The operating cams 271 and 272 for the levelling switches are set on the tubular members 264 and 265 respectively so as to cause, under these conditions, the contacts of levelling switch L1U, L2U, L4U, L1D, L2D and L4D to be separated and the contacts of levelling switches L3U and L3D to be engaged.

When the car is to be started, the square rod 268 is rotated counterclockwise and square rod 269 is rotated clockwise as viewed in Figure 2 to move the operating arms 278 and 280 into positions where the operating rollers carried thereby are clear of the levelling cams during operation of the car. The amount of this movement is sufficient to move the operating cams 271 and 272 for the up and down levelling switches respectively into positions to permit the closing of levelling switches L1U, L2U, L4U, L1D, L2D and L4D by their springs and the opening of levelling switches L3U and L3D by their springs. This movement of rods 268 and 269 is effected by the levelling magnet LEV.

The levelling magnet comprises a coil 296 mounted in a frame 297 secured beneath top plate 54 of the selector machine. This coil is arranged on a non-magnetic sleeve (not shown) held between the side plates 298 of the frame. The magnet is provided with movable cores 300 and 301. These cores are provided with telescopic ends and extend into the magnet coil. The outer ends of the cores are pivotally connected by links 302 to the arms 303 of the levers 304 and 305 for cores 300 and 301 respectively. These levers are secured to shafts 306 pivotally mounted in bearings provided in top plate 279 and bottom plate 299 of frame 297. The lower ends of these shafts are connected by bolts 307 to the upper ends of the square rods 268 and 269, these shafts forming the upper extensions of these rods and thereby providing pivoted support for the upper ends. Each of the levers is provided with a spring 308 for biasing the lever against the attraction of the levelling magnet for the movable cores. Adjustable stops 310 are provided on the ends of the other arms 311 of the levers. These stops engage an abutment 312 secured between the top and bottom plates of the magnet frame to limit the movement of the levers by their biasing springs.

When the car is at rest at a floor, the coil of the levelling magnet is not energized. Under such conditions, springs 308 hold levers 304 and 305 in positions with their stops in engagement with abutment 312. As a consequence, square rods 268 and 269 are held in positions with the operating rollers 281 on arms 278 and 280 in non-retracted positions, that is, at points immediately adjacent end portions 295 of the cam for the floor at which the car is positioned, but slightly disengaged therefrom. As previously pointed out, under such conditions the contacts of levelling switches L1U, L2U, L4U, L1D, L2D and L4D are separated and the contacts of levelling switches L3U and L3D are engaged.

The coil of the levelling magnet is energized upon the establishment of circuits incident to the starting of the car. Upon being energized, the levelling magnet acts to pull its cores 300 and 301 inwardly. This causes counterclockwise movement of square rod 268 and clockwise movement of square rod 269 as viewed in Figure 2, moving operating arms 278 and 280 into retracted positions, that is, where the operating rollers 281 carried thereby are clear of the levelling cams. The square rods also act through tubular members 264 and 265 to move operating cams 271 and 272 for the up and down levelling switches respectively into positions where the contacts of levelling switches L1U, L1U, L4U, L1D, L2D and L4D engage and the contacts of levelling switches L3U and L3D separate.

As movement of the car takes place, the operating arms 278 and 280 are moved by the synchronous crosshead in accordance with movement of the elevator car. Also, the levelling cams are rotated by shaft 285 in accordance with the movement of the car. The rollers 281 on the ends of arms 278 and 280 clear the cams for the floors at which no stops are made as they run by these cams. However, they are released for cooperation with the cam for the floor at which a stop is being made. When the car reaches a certain distance from such floor, the levelling magnet is deenergized. Springs 308 thereupon act to effect opposite movement of square rods 268 and 269, moving operating arm 278 clockwise and operating arm 280 counterclockwise as viewed in Figure 2. Assuming upward travel of the car, for example, deenergization of the levelling magnet occurs at such point that the roller on the end of up operating arm 278 engages the portion of the working face of the levelling cam for the floor at which the stop is being made which is of maximum radius. The roller on the end of the down operating arm 280, however, is not opposite the working face of the cam, so that it does not strike the cam, rotative movement of this arm being stopped by the engagement of adjustable stop 311 on lever 305 with abutment 312. As a result, the contacts of up levelling switches L1U, L2U and L4U are maintained engaged and those of up levelling switch L3U are maintained separated. The contacts of down levelling switches L1D, L2D and L4D, however, separate and those of down levelling switch L3D engage.

As the car arrives at a point still closer to the floor, the levelling cam reaches a position with respect to the roller on up arm 278 which permits the opening of levelling switch L1U. Just before the car arrives at the floor, the cam reaches a point which permits the opening of levelling switches L2U and L4U and the closing of levelling switch L3U. The operation of the levelling switches above described controls the operation of the car to bring it to a stop level with the landing. The manner in which this is effected will be described later. Should the car overrun the floor, the cam runs onto the roller on the end of down operating arm 280, causing the opening of levelling switch L3D and the closing of levelling switches L4D and L2D. This controls the operation of the car to return it to the landing. Just before it arrives at the landing, the levelling cam runs off the down roller, effecting the reopening of switches L4D and L2D and the closing of switch L3D. This brings the car to a stop which will be described later.

Reference may now be had to Figures 13, 14, 15, 16, 17 and 18, which illustrate the motion device. The motion device comprises a plurality of switches operated by cams driven from selector drive shaft 48. These switches are mounted on an inverted channel member 315 secured to the bottom of selector base plate 53 and extending therefrom in a direction parallel to drive shaft 48. A plate 316 is secured to the inner leg of this channel member as by screws 319, and extends upwardly therefrom. Three of the motion device switches, designated MD1D, MD1U and MD2, are mounted on this plate. These switches are of the same construction as those illustrated in Figure 9, the frame 317 of each switch being secured to plate 316 as by screws 318. Switches MD1U and MD1D are provided with breaking contacts as illustrated for contacts MD1D in Figure 15. Switch MD2 is provided with making contacts, this switch being similar to the switches illustrated in Figure 16.

Another plate 320 is secured to the top of channel member 315 as by bolts 321. A pair of brackets 322 is secured to the top of this plate, the other two motion device switches being mounted on these brackets. These switches, designated MD3U and MD3D, are of the same construction as those illustrated in Figure 9, except that they are provided with making contacts instead of breaking contacts and that instead of having two contact springs each switch is provided with one spring contact finger 314 on one side and a similar contact finger 324 on the other side but of rigid instead of spring material (see Figure 17), so as to form a stop. The contact tips on the ends of these fingers are bridged by angle member 323 when the switch is operated.

The cams for operating the motion device switches are mounted on shaft 325 driven from selector drive shaft 48. The cams for operating motion device switches MD1D, MD1U and MD2 are designated 326 and are of the same construction as those employed to operate the selector switches. Each cam is a 180° cam provided with a split hub 327, screw 328 being provided across the split portion of the hub to clamp the cam to the shaft. The cams for operating motion device switches MD3U and MD3D are respectively designated 330 and 331. Each of these cams is in the form of an arm 332 formed on a hub 333 provided with an aperture through which shaft 325 extends. The hubs are clamped onto the shaft by screws 334.

Shaft 325 is driven from shaft 48 through a clutch device 335. This clutch comprises two discs 336 and 337, with a ring 338 of brake lining material arranged between them. Shoulders 339 are formed on the inner faces of these discs to hold the brake lining in place. Disc 336 is secured to shaft 48, while disc 337 is secured to shaft 325, these discs being secured to their respective shafts as by pins 329 extending through hubs on the discs. The hub 340 on disc 337 abuts against a shoulder formed on shaft 325. The reduced portion 341 on the end of shaft 325 extends into a bearing sleeve 342, secured in the aperture in disc 336 to provide a bearing to support shaft 325 for rotative movement with respect to shaft 48. The other end of shaft 325 is rotatably supported by a bearing in bearing stand 343 secured to plate 320.

When the car is in operation the clutch discs are pressed against the ring 338 by a magnet which will hereinafter be termed the motion device clutch magnet and designated MD. This magnet comprises a coil 344 mounted in a frame 345 secured to the top of channel member 315. This coil is arranged on a magnet sleeve (not shown) held between side plates 346 of the frame. The magnet is provided with a stationary core 347 and a movable core 348 arranged to fit within the stationary core in a telescopic relationship. The outer end of the movable core is connected by link 350 to an arm 351 secured to the lever 352 as by screws 353. This lever is secured to a shaft 354 pivoted in the top and bottom plates of the frame and is biased to unattracted position by a spring 359 extending between the lever and the side plate of the frame. The outer end of the lever is provided with an adjustable abutment screw 355 which engages an abutment 356 secured between the top and bottom plates of the magnet frame to limit the amount of movement of the lever by its biasing spring. Brass plates 349 are secured to the face of the abutment to prevent the lever from sticking in biased position. Similar arrangements (not shown) are provided for the pawl and levelling magnets. A bracket 357 is secured to the outer end of the lever as by screws 358. An adjustable abutment screw 360 is secured to the outer end of the bracket, the head of this abutment screw being adapted to engage an abutment cap 361 on the end of shaft 325, this cap being provided with a thrust bearing not shown.

A centering device 365 is provided for centering the operating cams when the motion device clutch magnet is deenergized. This centering device comprises a torsion spring 366 arranged on a sleeve 367 on shaft 325. The ends 368 and 370 of this spring extend upwardly to be engaged by an operating pin 371 secured to a lever 372 secured to shaft 325. A stationary pin 373 is secured in the top of bearing stand 343 and extends beneath pin 371 in parallel relationship thereto. Grooves 374 are provided in these pins at their ends to receive the ends of the torsion spring. Each end of the torsion spring extends under pin 373 and then up on the other side of the pin 371, thereby positioning the ends of the spring on opposite sides of the pins in position for operating pin 371 to wind up the spring upon rotative movement of shaft 325. That is, if shaft 325 rotates in a clockwise direction as viewed from the right hand end of the shaft in Figure 13, the end 368 of the torsion spring is moved clockwise by operating pin 371, while end 370 of the spring is held stationary by pin 373, thereby increasing the tension in the spring. Similarly, if the direction of movement of shaft 325 is counterclockwise as viewed from the right hand end of the shaft, end 370 of the torsion spring is moved counterclockwise by operating pin 371 while end 368 of the spring is held stationary by pin 373. This again winds up the torsion spring to increase the tension. Thus upon shaft 325 being released, this shaft is returned to neutral position.

Circuits are established to energize the clutch magnet incident to the starting of the car. Upon energization, the clutch magnet pulls lever 352 counterclockwise as viewed in Figure 14. This pushes abutment screw 360 against the abutment cap 361 on the end of shaft 325, thereby forcing clutch disc 337 toward clutch disc 336. Thus upon the starting of the car, shaft 48 acts through the clutch device to rotate shaft 325 in a direction corresponding to the direction of car movement. If the direction of movement of the car is up, the operating cam for switch MD1U engages the switch operating roller to open the switch contacts as soon as rotative movement of the shaft takes place, while if the movement of the car is down the operating cam for switch MD1D engages the switch operating roller to open the switch contacts as soon as rotative movement of the shaft takes place. Two cams are provided for operating switch MD2, one for engaging the switch operating roller to close the switch contacts upon starting the car in the up direction and the other upon starting the car in the down direction. These cams are set to close contacts MD2 after the opening of contacts MD1U or MD1D. In the installation previously mentioned in referring to the setting of the selector switches, the cams are set to close the contacts of switch MD2 after about five inches of car travel. Continued rotative movement of shaft 325 causes the closing of either switch MD3U or MD3D, depending upon the direction of car travel. For example, if the direction of car travel is up, cam 330 closes switch MD3U, while if the direction of car travel is down, cam 331 closes switch MD3D. In the installation above referred to, the cams are set to close their respective switches upon about eighteen inches of car travel. The side of the operating arm of the cam engages the operating roller for the switch in closing the switch contacts, and as soon as the contact bridge engages the contact tip on the end of the contact finger 324 of rigid material, the cam and therefore shaft 325 is brought to a stop, the clutch discs slipping during the remainder of the operation of the car to maintain the cams in their operated positions.

The torsion spring 366 is wound up during the rotative movement of shaft 325, thus storing up energy to return the shaft to its neutral position upon the deenergization of the clutch magnet coil. This magnet is deenergized when the car comes to a stop at a landing, whereupon the torsion spring centers the shaft and permits the return of the switches to their neutral condition.

The terminal stopping switch, shown in Figure 1, is employed to insure the stopping of the car at the terminal floors. This switch comprises a plurality of individual switches operated by cams arranged on a shaft operated by the switch operating arm. The relationship of these switches and their operating cams is schematically illustrated in Figure 19, wherein the individual switches are designated TM1, TM2, TM3, TM4, TM7, TMD8 and TMU8 and the cams are designated 375. The switches may be of the same construction as those illustrated in Figure 9 with their operating rollers positioned to be engaged by their respective cams. Switches TMD8 and TMU8 each have one operating cam. Each of the other switches is provided with two cams arranged side by side in position to engage the operating roller of the switch for which the cams are provided, one for operating the switch when the operating arm 376 of the switch is thrown in one direction and the other when the operating arm is thrown in the other direction. The cams are 180° cams of the same construction as those provided for operating the selector switches and the motion device switches.

In the control system to be described, switch TM7 is employed to insure the opening of the circuit controlled by selector switch SS12, switch TM2 is employed to insure the opening of the circuit controlled by selector switch SS5, switch TM3 is employed to insure the opening of the circuit controlled by selector switch SS4, switch TM4 is employed to insure the opening of the circuit controlled by selector switch SS3 and switch TM1 is employed to insure the opening of the circuit controlled by selector switch SS1, one of the operating cams for each switch being effective to operate the switch at the upper terminal and the other cam at the lower terminal. Switch TMD8 is opened by its cam as the car arrives at the lower terminal to insure the opening of the down direction circuit, while switch TMU8 is opened by its cam as the car arrives at the upper terminal to insure the opening of the up direction circuit.

The cams and their switches are illustrated in Figure 19 in the positions which they assume with the car at the lower terminal floor. When the car leaves this floor the centering springs 377 gradually move the operating arm 376 back to neutral as the operating roller 378 runs up the lower terminal cam 380, closing switches TMD8, TM1, TM4, TM3, TM2 and TM7 in the order named. The operating arm remains in neutral position until the roller engages the upper terminal cam as the car approaches the upper terminal. When this takes place the operating roller is moved gradually clockwise until, upon the arrival of the car at the upper terminal floor, it reaches the position indicated by dot-dash lines As this movement takes place, switches TM7, TM2, TM3, TM4, TM1 and TMU8 are opened in the order named. As the car leaves the upper terminal floor, the centering spring gradually moves roller 378 back to neutral, closing switches TMU8, TM1, TM4, TM3, TM2 and TM7. The operating arm remains in neutral until the car approaches the lower terminal, whereupon the roller engages cam 378 to gradually move the operating cams into the positions illustrated in Figure 19, opening switches TM7, TM2, TM3, TM4, TM1 and TMD8.

Figure 20:
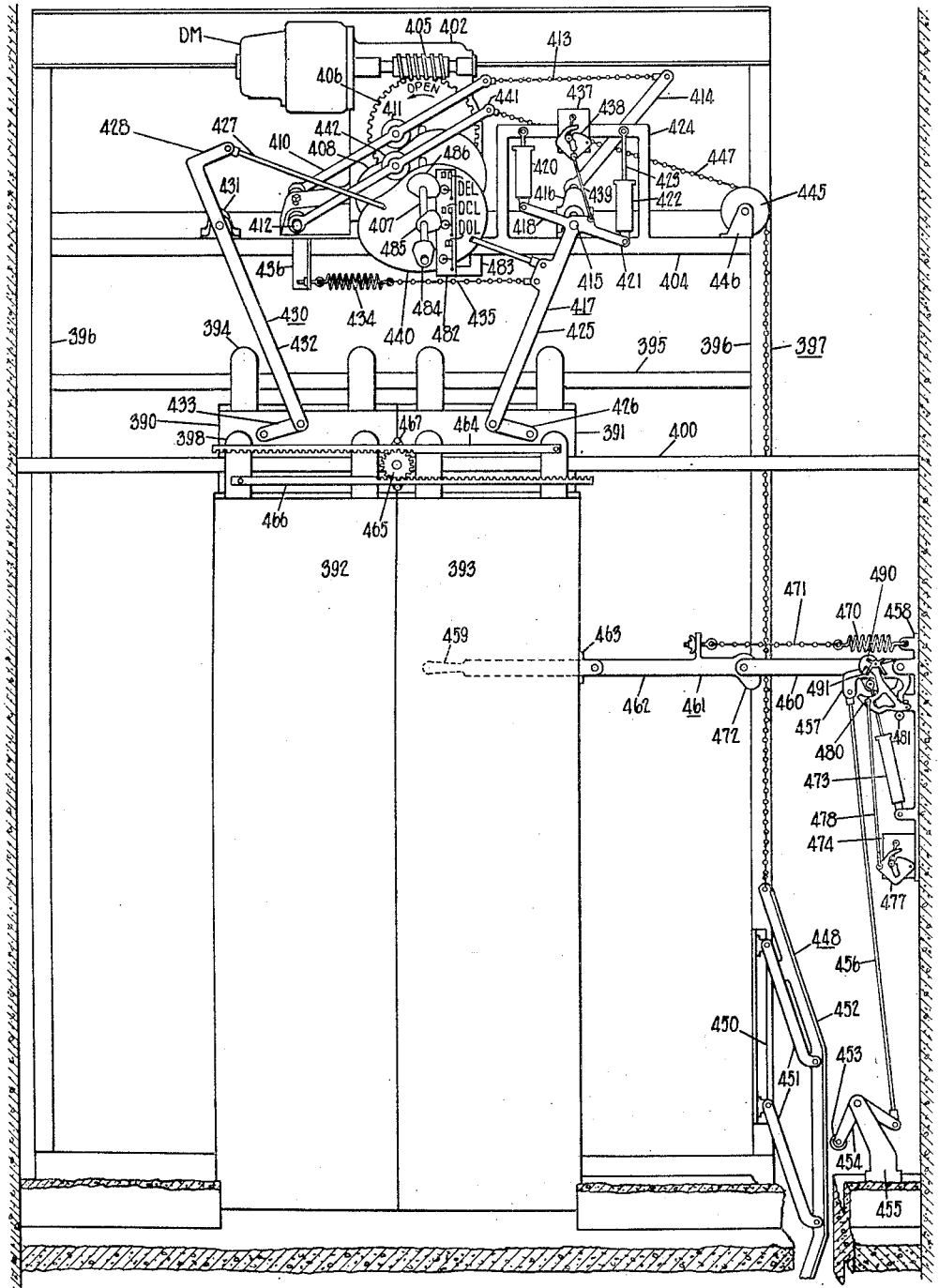
Figure 20 is a schematic representation of door and gate operating mechanism.

In the control system illustrated, the car gate and hatchway doors are power operated. Suitable mechanism for operating the gate and doors is schematically illustrated in Figure 20. Both the car gate and hatchway door are illustrated as solid panel bi-parting doors, the panel sections of the car gate being designated 390 and 391 and the panel sections of the hatchway door being designated 392 and 393. A pair of spaced hangers 394 is provided for each section of the car gate, these hangers being provided with rollers which run on track 395 extending between uprights 396 of the car framework 397. Spaced hangers 398 are also provided for each of the hatchway door sections, these hangers being provided with rollers for rolling on track 400 extending from the side walls of the hatchway.

The door and gate are operated by motor DM secured to a casing 402 mounted on a cross member 404 of the car framework. This motor operates through a worm 405 to drive a gear 406 secured to a shaft 407 pivotally mounted in the casing. A cam 408 is secured to shaft 407. This cam operates a lever 410 through the intermediary of a roller 411 secured to the lever at an intermediate point in position to roll on the face of the cam. Lever 410 is pivotally mounted on one end of a shaft 412 secured in an extension of casing 402. At its other end this lever is connected by a chain 413 to the end of a second lever 414. This latter lever is secured to a shaft 415 pivotally mounted in a stand 416 secured to cross member 404. On the other end of shaft 415 is secured a T-shaped lever 417. The arm 418 of this lever is pivotally connected to the cylinder of a check 420 while the arm 421 of the lever is similarly connected to the cylinder of a check 422. The piston rods 423 of these checks are pivotally connected to a frame 424 extending upwardly from cross member 404. Arm 425 of lever 417 is connected to section 391 of the car gate through a link 426. At a point intermediate its ends, this arm is connected by a tie-rod 427 to the bent arm 428 of another lever 430. Lever 430 is pivotally mounted in the stand 431 secured to cross member 404. The other arm 432 of this lever is connected to the other section 390 of the car gate through a link 433. A spring 434 is connected at one end through a chain 435 to arm 425 of lever 417 and at the other end is adjustably connected to a bracket 436 secured to cross member 404. This spring is provided to bias lever 417 for clockwise movement about its pivot and to bias lever 430 through tie-rod 427 for counterclockwise movement about its pivot.

A switch is mounted in housing 437 secured to frame 424. The switch is provided with an operating cam 438 having a cam-shaped slot into which extends the roller on the end of the operating arm of the switch. Cam 438 is connected by tie-rod 439 to arm 418 of lever 417. This switch has two pairs of contacts which will be hereinafter termed gate contacts and will be referred to in connection with the wiring diagram.

Another cam 440 is secured to shaft 407. This cam operates lever 441 through the intermediary of a roller 442 secured to the lever at an intermediate point in position to roll on the face of the cam. This lever is pivotally mounted on the other end of shaft 412. At its other end this lever is connected by a chain 447 to a retiring cam 448, the chain passing over an idler pulley 445 pivotally mounted on a bracket 446 secured to cross member 404.

The retiring cam is provided with a mounting plate 450 secured to upright 396 of the car framework. A pair of parallel links 451 are pivotally mounted on brackets secured to plate 450 and are pivotally connected at their outer ends to the cam plate 452. The cam plate is adapted when extended to engage roller 453 of bell crank lever 454 pivotally mounted on bracket 455 secured to the building structure. The other arm of this bell crank is connected by tie-rod 456 to an operating lever 457 pivotally mounted on a bracket 458 secured to the hatchway wall. This lever is adapted when pushed upwardly to engage and operate the arm 460 of the toggle lever 461. This arm is pivoted at one end to bracket 458 and at the other end is pivotally connected to the second arm 462 of the toggle lever, in turn pivotally connected to bracket 463 secured to door section 393. An operating handle 459 is provided on the end of arm 462. When lever 457 is pushed upwardly it breaks the toggle and pulls door section 393 to the right. Door section 393 moving to the right acts through a rack 464 connected to the right hand hanger of section 393, a pinion 465 pivotally mounted on track 400, and a similar rack 466 connected to the left hand hanger of section 392 to move section 392 to the left. Rollers 467 are provided for insuring the meshing of these racks with the pinion.

A spring 470 is connected at one end to bracket 458 and at its other end to a chain 471. This chain is adjustably connected to a mid-point on toggle arm 462 in position to be engaged by a cam 472 provided on the end of arm 462. The face of this cam is provided with a groove to receive chain 471 when the end of arm 460 is pushed upwardly by lever 457, thereby placing spring 470 under tension. A check 473 is pivotally connected at one end to bracket 458 and at the other end to arm 460.

An interlock switch is provided for the hatchway door. This switch is mounted in a housing 474 secured to bracket 458. The switch has one pair of contacts which will be hereinafter termed hatchway door contacts. The switch is provided with an operating cam 477 having a cam-shaped slot into which extends the roller on the end of the operating arm of the switch. Cam 477 is connected by a tie-rod 478 to a cam 480 pivotally mounted on bracket 458. This cam is operated by roller 481 connected to an arm of operating lever 457.

Limit switches are provided for controlling the operation of the door and gate operating motor. These switches, in accordance with their functions, will be termed door open limit switch DOL, door close limit switch DCL and door speed limit switch DEL. The switches are mounted on a plate 482 secured to a bracket 483 mounted on cross member 404. Each of these switches is provided with an operating roller which is adapted to be engaged by an auxiliary cam mounted on shaft 407. The cam for operating switch DOL is designated 484, the cam for operating switch DCL is designated 485 and the cam for operating switch DEL is designated 486.

The car gate and hatchway door are illustrated in closed positions. Under such conditions, the hatchway door contacts and gate contacts are closed and limit switch DOL is closed while limit switches DCL and DEL are open. To open the door and gate, motor DM is energized for rotation in the direction to effect counterclockwise movement of shaft 407 and thus of cams 408 and 440. Cam 408 in its rotative movement pushes lever 410 counterclockwise about its pivot. This lever acts through chain 413 to pull lever 414 counterclockwise, this in turn causing counterclockwise movement of lever 417 and, through the tie-rod connection between levers 417 and 430, clockwise movement of lever 430. Levers 417 and 430 act through their connecting links to move the sections of the car gate to open positions. Cam 440 in this rotative movement pushes lever 441 counterclockwise about its pivot. This lever acts through chain 447 to lift retiring cam 448. In view of the mounting of the cam plate on parallel links pivoted to the car framework, the upward pull on the cam causes the cam to be extended into position to abut and push against roller 453 on the end of bell crank lever 454. This swings bell crank lever 545 counterclockwise about its pivot, pushing upwardly on lever 457 through rod 456. This lever engages toggle arm 460 to swing it clockwise about its pivot, breaking the toggle and pulling to the right on hatchway door section 393. This section in turn acts through racks 464 and 466 and pinion 465 to push door section 392 to the left. Thus continued extension of cam 448 causes the hatchway door sections to be moved to open position.

During the initial opening of the car gate, switch operating cam 438 is moved by tie-rod 439 into position to open the gate contacts. Similarly, during initial opening of the hatchway door, roller 481 swings cam 480 clockwise about its pivot, which through the tie-rod connection to cam 477 causes the opening of the hatchway door contacts. Also, during the initial operation of the door and gate operating mechanism, cam 485 runs off the operating roller for close limit switch DCL, allowing the switch contacts to close. Shortly thereafter cam 486 runs off the operating roller for door speed limit switch DEL, permitting the contacts of this switch to close. As the door and gate near open position, cam 486 reengages the operating roller for switch DEL, causing the reopening of the switch contacts. As the door and gate reach open position, cam 484 engages the operating roller for door open limit switch DOL, causing this switch to open. As will be seen from later description, this causes deenergization of the operating motor to bring the door and gate operating mechanism to a stop. The contour of cams 408 and 440 is such as to give rapid acceleration, fast speed and slow retardation of the door and gate in their opening movement. As the gate reaches open position, its movement is cushioned by check device 422, whereas as the hatchway door reaches open position its movement is cushioned by check device 473.

During the opening of the car gate, the movement of lever 417 about its pivot acts to place tension in spring 434. Similarly, during the opening of the hatchway door, cam 472 on the end of toggle arm 462 acts through chain 471 to place tension in spring 470. These springs act to close the gate and door upon the door and gate operating motor being energized for reverse rotative movement. Spring 434 acts through chain 435 directly on lever 417 and through tie-rod 427 on lever 430, as reverse rotative movement of motor DM takes place, to move the sections of the car gate to closed position. Also, the reverse rotative movement of the motor permits the retiring cam 448 to drop out, which enables spring 470 to straighten out the toggle, thereby moving the hatchway door sections to closed position. As the gate reaches closed position, its movement is cushioned by check device 420 and as the hatchway door reaches closed position its movement is cushioned by check 473.

During the initial closing of the door and gate cam 484 disengages the operating roller of door open limit switch DOL, permitting the switch to close. Thereafter cam 486 disengages the operating roller for door speed limit switch DEL which permits this switch to close. As will be seen from the description of the wiring diagram, a higher voltage is applied to the motor initially for the closing operation in order to enable the springs to quickly overcome inertia. The opening of switch DEL is utilized to discontinue the application of high voltage to the motor. As the door and gate near closed position, this cam reengages the operating roller of switch DEL, opening the switch. As the door and gate reach closed position, cam 485 reengages the operating roller for door close switch DCL, causing the opening of this switch. As a result, the motor is deenergized and is brought to a stop.

As the gate reaches closed position, operating cam 438 is moved into position by tie-rod 439 to effect the closure of the gate contacts. Similarly, as the door reaches closed position, roller 481 permits cam 480 to act through tie rod 478 to move operating cam 477 into position to close the hatchway door contacts. In the arrangement shown, the hatchway door contacts are permitted to close when the door reaches a certain distance, say 4 inches from closed position. Roller 481 and cam 480, the catch 490 formed on the upper end of cam 480, and a dog 491 pivoted on catch 490 are utilized in combination with lever 457 and toggle arm 460 to prevent the manual reopening of the door within this four inch zone as by someone catching onto the door from the outside to try to reopen it. However, the door may be reopened by power by the retiring cam pushing up on tie-rod 456, at any point in the return movement of the door sections, including the four inch zone. Handle 459 is provided for operating the hatchway doors in the event of an emergency, as for example when the power fails.

Reference may now be had to Figures 22, 23, 24 and 25 which illustrate diagrammatically the various control and power circuits. The circuits are shown in "straight" or "across-the-line" form, in which the coils and contacts of the various switches are separated in such manner as to render the circuits as simple and direct as possible. The relationship of these coils and contacts of Figures 22, 23, 24 and 25 may be seen from Figures 22a and b, 23a and b, 24a and b and 25a and b respectively, where the switches are arranged in alphabetical order and shown in spindle form. The positions of these coils and contacts in the wiring diagram may be found by referring to Figures 22a and b, 23a and b, 24a and b and 25a and b, where the coils and contacts are positioned on the spindles in horizontal alignment with the corresponding elements of the wiring diagram. The circuits of Figures 22, 23, 24 and 25 are joined together as indicated by the extension of the vertical feed lines from one sheet to the next.

The circuits are illustrated for only eight floors. It is to be understood, however, that the invention is applicable to any number of floors, eight being chosen merely for purposes of description.

The invention is applicable either to direct current or alternating current power supply. A three-phase alternating current power supply has been illustrated. The supply mains are designated I, II and III. A triple pole knife switch MLS is provided for connecting the system to the supply mains. The armature of the elevator hoisting motor is designated EMA and its field winding is designated EMF. EMR is a control resistance and EMDR is a discharge resistance for this field winding. The armature of the No. 1 generator is designated 1GA, its separately excited field winding 1GSP, its self-excited field winding 1GSL, its series field winding 1GSR, its reverse field winding 1GRV, its levelling field winding 1GLV and its interpole field winding 1GIN. The armature of the No. 2 generator is designated 2GA, its separately excited field winding 2GSP, its self-excited field winding 2GSL, its series field winding 2GSR, its reverse field winding 2GRV and its interpole field winding 2GIN. The driving motors for these generators are illustrated as three-phase squirrel cage alternating current induction motors. The stator windings of the driving motor for the No. 1 generator are designated 1DMS and the rotor 1DMR. The stator windings of the driving motor for the No. 2 generator are designated 2DMS and the rotor 2DMR.

Current for the separately excited, reverse and levelling field windings of the supply generators, the field winding of the hoisting motor, the coils of various electromagnetic switches and for other control apparatus is supplied by an exciter. The armature of the exciter is designated EXA, its self-excited field winding EXSL and its series field winding EXSR. The exciter is driven by a separate three-phase alternating current squirrel cage induction motor, the stator windings of which are designated EDMS and the rotor EDMR. Fuses FU are provided in the circuit for stator windings EDMS.

The electromagnetic switches are designated as follows:

| | |
|---|---|
| A | Speed measuring relay |
| AA | No. 1 accelerating switch |
| AB | No. 2 accelerating switch |
| AC | No. 3 accelerating switch |
| AD | No. 4 accelerating switch |
| AE | No. 5 accelerating switch |
| AY | Speed measuring relay |
| B | Brake switch |
| C | Potential switch |
| D | No. 3 down direction switch |
| DC | Door close switch |
| DE | Door speed switch |
| DO | Door open switch |
| DP | Door protective switch |
| DT | Door reversal time switch |
| EX | Exciter switch |
| G | Damping relay |
| GA | Auxiliary speed measuring relay |
| HB | Elevator motor field switch |
| HM | Hand micro relay |
| KA | No. 1 generator driving motor starting switch |
| KB | No. 2 generator driving motor starting switch |
| LA | No. 1 generator driving motor running switch |
| LB | No. 2 generator driving motor running switch |
| LL | Level back speed control relay |
| M | Motion relay |
| MC | Minimum current field relay |
| MDX | Motion device relay |
| N | Selector advance relay |
| NM | Pawl magnet relay |
| O | Selector centering relay |
| OA | No. 1 overload switch |
| OB | No. 2 overload switch |
| OC | No. 3 overload switch |
| OD | No. 4 overload switch |
| OE | No. 5 overload switch |
| OS | Starting switch sequence relay |
| P | Door operating relay |
| PB | Start control switch relay |
| PM | Motor advance panel stopping relay |
| PMX | Auxiliary motor advance panel stopping relay |
| PO | Brush drop compensating relay |
| POA | Auxiliary brush drop compensating relay |
| Q | Full speed regulating switch |
| R | Direction determining switch |
| RF | Final accelerating switch |
| S | Preparatory brake switch |
| ST | Starting relay |
| TA | Stop control time relay |
| TC | Reverse field timing relay |
| TCX | Auxiliary reverse field timing relay |
| U | No. 3 up direction switch |
| WD | No. 1 down direction switch |
| WU | No. 1 up direction switch |
| X | Main operation relay |
| XD | No. 2 down direction switch |
| XSM | Stopping relay |
| XU | No. 2 up direction switch |
| YA | No. 1 series field switch |
| YB | No. 2 series field switch |
| YC | No. 3 series field switch |

Throughout the description which follows, these letters will be applied to the coils of the above designated switches. Also, with reference numerals appended thereto, they will be applied to the contacts of these switches, as for example contacts U6. Similarly, the release coil of the electromechanical brake is designated BR, the switch operated by the brake being designated BR1. The electromagnetic switches are illustrated in deenergized condition, direction determining switch R, which is a latching type switch, being illustrated in reset condition. Condensers, designated CO, are provided at various points in the circuits to minimize arcing at switch contacts.

The tape motor for the selector machine drive is a direct current motor. Its armature is designated TMA and its field winding TMF. The brake release coil for the tape motor is designated TBR. The slack tape switch is designated STS. The advancer motor on the selector machine is also a direct current motor, its armature being designated AMA and its field winding AMF.

Of the switches arranged within the elevator car, the start control switch has two contacts, designated SC1 and SC2. The non-stop switch is designated NS. The up reversal button is designated UB and the down reversal button is designated DB. The hand micro switch has four blades designated HMU1, HMU2, HMD1 and HMD2. The key operated switch for starting the exciter set is designated KS, this switch having four stationary contacts and two bridging contacts, as shown in the upper left hand corner of Figure 22. This switch is connected to the alternating current supply mains through a transformer TF. The safety switch is designated SA while the emergency operation button is designated EB.

The car buttons, also arranged within the elevator car, are designated C and have numerals appended thereto to indicate the floor for which each car button is provided. The magnet for holding operated car buttons depressed is designated CBM. The up hall buttons are designated UH while the down hall buttons are designated DH. Numerals are appended to these letters indicating the floors for which the buttons are provided. The hall buttons act through floor relays designated first by the numeral corresponding to the floor for which the button is provided and then by the letter U or D in accordance with whether the floor relay is for an up hall button or a down hall button. The floor relays are illustrated as of the type which are latched, either mechanically or electromagnetically, in operated condition, each being provided with an operating coil and a release coil. Where several elevators are arranged as a group, the hall buttons and their floor relays are common to all of these elevators, the release coils being connected in parallel relationship to the selectors of the various elevators and the operating coils being fed from the exciters of all the elevators in parallel, each feed being subject to contact C2 of the potential switch for the corresponding elevator.

The motor for the door and gate operating mechanism is illustrated as a direct current motor. Its armature is designated DMA and its field winding is designated DMF. The hatchway door contacts are designated HDC, while the gate contacts, two in number, are designated GC1 and GC2. The final limit switches are designated FLU and FLD for the upper and lower terminal floors respectively. SOP is the switch operated by the car safety brake. OSG is the switch operated by the overspeed governor. Contacts IMGG and 2MGG are operated by governors of the No. 1 and No. 2 motor generator sets respectively.

Assume that main line switch MLS is closed so that power is applied to the system from the alternating current supply mains. To start the exciter set, key operated switch KS is turned clockwise, connecting the coil of exciter switch EX across the secondary of transformer TF through slack tape switch STS. Switch EX operates, engaging contacts EX4 to establish a self-holding circuit through the lower contacts of switch KS. It also engages contacts EX1, EX2 and EX3, completing a circuit for the stator windings EDMS of the exciter driving motor. The exciter driving motor starts in operation, bringing the exciter armature EXA up to full speed. The exciter voltage builds up to full value due to the excitation provided by its field windings EXSL and EXSR.

The exciter voltage is applied to field winding EMF of the elevator hoisting motor, the current supplied to this field winding being reduced by resistance EMR to a standing field value. Voltage is also applied to armature TMA of the tape motor and to release coil TBR of the brake for this motor, the circuit extending through armature EMA of the elevator hoisting motor. Voltage is also applied to field winding TMF of the tape motor. Thus the tape motor is energized to exert torque, tending to rotate the tape reel in a direction to wind the tape thereon. Voltage is also applied to the coil of potential switch C, the circuit for coil C extending through contacts LA4 of the No. 1 generator driving motor running switch, contacts EX5 being engaged as a result of the previous operation of the exciter switch. The potential switch upon operation engages contacts C1 and C2, preparing circuits for certain of the control apparatus fed from the exciter and causing operation of certain control switches.

Assume that the car, upon its last operation, returned to the lower terminal floor. This caused the operation of direction determining switch R, which was latched in operated condition. When switch R is operated, contacts R2 and R4 are separated and contacts R1 and R3 are engaged. Thus, upon the engagement of the potential switch contacts, the coils of No. 1 and No. 2 up direction switches WU and XU are connected to the exciter, causing operation of these switches. Switch XU, upon operation, separates contacts XU2. This removes the short circuit for car button magnet CBM, placing this magnet in series with the coil of switch XU and thereby energizing this magnet. The other contacts of these direction switches are in direction circuits which will be referred to later. The engagement of the potential switch contacts also completes the circuit for the coil of selector centering relay O, causing this relay to operate. With the car at the lower terminal floor, the terminal stopping switch contacts TM1, TM2, TM3, TM4, TMI and TMD8 are open and are illustrated in this condition in the wiring diagram. As the car leaves the first floor on an upward trip, contacts TMD8 close immediately. Thereafter the other of the above mentioned contacts close in sequence in the reverse order to that named as the car reaches certain fixed distances above the first floor and slightly prior to the establishment of the circuits which they control.

To start the car, the start control switch is thrown to "on" position. This causes first the closure of start control switch contacts SC1, which completes a circuit through contacts GA4 of the auxiliary speed measuring relay for the coils of door operating relay P, door close switch DC, and door reversal time relay DT, the circuit for the coils of switches DC and DT also extending through the door close limit switch DCL which is closed with the door in open position. Switch P upon operation separates contacts P1 to prevent the energization of the coil of door open switch DO so long as the start control switch is in "on" position. The door close switch DC upon operation engages contacts DC2 and DC5 and separates contacts DC3 to establish a circuit for the armature DMA of the door and gate operating motor for rotation in a direction to effect the closure of the car gate and hatchway door. The field winding DMF of the door and gate operating motor was energized upon operation of the potential switch through contacts DT1 of the door reversal time switch, door close switch contacts DC6 engaging to by-pass these contacts to maintain the circuit for the field winding after operation of switch DT. The door close switch also engages contacts DC4 to connect resistance DMR1 across the armature of the door and gate operating motor, this by-pass resistance serving to control the speed of operation of the motor. Upon movement of the door and gate out of open position, door open limit switch DOL closes in the circuit for the coil of door open switch DO, this circuit being open at contacts P1. Also, the door speed limit switch DEL closes, energizing the coil of door speed switch DE. This switch operates to separate contacts DE1, inserting resistance DMR2 in circuit with the armature of the door and gate operating motor. With this arrangement, a higher voltage is applied to the armature of the door and gate operating motor to enable the closing spring quickly to overcome inertia in starting the closing movement, this voltage thereafter being reduced by operation of the door speed switch. The engagement of contacts DE4 establishes a self-holding circuit for the coil of the door speed switch through contacts DC7 of the door close switch, thus maintaining the door speed switch operated after the reopening of limit switch DEL in the closing operation.

As the door and gate reach closed positions, door close limit switch DCL opens, deenergizing the coil of door close switch DC, causing the deenergization of the door and gate operating motor. The separation of contacts DC7 breaks the holding circuit for the door speed switch DE, causing this switch to drop out. Contacts DE2 reengage to short-circuit armature DMA, bringing the motor to a stop. Closure of the car gate causes the closing of gate contacts GC1 and GC2 and the closing of the hatchway door causes the engagement of door contacts HDC.

If it is desired to arrest the closing of the gate and door and reopen them, this may be done by returning the start control switch to neutral. This breaks the circuit for the coils of door close switch DC, door reversal time switch DT and door operating relay P. The dropping out of switch DC effects the deenergization of the door and gate operating motor, while the dropping out of switch P by the reengagement of its contacts P1 effects the energization of the gate open switch DO. This switch operates to engage contacts DO1 and DO3 and separate contacts DO4 to establish a circuit for armature DMA for rotation in a direction to effect opening of the car gate and hatchway door. This circuit extends through resistances DMR4 and DMR5 in series with armature DMA and through resistance DMR1 connected in parallel with the armature by contacts DO2. If limit switch DEL has not opened by the time the start control switch is returned to neutral, switch DE is maintained operated by this limit switch with its contacts DE3 short-circuiting resistance DMR3 in the armature circuit of the door and gate operating motor. However, if this limit switch has opened, switch DE is immediately reenergized, after the separation of contacts DC7, by the engagement of contacts DO5, which reestablishes the circuit of the coil of switch DE through contacts DT2 timed in separating after the deenergization of switch DT. Contacts DE4 thereupon establish a holding circuit for the coil of switch DE through contacts DO6. Contacts DO7 separate in the circuit for the coil of switches DC and DT to prevent their reenergization until the door and gate reach open positions.

Switch DT being timed in dropping out does not reengage contacts DT1 to short-circuit resistance DMR4 in the circuit common to armature DMA and field winding DMF until a sufficient time interval has elapsed to permit the gate and door to start their movement toward open position. This obviates any shock as a result of the reversal operation. Upon the door and gate reaching open positions, door open limit switch DOL opens, deenergizing switch DO, causing the deenergization of the door and gate operating motor and the dropping out of door speed switch DE to effect the dynamic braking of this motor to assist in bringing the car gate and hatchway door to a stop. Contacts DO6 and DC7 of the door open and door close switches also control the coil of door protective relay DP. This relay is timed to operate within a certain number of seconds such that if the operation of the door and gate is not effected within this period contacts DP1 separate to effect, through the dropping out of switch DO or DC, the deenergization of the door and gate operating motor.

When the start control switch is thrown to "on" position, this also causes the closure of start control switch contacts SC2, these contacts closing after the closure of contacts SC1 takes place. Contacts SC2 complete a circuit through resistances QR1 and QR2 in parallel with the voltage coil of full speed regulating switch Q, this coil being in a circuit parallel to that of the armature of the brush advancer motor subject to contacts WU11 and WU12 of No. 1 up direction switch. The energization of this coil causes operation of switch Q to separate contacts Q1 in parallel with resistance SLRP which controls the strength of the self-excited field windings 1GSL and 2GSL of No. 1 and No. 2 generators. The closure of contacts SC2 also completes a circuit for field winding AMF and armature AMA of the advancer motor. The circuit for armature AMA is through contacts WU11 and WU12 of No. 1 direction switch WU, engaged as a result of the previous operation of this switch to prepare the circuits for the advancer motor armature for operation for up car travel. The advancer motor operates to advance the motor advance panel in the up direction until stopped mechanically by the synchronous panel or as a result of picking up a call. The advancer motor is adjusted so as to effect the advancing operation at a rapid rate so that the advance is completed before the closure of the door and gate is effected. During its initial advance, the motor advance panel causes the closing of up motor advance switch MAU, completing a circuit for the coil of pawl magnet relay NM.

The pawl magnet relay upon operation engages contacts NM5, completing a circuit for the coil of pawl magnet SM. The pawl magnet operates to retract the stop lugs from the pawls, permitting the closure of pawl magnet contacts SM1. This completes a circuit through stopping relay contacts XSM1, starting switch sequence relay contacts OS2 and start control switch contacts SC2 for the coils of starting relay ST and reverse field timing relay TC. Relay ST upon operation engages contacts ST2 in the starting circuit for the separately excited field winding 1GSP of the No. 1 generator. It also separates contacts ST4 in the circuit for levelling field winding 1GLV of the No. 1 generator and reverse field windings 1GRV and 2GRV of both generators, preventing energization of these field windings during starting of the car. Switch TC engages contacts TC4 to complete a circuit for the coil of auxiliary reverse field timing relay TCX, causing this relay to operate.

The engagement of start control switch contacts SC2 also completes a circuit for the coil of start control switch relay PB. Switch PB upon operation engages contacts PB4 to complete a circuit for the coil of the levelling magnet LEV. The levelling magnet upon energization effects the engagement of contacts L1D, L1U, L2D and L2U, completing a circuit through selector switch SS7 and resistance section BRR1 to effect the partial energization of brake release coil BR, and also completes a circuit for the coil of stop control time relay TA. Should the load in the car be such at this time as to cause the car to pull through the brake, selector switch SS7 opens immediately to cause the brake to be fully applied. The levelling magnet also effects the separation of contacts L3U and L3D and the engagement of contacts L4U and L4D in circuits for the coils of switches U and D, these circuits being open, however, at contacts PB3. Switch TA upon operation engages contacts TA2 to complete a circuit for the coil of No. 1 generator driving motor starting switch KA. Switch KA upon operation engages contacts KA1 and KA2, connecting the stator windings 1DMS of the No. 1 generator driving motor in star relation to the alternating current supply mains. It also separates contacts KA3 to prevent energization of the coil of No. 2 generator driving motor starting switch KB and No. 1 generator driving motor running switch LA upon the engagement of contacts KA4. The engagement of contacts KA4, however, completes the circuit for the coil of elevator motor field switch HB.

Switch HB upon operation engages contacts HB3 to establish a self-holding circuit and also engages contacts HB1 to connect self-excited field winding 1GSL across the armature 1GA of No. 1 generator. The resistance of the circuit for the self-excited field winding and the number of turns of the winding are such that the slope of the resistance line of the winding is greater than the slope of the magnetization curve of the generator field, plotted ampere turns against terminal voltage to provide coordinates in common. Therefore the resistance line is in effect outside the magnetization curve so that the generator voltage does not build up to a high value at this time. Switch HB also engages contacts HB2 to short-circuit resistance EMR in the circuit for elevator motor field winding EMF, increasing the strength of the elevator motor field for the operation of starting the car.

As the elevator motor field comes up to full value, minimum current field relay MC operates to separate contacts MC2, breaking the circuit for the coil of starting switch KA. This switch upon dropping out reengages contacts KA3, completing a circuit through contacts HB3 for the coil of No. 2 generator driving motor starting switch KB. Switch KB upon operation engages contacts KB1 and KB2, connecting the stator windings 2DMS of the No. 2 generator driving motor in star relation to the alternating current supply mains. It also separates contacts KB4 to prevent the energization of the coil of No. 2 generator driving motor running switch LB. It also engages contacts KB3 to complete a circuit through contacts MC3, engages as a result of the previous operation of switch MC, for the coil of No. 1 generator driving motor running switch LA and through contacts ST1, engaged as a result of the operation of starting relay ST, for the coil of No. 3 series field switch YC. The circuit for the coil of auxiliary speed measuring relay GA is not completed by the engagement of contacts KB3 as contacts TC1 of the reverse field timing relay are separated.

Switch YC upon operation separates contacts YC1 and YC2, removing the short circuit for a portion of the shunting resistances 1SFSR and 2SFSR for the series field windings 1GSR and 2GSR of the No. 1 and No. 2 generators. Switch LA upon operation engages contacts LA1, LA2 and LA3 which, together with the separation of contacts KA1 and KA2, changes the connections of the No. 1 generator driving motor stator windings from star to delta relation. It separates interlock contacts LA5 in the circuit for the coil of switch KA. It also separates contacts LA4 in the circuit for the coil of potential switch C, these contacts being by-passed, however, by contacts MC1, engaged as a result of the previous operation of the minimum current field relay. It also engages contacts LA6 to establish a self-holding circuit.

Thus, during the advance of the motor advance panel and the closing of the door and gate, various switching operations take place, causing the partial energization of the brake, full energization of the motor field winding, the starting of the No. 1 motor generator set with the stator windings of the driving motor connected in delta relation to the supply mains, the starting of the No. 2 motor generator set with the stator windings of the driving motor connected in star relation to the supply mains, and also the connection of the self-excited field winding of the No. 1 generator to the generator armature.

When the door and gate reach closed positions, the engagement of door contacts HDC and gate contacts GC2 completes the circuit for the coil of No. 3 up direction switch U. This circuit is through No. 3 down direction switch interlock contacts D3, terminal stopping switch contacts TMU8, contacts R1, engaged owing to the fact that direction determining switch R is left in operated condition as previously set forth, and contacts PB2, engaged as a result of the previous operation of start control switch relay PB. Switch U upon operation separates interlock contacts U3 in the circuit for the coil of No. 3 down direction switch D. It also engages contacts U7, completing a circuit for the coils of brake switch B and main operation relay X. The circuit for the coil of switch B extends through contacts MC4 and LA7, thereby preventing the operation of switch B and thus the starting of the car until the motor field strength has come up to full value, indicated by the operation of the minimum current field relay MC, and until the delta connection has been established for the No. 1 generator driving motor, indicated by the operation of No. 1 generator driving motor running switch LA. The circuit for the coil of relay X extends through contacts ST5, engaged as a result of the previous operation of starting relay ST. It also engages contacts U5, completing a circuit for the coil of motion relay M, and engages contacts U6, completing a circuit for the motion device clutch magnet MD. Switch U also engages contacts U4 in the circuit for the coil of level back speed control relay LL, this circuit not being completed, however, owing to the operation of relay X to separate contacts X1. Contacts X1 also prevent energization of either coil of direction determining switch R by reversal button UB or DB, once the doors are closed on main operation. Relay X upon operation also engages contacts X3 to establish a self-holding circuit around contacts ST5.

Switch B upon operation separates contacts B2 and B3 to disconnect section BRR2 of the discharge resistance for brake release coil BR. It also engages contacts B4 to short-circuit resistance section BRR1 in circuit with the brake release coil, causing the release of the brake. At the same time, switch B engages contacts B1, which completes the starting circuit for the No. 1 generator separately excited field winding 1GSP. This circuit is through contacts WU5 and WU4, engaged as a result of the previous operation of No. 1 up direction switch, sections 1SR1, 1SR2, 1SR3 and 1SR4 of the starting control resistance for No. 1 generator separately excited field winding, contacts O1 being separated as a result of the previous operation of selector centering relay O, contacts M1, starting relay contacts ST2 and brake switch contacts B1. Thus the armature of the elevator hoisting motor is supplied with current which builds up to start the car. The circuit for armature EMA of the elevator motor is through the armatures 1GA and 2GA of No. 1 and No. 2 generators respectively in series relation. The excitation of the generator due to the self-excited field winding increases upon the establishment of a circuit for the separately excited field winding, the self-excited field winding thus adding to the effect of the separately excited field winding. The No. 2 generator does not assume any of the load at this time owing to the fact that its separately excited field winding 2GSP is not yet connected to the exciter terminals, being connected through contacts AC1 and AC3 of the No. 3 accelerating switch across the No. 2 generator armature 2GA. The polarity of the connection is such as to oppose the terminal voltage of the No. 2 generator.

The engagement of contacts B1 also completes a circuit through starting relay contacts ST3 and No. 5 accelerating switch contacts AE3 for the coil of No. 1 series field switch YA. Switch YA upon operation separates contacts YA1 and YA2 to remove the short circuit for the remainder of No. 1 generator series field shunting resistance 1SFSR. This gives a strong effect to the series field winding of the No. 1 generator for the starting operation.

Brush drop compensating relay PO has its coil connected across the series field windings and interpole field windings of both generators so as to be subject to the current in the motor armature-generator armatures circuit. This relay is a sensitive one and operates as soon as a small amount of positive current is present in the circuit of these armatures. Upon operation when the car is set for upward travel, relay PO engages contacts PO1, completing a circuit through resistance POR1 to connect the coil of auxiliary brush drop compensating relay POA in parallel with the coil of No. 3 up direction switch U. The purpose of this arrangement will be explained later.

As seen from the above description, contacts M1 are in engagement at the time the circuit is established for the separately excited field winding 1GSP of the No. 1 generator, so that portion 1SR5 of its starting control resistance is short-circuited. This causes a certain voltage to be applied to field winding 1GSP in starting the elevator. As the elevator motor starts in rotation the motion device separates its up contacts MD1U to break the circuit for the coil of switch M. Thus switch M drops out to separate contacts M1, removing the short circuit for portion 1SR5 of the starting control resistance for field winding 1GSP and thus reducing the voltage applied to this winding. With this arrangement sufficient excitation is applied to No. 1 generator to insure the starting of the elevator car under all load conditions and without starting too abruptly.

Further rotative movement of the elevator motor in starting causes the engagement of motion device contacts MD2, completing a circuit through terminal stopping switch contacts TM1 (now closed), starting relay contacts ST6 and selector switch SS13 for the coil of No. 1 accelerating switch AA. This switch operates to engage contacts AA2, completing a short circuit for portions 1SR4 and 1SR5 of the starting control resistance for the No. 1 generator separately excited field winding 1GSP. This increases the voltage of the No. 1 generator, causing an increase in speed of the elevator hoisting motor.

Further rotative movement of the elevator hoisting motor causes the engagement of motion device contacts MD3U, completing a circuit for the coil of motion device relay MDX. This relay upon operation engages contacts MDX4, completing a circuit through auxiliary reverse field time relay contacts TCX2, engaged as a result of the previous operation of relay TCX, for the coil of No. 2 accelerating switch AB.

Switch AB upon operation engages contacts AB7, by-passing start control switch contacts SC2. It also engages contacts AB10, completing a circuit for the coil of starting switch sequence relay OS. Relay OS operates to engage contacts OS4 to establish a self-holding circuit. It also engages contacts OS3 to by-pass start control switch contacts SC1. Thus the start control switch may now be returned to neutral without interrupting the running of the car.

Switch AB also engages contacts AB5, completing a circuit for the coil of No. 2 series field switch YB, which operates to separate contacts YB1 and YB2 to remove the short circuit for the remainder of shunting resistance 2SFSR for the No. 2 generator series field winding 2GSR. Switch AB also engages contacts AB3, establishing a short circuit for portions 1SR2 and 1SR3 of the starting control resistance for the separately excited field winding of the No. 1 generator. This further increases the voltage of this generator and thus the speed of the elevator hoisting motor.

Switch AB also separates contacts AB2 in the circuit for the coil of No. 2 generator driving motor starting switch KB, causing this switch to drop out. Switch KB upon dropping out reengages contacts KB4, completing a circuit through contacts LA6 for the coil of No. 2 generator driving motor running switch LB. Switch LB upon operation engages contacts LB1, LB2 and LB3 which, together with the separation of contacts KB1 and KB2, reconnects the stator windings of the No. 2 generator driving motor from star to delta relation. It also separates interlock contacts LB4 in the circuit for the coil of switch KB.

As the elevator car moves in the up direction the distance advance panel, moving at twice the speed of the synchronous panel, reaches a point where it is sufficiently in advance of the synchronous panel to close up distance advance switch DAU, which completes a circuit for the coil of selector advance relay N, this circuit extending through contacts D3, terminal stopping switch contacts TMU8, contacts R1 and PB2, and gate and door contacts GC2 and HDC. Switch N upon operation separates contacts N3 in the circuit for the coil of pawl magnet SM, this circuit being by-passed by accelerating switch contacts AB9, now in engagement.

As the distance advance crosshead moves upwardly, it causes the operation of the selector switches in sequence. Selector switch SS1 closes and selector switch SS13 opens, switch SS1 being actuated before switch SS13 to establish another circuit for the coils of the accelerating switches through contacts AA8 of No. 1 accelerating switch. Selector switch SS2 closes after the opening of switch SS13, by-passing contacts TCX2 of the auxiliary reverse time relay in the circuit for the coil of No. 2 accelerating switch AB. Selector switch SS3 closes, completing a circuit through terminal stopping switch contacts TM4 (now closed), contacts LB6 of the No. 2 generator driving motor running switch and contacts N4 for the coil of No. 3 accelerating switch AC.

Switch AC upon operation separates contacts AC1 and AC3 to disconnect No. 2 generator separately excited field winding 2GSP from across generator armature 2GA. It also engages contacts AC5 and AC6 to connect field winding 2GSP to the exciter terminals through contacts WU3 and WU2 of No. 1 up direction switch and portions 2SR1 and 2SR2 of the No. 2 generator starting control resistance. This causes the No. 2 generator to assume part of the load of the elevator motor, the increased voltage applied to the elevator armature due to the excitation of the No. 2 generator causing the speed of the car to increase. Contacts LB6 prevent the operation of switch AC and thus the loading of the No. 2 generator until the stator windings of the driving motor for this generator have been connected in delta relation. Switch AC also causes the engagement of contacts AC2 to effect the connection of the No. 2 generator self-excited field winding 2GSL across generator armature 2GA to assist the separately excited field winding in exciting the generator. The slope of the resistance line of this field winding also is greater than that of the magnetization curve of the No. 2 generator, preventing the building up of the generator voltage to a high value by self-excitation. Also, due to the fact that switch YB is operated, a strong series field is provided for the No. 2 generator.

As a result of further movement of the distance advance crosshead, selector switch SS4 closes, completing a circuit through terminal stopping switch contacts TM3 (now closed) for the coil of No. 4 accelerating switch AD. This switch upon operation engages contacts AD2 to short-circuit portion 2SR1 of the starting control resistance for No. 2 generator separately excited field winding 2GSP. This increases the excitation of the No. 2 generator and thus the voltage applied to the elevator motor, further increasing the speed of the elevator car.

Upon further movement of the distance advance crosshead, selector switch SS5 closes to complete a circuit through terminal stopping switch contacts TM2 (now closed) for the coil of No. 5 accelerating switch AE. This switch upon operation engages contacts AE2, connecting portions 2SR2 and 1SR1 of the starting control resistances in parallel in circuit with the field windings 1GSP and 2GSP of both generators. This causes both generator fields to have the same excitation and further increases the excitation of each field winding, further increasing the voltage of both generators and thus the speed of the elevator car. Switch AE also separates contacts AE3, rendering No. 1 and No. 2 series field switches YA and YB subject to contacts Q2 of full speed regulating switch Q.

No. 5 accelerating switch AE also engages contacts AE4, completing a circuit through starting relay contacts ST7 for the coil of final accelerating switch RF. Switch RF upon operation engages contacts RF1 to connect resistance SLRP in parallel with portions of resistances 1SLR and 2SLR in the circuit for the self-excited field windings 1GSL and 2GSL of the No. 1 and No. 2 generators respectively. This decreases the slopes of the resistance lines of these field windings, thereby causing further increase in the generator voltage to bring the elevator motor up to full speed.

Switch RF also separates contacts RF3 to deenergize the coil of reverse field timing relay TC. This relay is delayed in dropping out. When it does drop out, it reengages contacts TC1 in the circuit for the coil of auxiliary speed measuring relay GA, the reengagement of these contacts not completing this circuit, however, owing to the fact that contacts AC4 of the No. 3 accelerating switch are separated. Relay TC also separates contacts TC4, deenergizing the coil of auxiliary reverse field timing relay TCX. Relay TCX drops out to separate contacts TCX2, these contacts being by-passed, however, by selector switch SS2 to maintain No. 2 accelerating switch AB in operated condition.

Final accelerating switch RF also separates contacts RF4 to disconnect parallel resistance QR2 in the circuit for the voltage coil of full speed regulating switch Q. Switch Q is also provided with a current coil connected across the series and interpole field windings of both No. 1 and No. 2 generators. The current coil acts to oppose the voltage coil when the current in the motor armature circuit is positive. Resistance QR2 connected in parallel with resistance QR1 in the circuit for the voltage coil of switch Q causes sufficient excitation of this switch to prevent its being dropped out by the effect of the current coil during acceleration under normal operating conditions. However, once the final accelerating switch RF has operated to bring the car up to full speed, the separation of contacts RF4 reduces the excitation provided by the voltage coil sufficiently that if the load on the elevator motor is at or above a given amount switch Q is caused to drop out. Upon dropping out switch Q engages contacts Q1 to short-circuit resistance SLRP and the portions of resistances 1SLR and 2SLR in parallel with resistance SLRP, thereby increasing the effect of the self-excited field windings of the generators, and engages contacts Q2 which maintains the full amount of resistances 1SFSR and 2SFSR in parallel with the series field windings of the generators, thus maintaining strong series fields. If the load on the elevator motor is below such given amount at the time contacts RF4 separate, switch Q is maintained operated so that, upon separation of contacts AE3, No. 1 and No. 2 series field switches YA and YB drop out to reengage contacts YA1 and YA2 and YB1 and YB2 to short-circuit a portion of resistances 1SFSR and 2SFSR, thereby decreasing the effect of the series field windings of the generators.

As previously pointed out, upon the connection of the self-excited field winding 1GSL across the armature of the No. 1 generator by contacts HB1, the voltage of the generator does not build up to a high value owing to the fact that the slope of the resistance line of this field winding is greater than that of the magnetization curve of the generator field. When the circuit for the separately excited field winding IGSP of this generator is completed, the self-excited field winding assists the separately excited field winding in providing the generator excitation. To determine the degree of excitation of the generator, the resistance line of the self-excited field winding may be regarded as shifted parallel to itself inside the magnetization curve a distance corresponding to the degree of separate excitation. The point at which this shifted line crosses the curve represents the total excitation due to both field windings. This is true for each increase of separate excitation of the generator. The same is true for the No. 2 generator. The reengagement of contacts QI of the full speed regulating switch when the load on the elevator motor is at or above a predetermined amount as previously explained decreases the slopes of the resistance lines of the self-excited field windings so as to intersect the respective magnetization curves of the generator fields at higher points on the curves for the same degree of separate excitation, thereby increasing the voltage of the generator. Thus the speed regulating switch, by its control of the series and self-excited field windings, acts under full speed operating conditions to reduce the amount of speed variation due to varying load conditions.

As will be seen from the above description, when the start control switch is operated to start the car the door and gate are automatically closed and the motor advance panel is advanced. During these operations the brake is partially released, the self-excited field winding of the No. 1 generator is connected to the generator armature and both generator sets are started in operation with the stator windings of the driving motor of the No. 1 set connected in delta relation and those of the driving motor of the No. 2 set connected in star relation. When the door and gate reach closed position the brake is fully released and the No. 1 generator supplies current to the elevator motor, which builds up to start the car. As the car starts in operation the excitation of the generator is decreased, the higher excitation being initially provided to insure starting of the car under all load conditions. Continued movement of the car causes an increase in the excitation of the separately excited field winding of the No. 1 generator to increase the speed of the elevator motor. Further movement of the car causes further increase in the excitation of the separately excited field winding of the No. 1 generator to further increase the speed of the elevator motor. Also, at this point the stator windings of the driving motor of the No. 2 generator are connected in delta relation. Still further movement of the elevator car causes the disconnection of the No. 2 generator separately excited field winding from across the generator armature and its connection to the exciter. This causes the No. 2 generator to assume part of the load and increases the speed of the elevator motor. Further movement of the elevator car causes an increase in the excitation of the No. 2 generator separately excited field winding to further increase the speed of the elevator motor. Further movement of the car causes the connection of the field windings of both generators in a parallel relationship to provide the same excitation, at the same time increasing their excitation and thus the speed of the elevator motor.

As the separate excitation of each generator is established, the slope of the resistance line of the self-excited field winding of that generator is not changed but the resistance line may be regarded as in effect shifted to a point inside the magnetization curve of the generator. The point at which the shifted line crosses the magnetization curve is determined by the amount of separate excitation. Thus, for each increase in separate excitation of each generator there is a corresponding increase in generator voltage due to the self-excited field winding. In a like manner, excitation due to the series field windings of the generator is increased by the action of the self-excited field windings. Therefore, the speed of the elevator motor is determined by the separate excitation, series excitation and self-excitation of the generators.

The resistance of the circuit of the self-excited field winding of each generator being of a low value, current induced in this circuit due to increase in the excitation provided by the separately excited field winding flows readily to retard the building up of flux in the generator field. Also, owing to the fact that a relatively small voltage acts to overcome the inductance of this circuit throughout any step of acceleration, the building up of the field of the generator due to the self-excitation is delayed, thereby further delaying the building up of the generator voltage. Similarly, the self-excited field winding acts for the same reasons to cause the voltage changes induced by the series field excitation to lag the current changes in the motor armature circuit. This in turn damps out any current surges in the motor armature circuit. Relatively strong series fields are provided for acceleration. The series field of the No. 2 generator is caused to be stronger than that of generator No. 1 to compensate for the decrease in the slope of the magnetization curve of the No. 1 generator as the voltage of the No. 1 generator approaches full value. This is done by having resistance 2SFSR of higher value than resistance ISFSR.

When the elevator car is operating full speed, both the motor advance panel and the distance advance panel are in fully advanced positions. Assume that this is the case and further that a passenger was taken on the car at the first floor who desires to be carried to the sixth floor. Upon the passenger signifying his intention, the car attendant pressed the sixth floor car button 6C, which is held depressed by car button magnet CBM, rendering the sixth floor car call pick up contact 6CP "alive." Upon the engagement of this contact by the car call pick up brush CPB on the motor advance panel, a circuit is completed through contacts NM3 of the pawl magnet relay and contacts O4 of the selector centering relay for the coil of auxiliary motor advance panel stopping relay PMX. This relay separates contacts PMX4 which, owing to the fact that contacts NM4 of the pawl magnet relay and contacts AA7 of No. 1 accelerating switch are now separated, breaks the circuit for the armature AMA of the advancer motor, bringing the motor advance panel to a stop with the contacts thereon in engagement with their respective cooperating sixth floor stationary contacts.

Although the motor advance panel is stopped upon the call being picked up, the distance advance and synchronous panels continue their movement. Incident to the continued movement of the distance advance panel, a circuit is completed by the engagement of first up pre-retardation control brush IUPB on the distance advance panel with sixth floor contact IPR6, the circuit extending through brush APB on the motor advance panel which is engaged with the sixth floor contact AP6, contacts WU8, selector switch SS9 and contacts AA5 of the No. 1 accelerating switch for the coil of stopping relay XSM. This relay operates to engage contacts XSM2 to establish a holding circuit and separates contacts XSM1 in a circuit for the coil of starting relay ST. The coil of relay ST is maintained energized, however, through selector centering relay contacts O3, selector switch SS12, terminal stopping switch contacts TM7 and No. 2 accelerating switch contacts AB7.

Just before the distance advance panel lines up with the motor advance panel, up motor advance switch MAU is opened to deenergize the coil of pawl magnet relay NM. This relay drops out to separate contacts NM3, relay PMX being held in, however, through resistance PMXR, pick-up holding brush PHB and sixth floor contact 6PH. Relay NM reengages contacts NM4, contacts AA7, however, remaining separated to prevent reenergization of the advancer motor armature. Relay NM also separates contacts NM5, deenergizing the coil of pawl magnet SM. This releases the stopping lugs to extend them in the path of movement of the pawls, the pawls thereupon locking onto the sixth floor lug, bringing the distance advance panel to a stop. This causes the opening of the selector switches in sequence as the car continues its movement toward the sixth floor.

As the car arrives at a certain distance from the sixth floor, selector switch SS12 opens, breaking the circuit for the coil of starting relay ST. In this connection it is to be noted that contact ASB on the distance advance panel is causing the opening of the sixth floor auxiliary starting relay control contacts 6AS at this time which, owing to the fact that contacts SM1, NM1 and AB8 are separated, insures that the circuit for the coil of starting relay ST is not maintained through contacts XSM1 in the event of the failure of relay XSM to operate. Relay ST drops out and separates contacts ST7, which breaks the circuit for the coil of final accelerating switch RF. Switch RF separates contacts RF1, breaking the circuit by-passing resistances ISLR and 2SLR in circuit with self-excited field windings IGSL and 2GSL of the generators. This increases the slopes of the resistance lines of these field windings and thus decreases the effect of these windings for the slow down operation. Also, this results in a decrease in the voltage of the generators and thus in the speed of the elevator car. Switch RF also reengages contacts RF4 to prevent the dropping out of switch Q by the action of its current coil during slow down.

Relay ST also separates contacts ST6 to break the circuit for the coil of selector centering relay O. Relay O drops out to separate contacts O4, these contacts being by-passed, however, by contacts N2 and AA6 of the selector advance relay and No. 1 accelerating switch respectively to maintain relay PMX operated. Relay O also reengages contacts O2 which, together with the separation of contacts ST2 of the starting relay, transfers the circuits for the separately excited field windings IGSP and 2GSP of the generators from the starting control resistances to the slow down control resistances. The circuit for field winding IGSP is thus through resistance sections ISCR1 and ISCR2, contacts O2 and accelerating switch contacts AB4, while the circuit for field winding 2GSP is through resistance section 2SCR1, contacts AE1 and AD1 of the accelerating switches, and contacts O2 and AB4. This reduces the excitation of the field windings of both the generators, causing further decrease in generator voltage with consequent slowing down of the elevator car.

Relay ST also separates contacts ST3, which breaks the circuit for the coils of No. 1 and No. 2 series field switches YA and YB, provided this circuit has not already been broken at contacts Q2 of the full speed regulating switch. Upon dropping out, these switches reengage contacts YA1 and YA2 and YB1 and YB2 to short-circuit portions of resistances 1SFSR and 2SFSR in shunt with the series field windings of the generators, decreasing the effect of the series fields.

Final accelerating switch RF, in dropping out, also separates contacts RF2, these contacts and contacts ST1, now separated, controlling the circuit for the coil of No. 3 series field switch YC. Thus, owing to the fact that contacts PB1 of the start control relay are separated, the separation of contacts RF2 and ST1 breaks the circuit for the coil of switch YC provided contacts POA1 of the auxiliary brush drop compensating relay are separated. When negative current flows in the motor armature-generator armature circuit, upon the weakening of the excitation of the generator for slowing down the elevator car, brush drop compensating relay PO is swung to its opposite position engaging contacts PO2. This breaks the circuit for the coil of auxiliary brush drop compensating relay POA. Relay POA drops out to engage contacts POA1, thereby maintaining series field switch YC operated. Thus only the portions of series field shunting resistances 1SFSR and 2SFSR controlled by the No. 1 and No. 2 series field switches YA and YB are short-circuited for the slow down operation, thereby providing a moderate series field effect. Should the current in the elevator motor armature-generator armature circuit be positive, auxiliary brush drop compensating relay is maintained operated by relay PO so that series field switch YC drops out. This weakens the series field effect to immediately force the flow of negative current in the motor armature-generator armature circuit. As soon as this happens, relay PO is swung to its opposite position, dropping out auxiliary relay POA, causing the reoperation of series field switch YC to increase the strength of the series field windings.

Upon the arrival of the car at a point at a less distance from the floor, selector switch SS5 opens, effecting the deenergization of the coil of No. 5 accelerating switch AE. This switch drops out to separate contacts AE2 in the circuit connecting the generator separately excited field windings IGSP and 2GSP to each other. It also separates contacts AE1 to insert resistance section 2SCR2 in circuit with field winding 2GSP, decreasing the excitation of the No. 2 generator. This decreases the voltage of this generator and thus the voltage applied to the elevator hoisting motor, thereby decreasing the speed of the elevator car.

As the car arrives at a point still closer to the floor, selector switch SS4 opens. This breaks the circuit for the coil of No. 4 accelerating switch AD. Switch AD upon dropping out separates contacts AD1 to disconnect separately excited field winding 2GSP of the No. 2 generator from the exciter. This further decreases the voltage applied to the elevator hoisting motor and thus further decreases the speed of the car.

Selector switch SS3 is the next to open, the opening of this switch occurring as the elevator reaches a point still closer to the floor. This breaks the circuit for the coil of No. 3 accelerating switch AC. This switch upon dropping out separates contacts AC2 to disconnect self-excited field winding 2GSL from across armature 2GA of the No. 2 generator. It also reengages contacts AC1 and AC3 to reconnect separately excited field winding 2GSP of the No. 2 generator across generator armature 2GA. The polarity of this connection as before is such as to oppose the terminal voltage of the No. 2 generator, reducing this voltage substantially to zero. Switch AC also reengages contacts AC4 to complete the circuit for the coil of auxiliary speed measuring relay GA.

Relay GA upon operation engages contacts GA3, completing a circuit for the coil of preparatory brake switch S, contacts BR1 operated by the brake being separated, breaking the short circuit for the coil of switch S. Switch S upon operation separates contacts S2 to insert resistance section BRR3 in circuit with the brake release coil. This reduces the excitation of this coil sufficiently to permit the brake shoes to drop lightly on the brake drum, but not to such extent as to cause any appreciable retarding action by the brake at this time. This action of the brake causes the closure of contacts BR1. Switch S, at the same time that it causes the brake shoes to engage the drum, separates contacts S3 to remove the short circuit for resistance S3R so that closure of brake switch BR1 does not cause the dropping out of switch S.

Switch S also engages contacts S4 to complete a circuit through contacts X3 of the main operation relay for the coil of damping relay G. Relay G upon operation engages contacts G1 and G2, contacts G2 connecting resistance ISLD1 across self-excited field winding IGSL of the No. 1 generator and contacts G2 connecting resistance ISLD2 in series with field winding IGSL and resistance ISLD1 in parallel relationship. Resistance ISLD1 increases the time constant of this field winding, resistance ISLD2 being of such value as to keep the slope of the resistance line of field winding IGSL after the connection of resistance ISLD1 in parallel with it the same as before this connection is effected. Relay G also engages contacts G3 and G4, which produces a similar effect with respect to No. 1 separately excited field winding IGSP. Contacts G4 connect resistance ISCR3 arcoss field winding IGSP to increase the time constant of the field winding. Contacts G3 short-circuit resistance section ISCR1, the ohmic value of this resistance, however, being such as to cause a further reduction in the terminal voltage of the No. 1 generator to take place, decreasing the speed of the elevator car. During previous operation the self-excited field windings IGSL and 2GSL acted to damp any oscillation in the current supplied to the elevator hoisting motor. Upon connection of the separately excited field winding of the No. 2 generator across the generator armature to oppose the terminal voltage, no further damping is provided by this generator. However, the connection of resistance ISLD1 across the self-excited field winding of generator No. 1 increases the damping action of this winding and additional damping is provided by the separately excited field winding because of the connection of resistance ISCR3 across this winding by relay G. Thus any oscillations in the current supplied to the elevator hoisting motor during the remainder of the retardation period are effectively damped, insuring continued smooth operation for the remaining slow down operation.

Relay GA also engages contacts GA1 and GA2 connecting potentiometer resistance PTR across the tape motor armature TMA, the release coil for its brake, and resistance TMR. Inasmuch as contacts AA1 and AB1 of the accelerating switches and direction switch contacts WU1 are engaged, the effect of this is to connect the coils of speed measuring relays A and AY across the armature of the tape motor through contacts GA2. These relays operate immediately, relay A separating contacts A1 to render the release coil BR of the electromechanical brake subject to up contacts LIU of the levelling switch.

Upon further movement of the car, selector switch SS2 opens which, owing to the fact that contacts TCX2 of the auxiliary reverse field timing relay are separated, breaks the circuit for the coil of No. 2 accelerating switch AB. This switch drops out to separate contacts AB1 connecting the coil of speed measuring relay AY through resistance SMR1 to a point of potentiometer resistance PTR such as to balance the IR drop of the tape motor armature, thereby rendering this relay subject solely to the counter-electromotive force of the tape motor and thus the speed of the elevator car. Switch AB also separates contacts AB4 to disconnect separately excited field winding IGSP of the No. 1 generator from the exciter. At the same time switch AB engages contacts AB6 to connect levelling field winding IGLV on the No. 1 generator to the exciter, this circuit extending through contacts U1 and U2 of the No. 3 direction switch, contacts POA3 of the auxiliary brush drop compensating relay, sections LR1 and LR2 of the levelling field control resistance, contacts AA3 of the No. 1 accelerating switch, contacts S1 of the preparatory brake switch, contacts TCX1 of the auxiliary reverse field timing relay, contacts AB6, starting relay contacts ST4 and brake switch contacts B1. This causes further decrease in the excitation of the No. 1 generator, decreasing the voltage applied to the elevator hoisting motor and thus the speed of the elevator car.

Switch AB also separates contacts AB7, breaking the circuit for the coil of stopping relay XSM, the voltage coil of full speed regulating switch Q and for field winding AMF of the advancer motor. The separation of these contacts also breaks the circuit for the coil of start control switch relay PB. This relay drops out to separate contacts PB4, deenergizing coil LEV of the levelling magnet, which extends the rollers for cooperation with the sixth floor levelling cam. These rollers are delayed slightly in dropping out by the action of resistance LVR connected across coil LEV by contacts AC7 of the No. 3 accelerating switch. Switch PB engages contacts PB3, connecting the coil of No. 3 direction switch U to a circuit controlled by the levelling switch.

If the current in the motor armature-generator armature circuit should become positive at any time during slow down prior to levelling, auxiliary brush drop compensating relay POA is operated, causing the separation of contacts POA1 to deenergize the coil of No. 3 series field switch YC. Switch YC drops out to engage contacts YC1 and YC2, decreasing the value of the shunting resistance for both series field windings or for the No. 1 generator series field winding, depending upon the extent of slow down, thereby decreasing the series field effect. Relay POA also engages contacts POA3 to short-circuit resistance section LR6 in circuit with levelling field winding 1GLV so that if the slow down has progressed to the point where the transfer to the levelling field winding has been effected, this increases the excitation of the generator to compensate for the voltage drop across the brushes. When start control switch relay PB drops out it also reengages contacts PB1 which establishes a circuit for series field switch YC to insure operation of this switch and thus prevent a weak series field on the No. 1 generator for the operation of bringing the car to the floor level, regardless of the condition of relay POA.

As the car arrives at a point still closer to the floor, selector switch SS13 recloses, reestablishing a circuit for the coil of selector centering relay O. This relay operates to reengage contacts O4, by-passing contacts N2 and AA6 in the holding circuit for the coil of relay PMX.

Immediately after the closing of selector switch SS13, selector switch SS1 opens, breaking the circuit for the coil of No. 1 accelerating switch AA. This relay drops out to separate contacts AA1 connecting the coil of speed measuring relay A through resistance SMR2 to the balance point on potentiometer resistance PTR, thereby rendering this relay directly subject to the speed of the elevator car. Switch AA also reengages contacts AA7, but this does not reestablish the circuit for the armature of the advancer motor as this circuit is open at contacts AB7 and OS2. Switch AA also separates contacts AA6 in the circuit for the coil of auxiliary motor advance panel stopping relay PMX, these contacts being by-passed at this time, however, by contacts O4 of selector centering relay O. Switch AA also separates contacts AA4 which, owing to the fact that contacts PB2 of the start control switch relay are separated, transfers the circuit for the coil of No. 3 up direction switch U to the control of the levelling switch. Switch AA also separates contacts AA3, inserting section LR3 of the control resistance in the circuit for levelling field winding 1GLV. This decreases the excitation of this field winding, further decreasing the voltage applied to the elevator hoisting motor, thereby decreasing the speed of the elevator car. If the current from the motor armature-generator armature circuit is negative at the time contacts AA3 separate, contacts POA4 are also separated so that the separation of contacts AA3 also inserts resistance section LR4 in the circuit with the levelling field winding, further decreasing the excitation of the generator.

During the slow down operation the synchronous panel has continued its upward motion. Just before it lines up with the distance advance panel, distance advance switch DAU opens, breaking the circuit for the coil of selector advance relay N. This occurs after the closing of selector switch SS13 to reestablish the circuit for the coil of selector centering relay O. Relay N drops out to separate contacts N2, these contacts being by-passed, however, by contacts O4, maintaining the circuit for the coil of auxiliary advance panel stopping relay PMX.

When the rollers of the levelling mechanism are extended for cooperation with the sixth floor levelling cam, the up roller engages the cam, maintaining up levelling switch contacts L4U, L2U and L1U in engagement and up levelling switch contacts L3U separated. The down roller does not strike the cam so that down levelling switch contacts L4D, L2D and L1D separate and down levelling switch contacts L3D engage. The circuit for the coil of the No. 3 up direction switch U at this time is therefore through contacts D3, up levelling switch contacts L4U, down levelling switch contacts L3D, contacts PB3, up levelling switch contacts L2U, up levelling switch contacts L1U and contacts XU1 of the No. 2 direction switch.

As the car arrives at a certain distance from the floor, the cam reaches a position with respect to the up roller which permits the separation of levelling switch contacts L1U. If the speed of the elevator car is at or above a predetermined value at this time, relay A is in operated condition, maintaining contacts A1 separated. Under such conditions, the separation of up levelling switch contacts L1U breaks the circuit for the coil of up direction switch U and for brake release coil BR. Up direction switch U drops out to separate contacts U1 and U2, breaking the circuit for levelling field winding 1GLV, causing discontinuance of excitation of the No. 1 generator and as the brake releases coil is deenergized, the brake is applied, bringing the car to a stop. The stopping distance is such as to cause the car running at or above the aforementioned speed at the time levelling switch contacts L1U separate to be brought to a stop substantially at the floor landing. If the speed of the car at the time levelling switch contacts L1U separate is below the aforementioned predetermined value, relay A is dropped out so that contacts A1 are in engagement. Therefore the separation of up levelling switch contacts L1U under such conditions does not break the circuit for the coil of switch U or for the brake release coil. The car continues in operation toward the floor and upon reaching a certain point closer to the floor the levelling cam runs off the up roller, causing the separation of up levelling switch contacts L4U and L2U to break the circuit for the coil of up direction switch U and for the brake release coil to cause the car to be brought to a stop. This stopping distance is such as to cause the car to be brought to a stop substantially level with the floor when the speed of the car at the time up levelling switch contacts L1U separate is below the aforementioned predetermined value.

Direction switch U upon dropping out also separates contacts U5 to break the circuit for the coil of motion relay M and also separates contacts U7, breaking the circuit for the coils of preparatory brake switch S, brake switch B, main operating relay X and damping relay G. Switch B upon dropping out reengages contacts B2 and B3 to short-circuit section BRR2 of the discharge resistance for the brake release coil to soften the application of the brake.

Should the car tend to stop short of the floor when the stop is effected by the separation of levelling switch contacts L1U under conditions where the speed of the elevator car is such that contacts A1 are separated, upon reengagement of contacts A1 the circuit for the coil of up direction switch U and the brake release coil BR is reestablished through levelling switch contacts L4U and L2U. Switch U causes the operation of switch B to complete the circuit for the levelling field winding IGLV and short-circuit section BRR1 of the brake release coil control resistance, causing full release of the brake. Current in the levelling field winding builds up as the brake is being released. During this period resistance section LR5 is inserted in the circuit for the levelling field winding. However, as soon as the brake releases, switch S is operated as previously described, causing the engagement of contacts S1 to short-circuit resistance section LR5. With this arrangement, the possibility of building up current in the levelling field winding circuit to such extent as to cause the car to overrun the floor is minimized because the short circuiting of section LR5 of the levelling field control resistance is delayed until after the brake is released, so that the motor does not have to pull through the brake, and until after the motor starts in operation to develop a counter electromotive force to oppose the building up of the current. Also, switch S separates contacts S2 to engage the brake shoes with the brake drum. Just before the car arrives at the floor level, levelling switch contacts L4U and L2U separate to bring the car to a stop as above described.

At the same time that the circuit for the brake release coil is broken, the circuit for the coil of stop control time relay TA is broken. This relay does not drop out immediately, being delayed for a certain time interval after the circuit for its coil is broken. So long as relay TA does not drop out, the motion device clutch magnet MD is maintained energized through contacts MDX3, DC1 and TA3. Thus, if the car should overrun the floor, motion device contacts MD3U are maintained in engagement and motion device relay MDX is maintained operated until the car is reversed.

Assume that the car does overrun the sixth floor before being brought to a stop. Under such conditions, the levelling cam engages the down levelling roller, causing the separation of levelling switch contacts L3D and the engagement of levelling switch contacts L4D and L2D. The engagement of contacts L4D and L2D completes a circuit for the coil of No. 3 down direction switch D through contacts A1, now in engagement. Also, the engagement of contacts L2D reestablishes the circuit for the coil of stop control time relay TA, maintaining this relay in operated condition. Also, contacts L2D reestablish the circuit for the brake release coil BR. Switch D upon operation separates interlock contacts D3 and engages contacts D4, establishing the circuit for the coil of levelling back speed control relay LL. The circuit is through brush OVB on the synchronous panel and sixth floor contact OV6, contacts XU3 of No. 2 up direction switch, contacts D4, the coil of relay LL, speed measuring relay contacts A2 and main operating relay contacts X1. It is to be noted that neither switch D nor relay LL can be operated until the speed of the car has dropped to a value to permit relay A to drop out, the operation of relay LL also being subject to the dropping out of relay X and thus the up direction switch U. Also, the brake cannot be released until relay A drops out, thereby minimizing the amount of overrun. Relay LL upon operation engages contacts LL4, establishing a self-holding circuit. It also separates contacts LL3 to remove the short circuit for section BRR4 of the discharge resistance for the brake release coil. Switch D also engages contacts D7, reestablishing a circuit for the coil of switch B. Switch B upon operation engages contacts B4, short-circuiting section BRR1 of the resistance in series with the brake release coil, contacts S2 being in engagement short-circuiting resistance section BRR3, causing the full release of the brake. At the same time switch B engages contacts B1, completing a circuit for the levelling field winding IGLV through contacts D2 and D1 of the down direction switch, sections LR6, LR1 and LR2 of the levelling field control resistance, motion device relay contacts MDX1, levelling back speed control relay contacts LL1, and thence through contacts TCX1, AB6, ST4 and B1 as previously described. This causes the starting of the car in the down direction to return it to the floor.

As the brake releases, it opens contacts BR1 to break the short circuit for the coil of preparatory brake switch S. This switch separates contacts S2 to insert resistance section BRR3 in circuit with the brake release coil, permitting the brake shoes to engage the brake drum as previously described. As the car starts its downward movement, motion device contacts MD3U open, breaking the circuit for the coil of motion device relay MDX. Relay MDX drops out, separating contacts MDX3 to break the holding circuit for the motion device clutch magnet, allowing the motion device to center itself. Relay MDX also separates contacts MDX1, removing the short circuit for portions LR3 and LR4 of the control resistance for the levelling field winding IGLV, thus reducing the voltage applied to this winding. Contacts LL2 maintain resistance section LR5 short-circuited. With this arrangement, sufficient excitation is applied to the No. 1 generator to insure a quick starting of the elevator car under all load conditions to return the car to the landing. During this starting operation, as soon as a small amount of positive current is present in the motor armature-generator armature circuit, relay PO operates to engage contacts PO2, connecting the coil of relay POA in parallel with the coil of switch D. Relay POA operates to engage contacts POA3 and POA4 to short-circuit sections LR6 and LR4 respectively of the levelling field control resistance, increasing the voltage of the generator.

Just before the car arrives at the floor level, levelling switch contacts L4D and L2D separate, breaking the circuit for the coil of switch D and for the brake release coil BR. Switch D drops out to separate contacts D4, deenergizing relay LL. It also separates contacts D1 and D2 to break the circuit for the levelling field winding and as the brake release coil is deenergized, the brake is applied and the car is brought to a stop. Switch D also separates contacts D7 to break the circuit for the coil of switch B, which drops out to reengage contacts B2 and B3 to short-circuit section BRR2 of the brake release coil discharge resistance. However, contacts LL3 are separated at this time so that resistance section BRR4 is in the brake release coil discharge circuit, causing a harder application of the brake.

It is to be noted that when the brake is applied to bring the car to a stop, the motor field is maintained at full strength, the effectiveness of the series and self-excited field windings is maintained and no field winding is connected across the generator armature with a polarity to oppose the generator voltage. As a result, when the brake is applied the change in torque exerted by the hoisting motor is the same regardless of load.

This is due to the fact that the motor field strength remains the same and that the current change in the motor armature circuit is the same regardless of load. Thus when the brake is applied the slide will be unaffected by load and, since the brake pressure is limited by the feeling to passengers in the car, more brake pressure can be used as compared to stopping under conditions where load is allowed to assist the brake. Also, the car can be stopped within a limited dead zone from a higher speed as compared to stopping under the condition where load is allowed to oppose the brake action.

During the operation of the car, selector switch SS11 is closed to maintain a circuit for the coil of door operating relay P. As the car arrives at a certain distance from the floor, this switch opens to deenergize relay P and thus initiate the door and gate opening operation, provided the speed of the elevator car is not above a certain value. If the speed of the car is above such value, contacts AY1 are in engagement by-passing selector switch SS11 so that the opening of this switch is ineffective until the speed of the car has decreased to a point where contacts AY1 separate. Also, selector switch SS11 is by-passed by contacts GA4 of auxiliary speed measuring relay GA. These contacts are provided to render selector switch SS11 ineffective when it is improperly set to open prior to the dropping out of No. 3 accelerating switch AC. Upon the deenergization of relay P, contacts P1 reengage to complete the circuit for the coil of door open switch DO. This switch operates to engage contacts DO1 and DO3 in the circuit for the armature of the door and gate operating motor to effect the opening of the car gate and hatchway door as the car comes to a stop. It is believed that this operation will be understood from previous description of the operation of the door and gate.

Stop control time relay TA is deenergized as the car comes to a stop. This switch is delayed in dropping out for a short interval to insure that the car has been brought to a full stop at the floor. Upon dropping out, this relay separates contacts TA3 to break the holding circuit for the motion device clutch magnet, permitting the motion device to center itself, provided this operation has not already been effected by the dropping out of the motion device relay MDX on an overrun. Relay TA also separates contacts TA2, breaking a circuit for the coil of auxiliary speed measuring relay GA, causing this relay to drop out. The separation of contacts TA2 also breaks the circuit for the coil of elevator motor field switch HB. This switch drops out to separate contacts HB2, removing the short circuit for resistance EMR in circuit for elevator motor field winding EMF. This reduces the current in the elevator motor field winding to a standing field value. With the decrease in motor field strength delayed until the expiration of a predetermined time interval after the car has been stopped, full motor field strength is assured during the application of the brake. Switch HB also separates contacts HB1 to disconnect the self-excited field winding 1GSL of the No. 1 generator from across its generator armature. The separation of contacts TA2 also breaks the circuit for the coil of No. 3 series field switch YC which drops out to reengage contacts YC1 and YC2 to reduce the effectiveness of the series field winding of generator No. 1 to a minimum.

The separation of contacts TA2 also breaks the circuits for the coils of the driving motor running switches LA and LB of the No. 1 and No. 2 generators respectively. Switch LA upon dropping out reengages contacts LA4 to prevent the deenergization of the coil of potential switch C upon separation of contacts MC1 of the minimum current field relay, which drops out as a result of the weakening of the elevator motor field. Switch LA also separates contacts LA1, LA2 and LA3 to disconnect the stator windings of the driving motor of the No. 1 generator from the alternating current supply mains, shutting down this set. Switch LB separates contacts LB1, LB2 and LB3, disconnecting the driving motor of the No. 2 generator from the alternating current supply mains, shutting down the No. 2 set.

Should the start control switch be held in "on" position as the stop is being made, starting switch sequence relay OS is maintained energized through start control switch contacts SC1 after the door and gate start to open and gate contacts GC1 separate. Thus contacts OS2 are separated, preventing the establishment of any of the starting circuits through start control switch contacts SC2. Also, contacts OS1 remain in engagement, maintaining switches LA and HB operated and thus relay GA operated. Thus contacts GA4 are maintained separated, preventing the energization of the coil of door close switch DC to effect the reclosure of the hatchway door and car gate. The start control switch must therefore be returned to "off" position to effect the reclosure of the door and gate and the restarting of the car away from the sixth floor.

It will be seen from the above description that, with the car operating at full speed when a call is picked up, the motor advance panel is brought to a stop while the distance and synchronous panels continue their movement. Incident to the continued movement of the distance advance panel, the stopping relay is operated but this is ineffective to initiate slow down.

As the distance advance panel lines up with the motor advance panel, the pawl magnet is deenergized, releasing the stopping lugs into the path of movement of the pawls. As a result of the continued movement of the car, the up pawl engages the sixth floor stopping lug and causes the opening of a selector switch to initiate slowing down of the car. Initial slow down is effected by reinserting resistance in circuit with the self-excited field winding of each generator, increasing the slope of the resistance line and thus decreasing the effect of the winding for the slow down operation. Also, this decreases the voltage of each generator, slowing down the car. Also, slow down control resistances are inserted in the circuits for the separately excited field windings, which decreases the excitation of the field windings of both generators and thus the voltage applied to the elevator motor.

As the car continues its movement, the separately excited field windings are disconnected from each other and the excitation of the field winding of the No. 2 generator is decreased, thus further decreasing the speed of the elevator car. Upon still further movement of the car, the separately excited field winding of the No. 2 generator is disconnected from the exciter, further decreasing the voltage applied to the elevator motor and thus further decreasing the speed of the car. Still further movement of the car results in the disconnection of the self-excited field winding of the No. 2 generator from the generator armature and the reconnection of the separately excited field winding of this generator across the generator armature. At the same time the brake shoes are applied lightly to the drum. Also, at this time resistances are connected across in series with both the self and separately excited field windings of the No. 1 generator to increase their time constants and at the same time to decrease the excitation of the No. 1 generator to further decrease the speed of the car. This and further steps of retardation are smoothed out by the resistances connected across the field windings. As the car arrives still closer to the floor, the excitation of the No. 1 generator is transferred from the separately excited field winding to the levelling field winding. This causes further decrease in the excitation of the generator, thus further decreasing the speed of the car. Further movement toward the floor during the remainder of the slow down period causes decrease in excitation of the levelling field winding an amount dependent upon whether the current in the motor armature-generator armature circuit is positive or negative, a greater decrease being effected in the event of negative current flow.

The levelling mechanism now takes control to bring the car to a stop level with the floor landing. As the car arrives at a certain distance from the floor, the levelling contacts separate and, provided the speed of the elevator car is at or above a predetermined value, this causes the discontinuance of the excitation of the No. 1 generator and full application of the brake to stop the car. If, however, the speed is below this value, the excitation of the generator and brake release coil is maintained until the car arrives at a point still closer to the floor, whereupon other levelling switch contacts open to effect discontinuance of the generator excitation and a full but soft application of the brake to bring the car to a stop.

Should the car tend to stop short of the floor when stopping as a result of the opening of the first levelling switch contacts, excitation of the levelling field winding of the No. 1 generator is reestablished and the brake released to cause the car to continue in operation to the floor until the next levelling switch contacts separate to stop the car. The excitation of this winding is reduced until the brake has been released so that the generator excitation is not built up sufficiently to cause the car to run past the floor.

Should the car stop beyond the floor, the brake is released and the levelling field winding of the No. 1 generator is excited to cause the return of the car to the floor landing. Sufficient excitation is applied to this field winding to insure quick starting of the elevator car under all load conditions to return it to the floor, relatively high excitation being effected initially and reduced as soon as the car starts. As the car arrives at the landing, excitation of the generator is discontinued and full hard brake application is effected to bring the car to a stop. The motor field is maintained at full strength and the effectiveness of the self-excited field winding and series field winding of the No. 1 generator is maintained for the final stop. Upon the expiration of a short time interval after the car has been brought to a stop, the motor field strength is reduced, the self-excited field winding of the No. 1 generator is disconnected from the generator armature, the effectiveness of the series field winding of the generator is reduced, and the driving motors of both motor generator sets are disconnected from the supply mains to discontinue their operation.

Although the stopping operation in response to a car button has been described, stopping of the car during its upward travel is effected in a similar manner in response to an up hall button. Assume that the sixth floor up hall button 6UH had been pressed instead of the sixth floor car button. This causes the operation of the up sixth floor relay 6U to engage its contacts 6U1. Upon the engagement of up hall call pick up brush UHB with stationary contact 6UHP a circuit is completed through contacts WU10 and NM2 for the coil of motor advance panel stopping relay PM. This relay operates to engage contacts PM1, completing a circuit through contact 6PH and brush PHB and contacts O4 for the coil of auxiliary motor advance panel stopping relay PMX. Relay PMX acts to cause the stopping of the motor advance panel as previously described. The circuit for the coil of relay PM extends through the restoring coil of up floor relay 6U. However, the current through this circuit is insufficient to cause the floor relay to be reset. Upon operation of relay PMX contacts PMX3 engage, connecting resistance PMR in parallel with the coil of relay PM. This increases the current flow in the restoring coil of floor relay 6U sufficiently to cause this floor relay to be reset. As the distance advance panel continues its movement, a circuit is completed for the coil of stopping relay XSM, as previously described, to cause the separation of contacts XSM1 and, just before the distance advance panel lines up with the motor advance panel, switch MAU is opened to cause, through the deenergization of pawl magnet relay NM, the deenergization of the pawl magnet. Thus, as the car continues its movement, selector switch SS12 is opened to initiate slowing down of the car and the car is thereafter further slowed down and finally brought to a stop at the sixth floor as previously described. Relay NM in dropping out also separates contacts NM2 to deenergize the coil of relay PM and thus effect the separation of contacts PM1, relay PMX being held in as before through resistance PMXR. As the car arrives at the floor, the car gate and hatchway door are automatically opened. Upon the expiration of a short time interval after the car comes to a stop at the landing, the motor generator sets are shut down.

Registration of an up hall call at any time before the leading section of brush UHB disengages the corresponding stationary contact causes the car to stop at the floor for which the call is registered on its upward trip. If the push button is pressed just before this leading section disengages the contact, the motor advance panel may stop in position with this section above the contact. Under such conditions the contact will be engaged by the trailing section of the brush while the motor advance panel is stopped. If the up hall button is pushed again after the call is picked up or is pushed after a car call for that floor is picked up, the restoring coil of the up hall button floor relay, say floor relay 6U, is energized either through the leading section of brush UHB or through the trailing section of the brush and contacts PMX2, the value of resistance PMR being such that even with contacts NM2 separated the floor relay is reset as soon as the button is released. This reset operation is effective at any time until the start control switch is thrown to start position to restart the car. When this is done brush UHB runs off stationary contact 6UHP so that the floor relay, if operated, remains in operated condition. Also, relay PMX is deenergized by brush PHB running off contact 6PH.

Assume for convenience of further description that no call is registered to cause the stopping of the car on its upward trip. Under such assumption, the car travels to the upper terminal floor, where it is automatically brought to a stop. This stop is effected in a manner similar to that described for the stop at the sixth floor, relay PMX being energized upon the engagement of brush CPB with stationary contact CCP for the upper terminal floor. As the car approaches the floor, terminal stopping switch contacts TM7, TM2, TM3, TM4, TM1 and TMU8 open in sequence to insure the dropping out of the various switches involved in the slow down and stopping operation.

As the car reaches the terminal floor, brush CDB engages stationary contact 8CD to complete a circuit for the unlatch coil of direction determining switch R, causing this switch to be reset. This causes the engagement of contacts R2 and R4 and the separation of contacts R1 and R3. This in turn causes the dropping out of the No. 1 and No. 2 up direction switches WU and XU and the operation of the No. 1 and No. 2 down direction switches WD and XD. Incident to this change, switch XU separates contacts XU2 and switch XD engages contacts XD2, momentarily deenergizing car button magnet CBM. This is to release all car buttons that are in operated condition. It is to be noted that in this switching operation the current through magnet CBM is reversed. This insures the release of the car buttons. The contacts of switches WD and XD take the place of the corresponding contacts of switches WU and XU in the direction control circuits.

Contacts A2 of speed measuring relay A are arranged in a circuit for the unlatch coil of direction determining switch R, preventing this switch from being unlatched until relay A drops out. This arrangement is provided to prevent the dropping out of switch XU and the operation of switch XD and thus prevent the energization of the brake release coil through contacts L1D, XD1 and L2D to lift the brake when the car overruns the floor until the speed of the car has decreased to the value at which relay A drops out, thereby minimizing the amount of over-travel when the car overruns the terminal floor.

Should the car overrun the upper terminal, level back speed control relay LL is operated as before, the circuit, however, extending from brush OVB through contact 8OV, which is connected directly to contacts D4. This circuit by-passes contacts XU3, thereby assuring the operation of relay LL and maintaining it in operated condition with contacts XU3 separated as a result of the unlatching of switch R.

The car is started from the upper terminal by moving the start control switch to full "on" position. This causes the closing of the car gate and hatchway door and the advance of the motor advance panel as before, the circuit for the armature AMA of the advancer motor being through contacts WD11 and WD12. During the initial advance of the motor advance panel, down motor advance switch MAD closes, completing a circuit for the coil of pawl magnet relay NM. This causes the energization of pawl magnet SM to retract the stopping lugs, resulting in the engagement of contacts SM1 to cause the operation of starting relay ST. Also, the brake release coil is partially energized, the self-excited field winding 1GSL of the No. 1 generator is connected to the generator armature and both motor generator sets are started in operation as previously described, with the stator windings of the No. 1 set connected in delta relation and those of the No. 2 set connected in star relation.

When the door and gate reach closed position, the circuit for the coil of the No. 3 down direction switch D is completed through door contacts HDC and gate contacts GC2, this circuit extending through contacts U3, terminal stopping switch contacts TMD8, contacts R2 and contacts PB2. Switch D upon operation engages contacts D7, completing a circuit for the coils of switch B and relay X. It also engages contacts D5, completing a circuit for the coil of motion relay M, and engages contacts D6, completing a circuit for the motion device clutch magnet MD. Switch B completes the starting circuit of the No. 1 generator separately excited field winding as before, this circuit, however, being through contacts WD4 and WD5 instead of contacts WU4 and WU5, so as to establish the opposite polarity. Thus the armature of the elevator motor is supplied with current which builds up to start the car in the down direction. The desired effect of the series field winding of the No. 1 generator is obtained through the operation of switches YA and YC as before. Also, excitation of the separately excited field winding is momentarily of a high value as previously described, this being effected by the operation of switch M, which is dropped out by the separation of down contacts MD1D of the motion device as the car starts in the down direction.

Further rotation of the elevator motor in starting causes the engagement of motion device contacts MD2 to establish the circuit for the coil of first accelerating switch AA to increase the excitation of the No. 1 generator. Still further rotative movement of the elevator motor causes the engagement of motion device contacts MD3D to complete a circuit for the coil of motion device relay MDX. This in turn causes the operation of the No. 2 accelerating switch AB and thereafter as the car reaches points certain fixed distances from the upper terminal floor the various switches are operated to increase the excitation of the No. 1 generator and to cause the No. 2 generator to be excited (the circuit being through contacts WD2 and WD3) and its excitation increased, thus bringing the car up to full speed. It is believed that these operations will be understood from the description of starting the car in the up direction from the lower terminal.

Assume that the down hall button 2DH at the second floor is pressed before the disengagement of the leading section of brush DHB from second floor contact 2DHP. This completes a circuit through contacts WD10 for the coil of relay PM which in turn causes the operation of relay PMX. This causes the deenergization of the advancer motor armature, bringing the motor advance panel to a stop. Also, the engagement of contacts PMX3, and also contacts PMX1 in the event that the leading section of brush DHB has moved to a position below contact 2DHP, causes the reset of the down second floor relay 2D. As the distance advance panel continues its downward movement a circuit is completed through brush APB, contact AP2, contact 1PR2, brush 1DPB, contacts WD9, selector contacts SS9 and contacts AA5 for the coil of stopping relay XSM. Just before the distance advance panel lines up with the motor advance panel, down motor advance switch MAD is opened to deenergize relay NM. This causes the deenergization of pawl magnet SM to release the stopping lugs. The down pawl thereupon engages the second floor lug, bringing the distance advance panel to a stop. This causes the opening of the selector switches in sequence as the car continues its movement toward the second floor, to cause the slowing down and finally the stopping of the car at the second floor landing, the car gate and hatchway door opening automatically as the car arrives at the landing. Also, both motor generator sets are shut down. It is believed that this will be understood from the description of operation of slowing down and stopping the car in response to a call in its upward travel.

During downward travel when the current supplied to the elevator motor is above a certain positive value, relay PO engages contacts PO2. When negative current flows in the motor armature-generator armature circuit, this relay is swung to its opposite position, engaging contacts PO1, thereby breaking the circuit for the coil of relay POA to provide a moderate series field. When the levelling field winding IGLV of the No. 1 generator is connected in circuit, the circuit extends through contacts D1 and D2 instead of contacts U1 and U2. When the levelling mechanism takes control, the coil of switch D is transferred to a circuit through contacts U3, levelling switch contacts L4D and L3U, contacts PB3, levelling switch contacts L2D, contacts XD1, and levelling switch contacts L1D. As the car arrives at the second floor landing, the opening of the levelling switch contacts causes the dropping out of switch D to cause the car to be brought to a stop. Should the car overrun the floor, the circuit for the coil of level back relay LL is established through brush OVB, second floor contact OV2, contacts XD3 and contacts U4. When an overrun takes place, switch U is operated to return the car to the floor in a manner similar to that described for returning the car to the floor after an overrun in the up direction.

With the car set for downward travel having a passenger wishing to be let off at an intermediate floor, the attendant presses the car button for this floor and the call is picked up upon the engagement of brush CPB with the stationary contact for that floor. This causes the operation of relay PMX, resulting in the stopping of the motor advance panel and the subsequent slowing down and stopping of the car at the floor in the manner above described.

If no calls are registered to stop the car on its trip from the upper terminal floor to the lower terminal floor, relay PMX is operated upon the engagement of brush CPB with first floor stationary contact ICP. This causes the stopping of the motor advance panel and the subsequent slowing down and stopping of the car at the first floor as above described, terminal stopping switch contacts TM7, TM2, TM3, TM4, TM1 and TMD8 opening in sequence to insure the slowing down and stopping of the car. As the car arrives at the lower terminal, the latch coil of direction determining switch R is energized through brush CDB and contact ICD, causing the latching of this switch in operated condition, changing the direction control switches from down to up.

It is believed that it will be understood without further detailed description that with the circuit arrangement shown the car will stop in response to all hall buttons pressed, regardless of the time order in which these buttons are pressed, since the contacts of the corresponding floor relays, once in engagement, are maintained so until released by reset operation. Also, car buttons that are pressed are maintained depressed by the car button magnet until the terminal floor is reached. Stops are made in the natural order of floors even though the push buttons are pressed out of said order. Car buttons cause the stopping of the car regardless of whether it is travelling in the up or the down direction. As regards hall buttons, however, during up car travel the car stops in response to up hall calls and during down car travel in response to down hall calls. If for any reason, as for example when the car is fully loaded, it is desired to run past hall calls without stopping, this may be done by opening non-stop switch NS, which prevents the energization of relay PM to pick up a hall call. These calls remain registered, however, and are answered on a subsequent trip of the car. Both motor generator sets are shut down upon each stop, being maintained in operation long enough to insure that the car has come to a stop at the landing.

Figure 21:
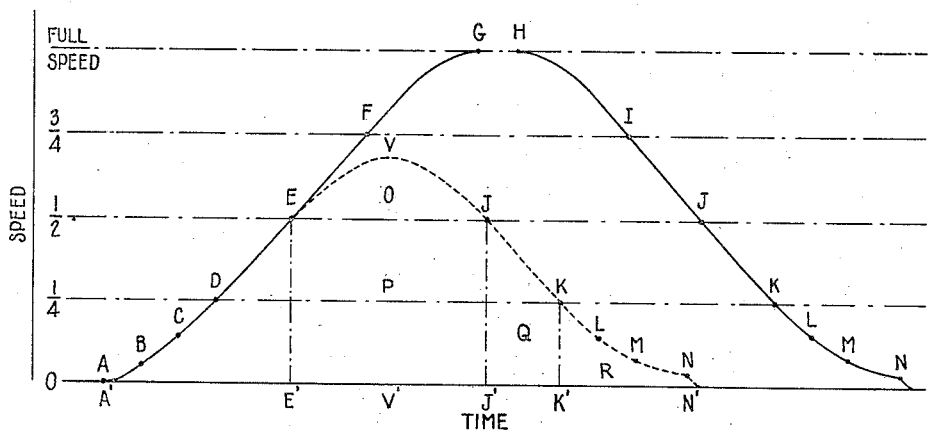
Figure 21 is a curve illustrating the acceleration and retardation of the car.

As pointed out above, the switches controlling acceleration and retardation are operated in accordance with the distance travelled by the elevator car in starting and in accordance with the distance of the car from the landing in slowing down and stopping. These switches are set to operate to give substantially equal increments of speed for equal increments of time during acceleration and to decrease the speed in equal increments over equal increments of time during slow down, thereby providing substantially constant acceleration and retardation. This is indicated in Figure 21 which shows in full lines a typical speed-time curve for a full speed run. A number of points are indicated on this curve, representing the following conditions:

*Point A.*—Switch B is operated, which completes the starting circuit for the separately excited field winding of the No. 1 generator and lifts the brake to start the car.

*Point B.*—Motion device contacts MD2 close, causing the operation of first accelerating switch AA. This increases the excitation of the separately excited field winding of the No. 1 generator, increasing the voltage applied to the hoisting motor.

*Point C.*—Motion device contacts MD3 close, causing the operation of second accelerating switch AB. This further increases the excitation of the separately excited field winding of the No. 1 generator, increasing the voltage applied to the hoisting motor.

*Point D.*—The car has attained one-quarter full speed. Selector switch SS3 closes, causing the operation of No. 3 accelerating switch AC to excite the No. 2 generator to add its voltage to that of the No. 1 generator.

*Point E.*—The car has attained one-half full speed. Selector switch SS4 causes the operation of No. 4 accelerating switch AD to increase the excitation of the No. 2 generator, thereby increasing the voltage applied to the hoisting motor.

*Point F.*—The car has attained three-quarters full speed. Selector switch SS5 causes the operation of No. 5 accelerating switch AE. This connects the starting circuits for the separately excited field windings of both generators together and increases their excitation, thereby increasing the voltage applied to the hoisting motor. It also causes operation of the final accelerating switch RF to increase the effect of the self-excited field windings of both generators to further increase the voltage applied to the hoisting motor.

*Point G.*—The car attains full speed.

*Point H.*—Selector switch SS12 opens the drop out relay ST. This transfers the separately excited field winding of both generators to slow down control circuits, decreasing the separate excitation of the generators. Also, the effect of the self-excited field windings is decreased. Thus the voltage of the generators is decreased, initiating the slowing down of the car.

*Point I.*—The car speed has decreased to three-quarters full speed. Selector switch SS5 opens, dropping out No. 5 accelerating switch AE, disconnecting the separately excited field windings of the generators from each other and decreasing the voltage of the No. 2 generator.

*Point J.*—The speed of the car has decreased to one-half full speed. Selector switch SS4 opens to drop out No. 4 accelerating switch AD. This discontinues the excitation of the No. 2 generator, further decreasing the voltage applied to the hoisting motor.

*Point K.*—The speed of the car has decreased to one-quarter full speed. Selector switch SS3 opens, causing the operation of switch G to decrease the excitation of the No. 1 generator to further decrease the voltage applied to the elevator motor.

*Point L.*—Selector switch SS2 opens to transfer the excitation of the No. 1 generator from the separately excited field winding to the levelling field winding. This further decreases the voltage applied to the hoisting motor.

out No. 1 accelerating switch AA to decrease the

*Point M.*—Selector switch SS1 opens to drop excitation of the levelling field winding, further decreasing the voltage applied to the hoisting motor.

*Point N.*—The levelling switch contacts open to deenergize the levelling field winding and apply the brake to bring the car to a stop.

On short floor runs in which the car does not attain full speed, the car is caused to accelerate in accordance with the above described curve. However, if the car were permitted to follow this curve up to the point where the selector switches started to open, an excessive speed would be reached from which it would be impossible to slow the car down to bring it to a stop at the floor without throwing the system into a state of objectionable oscillation. Therefore, on short floor runs, the excitation of the generator is decreased to force down the current in the motor armature circuit before the selector switches start to open. This decreases the rate of acceleration and starts retardation, effecting this change without any feeling of discomfort to the passengers and so that the remainder of the retardation may be effected by the opening of the selector switches without objectionable oscillations.

In order that this may be more readily understood, a short floor run will be described. On a short floor run, an effective call pick up brush on the motor advance panel engages an "alive" stationary contact before reaching fully advanced position. When this occurs, the advancer motor is deenergized when the call is picked up and the motor advance panel is brought to a stop in neutral position with respect to the floor bar for the floor for which the call is picked up. The car, in starting, follows the acceleration portion of the speed-time curve of Figure 21. Assume that the length of the run is such that stopping relay XSM is energized just after the car reaches point E on the speed-time curve. Under such conditions, selector switch SS9 is closed, so that for up car travel, for example, the coil of relay XSM is energized upon the engagement of brush 1UPB with its contact for the floor at which the stop is to be made. Also, selector switch SS12 is not closed, so that the operation of relay XSM breaks the circuit for the coils of relays ST and TC. Relay ST drops out immediately, transferring the separately excited field winding of the generators from their starting circuits to their slow down circuits. This decreases the excitation of the generators. Relay TC does not drop out immediately, being delayed for a short time interval. As a result, the engagement of contacts ST4 of the starting relay completes a circuit through contacts WU6, WU7 and MDX2, resistance RVR, and contacts TC3, ST6 and B1 for the reverse field windings 1GRV and 2GRV of the generators. The magnetizing forces of these two field windings oppose that of the other field windings of the generator, thereby effecting a considerable decrease in the excitation of the generators. This forces down the current in the motor armature circuit and causes a gradual decrease in the slope of the acceleration portion of the speed-time curve until the acceleration stops, whereupon retardation begins with the slope of the retardation curve gradually increasing. This is indicated by the dotted line curve of Figure 21, beginning at the point E. The action of the reverse field windings takes place only for the duration of the time of dropping out of relay TC. However, this relay is set to provide the proper time for effecting this change. During this period, selector switch SS5 may close but it opens right up again as retardation begins, the distance advance panel being stopped by the engagement of the pawl with the lug for the floor at which the stop is being made, as the car reaches point V half the length of the run, the pawl magnet in turn having been deenergized just before the distance advance panel catches up with the motor advance panel as previously described. Thus upon the opening of selector switch SS4 the slope of the retardation portion of the speed-time curve is substantially the same as for a full speed run and the remainder of the retardation follows this slope as indicated by the continuance of the dotted line and is effected without any objectionable oscillations.

Should stopping relay XSM operate after the point F on the speed-time curve is reached, the current in the motor armature circuit is forced down as described above. However, the duration of this forcing period, or in other words the number of negative volt seconds employed to effect this build down in the current, is dependent upon the time which has passed since the deenergization of reverse field time relay TC. In other words, the sooner TC drops out the shorter the duration of the build down period. Otherwise the operation of a such a short floor run is in accordance with that described above.

It is desirable to effect this change from acceleration to retardation in a fixed time, this being provided by time relay TC. The longer the short floor run is the greater the speed that the car will attain. Therefore in order to properly effect this change for different lengths of short runs within the time provided by relay TC, the operation of relay XSM is effected at different distances from the point at which the pawl engages the stopping collar for the floor at which the stop is to be made, depending upon the length of the run. This is done by controlling the effectiveness of brushes IUPB, IDPB, 2UPB and 2DPB in accordance with the distance travelled by the car. Assuming up car travel, for example, if selector switch SS9 has closed before brush IUPB engages the contact for the floor at which the stop is to be made, relay XSM is operated a certain distance before the pawl engages the stopping lug. However, if selector switch SS9 does not close until after the brush has engaged this contact, relay XSM is operated at a less distance from the point at which the pawl engages the lug, dependent upon the point at which switch SS9 closes. If, on the other hand, selector switch SS9 does not close until after the brush has disengaged the contact, relay XSM is operated by the engagement of brush 2UPB with its contact for that floor. If selector switch SS8 has closed before this brush engages the contact, relay XSM is operated at a certain distance before the pawl engages the stopping lug, this distance being shorter than those obtained by operating relay XSM by the engagement of brush IUPB with its contact. However, should brush 2UPB be in engagement with its contact at the time switch SS8 closes, relay XSM is operated at a still less distance from the point at which the pawl engages the stopping lug, this distance depending upon the point at which switch SS8 closes. In this way the current in the motor armature circuit is forced down within a fixed time so as to effect a change from acceleration to retardation on various lengths of floor runs so that the remainder of the retardation may be effected in response to the opening of the selector switches at substantially the same rate as on a full speed run.

This may be better understood from a consideration of the distances travelled by the car during acceleration, retardation and change from acceleration to retardation on various lengths of short floor runs. During the time A' to E' on the short floor run speed-time curve, the car is accelerated at the preselected number of feet per second per second to a speed E. At the point E', relay XSM operates. During the time E' to J' the operation is changed from a state of acceleration to a state of retardation, the speed increasing to a value V as a maximum. During the time J to K the car is retarded at the same rate as on a full speed run and during the time K to N the retardation is reduced to zero as the car is brought to levelling speed. At the time N the brake is applied and the car is brought to a stop at floor level.

The area under this curve is distance travelled. The point E' is the instant that the action is begun whereby the rate of acceleration is decreased and the system changed into a state of retardation and finally the car brought to a stop at the landing. The determination of this point is the function of the pre-retardation brushes IUPB, IDPB, 2UPB and 2DPB of the selector. The distance of this point from the floor at which the stop is to be made is represented by the area under the curve from E' to N'. This is equal to the sum of O (E, V, J) plus P (E', E, J, J') plus Q (J', J, K, K') plus R (K', K, N, N'). At the time V' at which the car reaches the maximum speed for that particular run, the distance advance crosshead is pawled to the stopping collar for the floor at which the stop is to be made. The distance of the car from this floor is always one-half of the total run. It differs from the above distance, namely $O+P+Q+R$, by approximately $$\frac{O+P}{2}$$

The pre-retardation brushes cooperate with their stationary contacts on the floor bars to control the point at which the relay XSM operates on various lengths of short floor runs so as to be approximately the distance $$\frac{O+P}{2}$$

ahead of the point V', at which the distance advance crosshead is pawled to the floor bar. Any error made will be only a small portion of the distance $$\frac{O+P}{2}$$

which in turn is small as compared to the total distance $O+P+Q+R$.

To insure the operation of second accelerating switch AB in starting, selector switch SS2 is by-passed by contacts TCX2 of the auxiliary reverse field timing relay. This also enables switch AB to operate on a short floor run, in which switch ST has dropped out before selector switch SS2 closes. Thus the operation of switch AB under these conditions is assured. Contacts TCX1 of relay TCX prevent the connecting in of the levelling field winding prematurely in slowing down on a short floor run in the event that switch ST is dropped out before switch AB operates. The delay afforded by contacts TCX1 and TCX2 is determined by the time interval of relay TC, contacts TC4 of which control the circuit for the coil of relay TCX. Contacts TC1 of relay TC act in a similar manner to prevent the operation of auxiliary speed measuring relay GA until the transition from the accelerating portion of the speed curve to the retardation portion of the curve has been effected on a short floor run. Thus the control of the system to provide increased damping, effected by relay G controlled by relay GA, is prevented until after the action of the reverse field windings to force down the current in the motor armature circuit has been completed. Contacts TC2 are arranged in a circuit by-passing contacts ST3 controlling the coils of series field switches YA and YB. If on a short floor run the current is above a certain positive value during the transition from acceleration to retardation, these series field switches are maintained operated but series field switch YC is deenergized by the separation of contacts POA1 so that a moderate series field action is obtained. Should the current in the motor armature circuit be negative during this period, however, contacts POA1 are engaged and contacts POA2 are separated, so that only the portions of the series field shunting resistances controlled by switches YA and YB are short-circuited, providing a stronger series field effect.

It is preferred to provide shunting resistance for the generator series field windings arranged to compensate for any loss in compounding which would be due not only to the heating of the series field windings themselves but also to the heating of other parts of the installation which would affect the compounding. Such shunting resistance is illustrated in Figure 26. It comprises a plurality of strips of resistance material woven between plates electrically insulated from the strips. Three strips 500, 501 and 502 are illustrated and are arranged in tiers.

Each strip is laced back and forth between pairs of plates 503. Intermediate ends of the strips are joined by straps 504 and 505 secured to the strips by bolts 506, thereby connecting the strips in series relation.

The material utilized for the shunting resistance has a positive temperature coefficient which may be the same as that of the series field windings. Thin steel straps have been found suitable for this purpose. The resistance is adjusted to give the desired compounding when the generators are cold. That is, this resistance is adjusted to give the same speed of the car under full load up and full load down conditions. However, even with the temperature coefficient of the resistance the same as that of the series field windings, this will not give the desired compounding under final operating temperature conditions owing to the fact that there is loss of compounding due to heating of other parts of the installation, for example the motor armature. Therefore sufficient covering is provided for the resistance to cause it to heat up to a point under final temperature conditions such that the same speed is obtained for full load up and full load down as when the installation was cold.

A suitable cover in the form of a casing 510 is illustrated. This casing covers the whole resistance and is provided with a vent 511 at the bottom on one side and another vent 512 at the top on the other side. The amount of opening of each of these vents is controlled by a vane 513 adjustably positioned by an adjusting knob 514. By properly setting the vanes 513 over the openings, the resistance can be caused to heat up sufficiently to give the same compounding under final temperature conditions as under cold operating conditions. A heater may be employed within the casing instead of utilizing vents, that is, where there is considerable heat radiation from the cover. This heater may be turned on and off with the elevator motor and adjusted to give the desired heating of the resistance.

The plates 503 provide thermal capacity. Steel plates coated with enamel so as to be electrically insulated from the resistance strips have been found suitable for this purpose. These plates are of a size and number such as to cause the resistance of the shunt to change at a rate to provide the desired compounding throughout the change in heating. These plates are clamped together by means of bolts 516.

Apertures 507 are provided in the ends of the strips 500 and 502 for connecting the resistance to one end of the series field winding of each generator. Additional apertures 508 are provided in the bends of the strips for connecting adjustable portions of the resistances across these windings. Apertures, such as aperture 515, are provided in casing 510 to admit the connecting wires. The shunt resistance unit has been described as applied to the series field windings of both generators but separate units may be provided for each winding if desired.

Assume that the start control switch is thrown to "on" position to start the car and that after a short movement of the car insufficient to cause the closing of the No. 3 motion device contacts to energize motion device relay MDX, the start control switch is returned to neutral position to stop the car. Under such conditions, the second accelerating switch AB is not operated to establish a by-pass for start control switch contacts SC2 or to establish the circuit for the coil of relay OS. Thus the return of the start control switch to neutral will permit the car to come to a stop. Contacts MDX2 of the motion device relay remain separated under such conditions and act to prevent the completion of the circuit for the reverse field windings of the generators during the return of the car to the floor by the levelling mechanism.

If when the car is under the control of the levelling mechanism it should be desired to return the car to the control of the start control switch, this may be done by operating the start control switch to "on" position to cause the closing of the doors and the car will start in the direction determined by switch R when the doors reach closed position. Incident to this operation, door close switch DC separates contacts DC1 to cause the immediate breaking of the holding circuit for the coil of the motion device clutch magnet. This centers the motion device, insuring the operation of the accelerating switches at the proper time in the starting operation.

It may happen that after the car has been standing a while at a floor a heavy load will be taken on, as for example when the car is at the lower terminal and several passengers enter the car. This load may be sufficient to cause enough cable stretch to lower the car into the micro zone. Under such conditions the up levelling switch contacts close to cause the operation of relay TA to start the motor generator sets and of up direction switch U, which completes a circuit for the levelling field winding 1GLV of the No. 1 generator. At the same time the levelling switch contacts complete a circuit for the brake release coil BR to effect the release of the brake, permitting the car to be returned to the floor level. To overcome any increased bearing friction due to the car standing at the floor, contacts M2, engaged as a result of the operation of up direction switch U, momentarily short-circuits resistance sections LR2, LR3 and LR4 to provide a strong levelling field, relay M being dropped out upon movement of the car by the separation of the No. 1 contacts of the motion device. During main operation when the car is being brought to the floor level in stopping, contacts M2 are without effect owing to the fact that contacts LB5 of the No. 2 generator driving motor running switch are separated, this being assured even on short floor runs by the separation of contacts AB2.

Should it become necessary, as for example during a fire, to operate the car with one or more door contacts open, this may be effected by pressing the emergency operation button EB, which by-passes the door and gate contacts in the circuits for the coils of door switches U and D.

Under emergency conditions, the coil of potential switch C is deenergized to cause the car to be brought to a stop. This may be effected by the separation of contacts OA1 or OB1 as a result of the overload current conditions in the circuit for the driving motor of the No. 1 generator. Similarly, overload current conditions in the circuit for the driving motor of the No. 2 generator cause the operation of contacts OC1 or OD1 to break the circuit for the coil of the potential switch. The occurrence of overload current in the motor armature circuit causes the operation of overload switch OE, which separates contacts OE1 to break the circuit for the coil of the potential switch. The circuit for the coil of switch C may also be broken by the opening of final limit switch FLU or FLD, either motor generator overspeed governor switch contacts 1MGG or 2MGG, contacts OSG operated by the safety governor, safety operated switch SOP, or manually operable safety switch SA in the car. Upon the dropping out of switch C, circuits below potential switch contacts C2 are all deenergized, causing the deenergization of the fields of the generators and the application of the brake to bring the car to a stop. Switch TA, being delayed in dropping out, maintains the circuit for switch HB for a short time interval, thereby maintaining a strong field on the motor and the self-excited field winding IGSL connected across the armature of the No. 1 generator to provide a damping action for the duration of the time interval.

When an emergency stop is made, the motor advance panel and distance advance panel may be left in various positions, depending upon the conditions under which the stop is made. However, the panels are caused to return to their proper relationship when the car is restarted. Assume that the car has been brought to an emergency stop during its travel in the up direction and that as a result of this stop the distance advance panel is left in an advance position with respect to the synchronous panel and the motor advance panel in an advance position with respect to the distance advance panel. Assume that when the potential switch coil circuit is reestablished the start control switch is thrown to "on" position to start the car. This completes a circuit for the armature and field winding of the advancer motor, which advances the motor advance panel as previously described, the point from which the advance begins being from the position in which it was left as a result of the emergency stop. Up direction switch U is operated as before to cause the operation of switch B, which in turn engages contacts B1 in the starting circuit for the separately excited field winding of the No. 1 generator. Switch N is operated along with switch U, the circuit being through up distance advance switch DAU, closed under the assumed conditions. Relay N engages contacts N1, completing a circuit for the coil of starting relay ST. The starting relay engages contacts ST2 to complete the starting circuit for the No. 1 generator field winding IGSP, causing the car to be started in the up direction. Switch N also separates contacts N3 in the circuit for pawl magnet SM. Relay NM is also operated when the start control switch is thrown to "on" position owing to the fact that up motor advance switch MAU is closed. This relay engages contacts NM5 in the circuit for the pawl magnet SM.

As selector switch SS13 is open under the assumed conditions, the operation of the accelerating switches is prevented for the time being. However, switch SS13 prevents energization of selector centering relay O so that contacts O1 are engaged to short-circuit resistance sections ISR3, ISR4 and ISR5 in the starting circuit for the separately excited field winding. Thus sufficient voltage is applied to this winding to cause the car to run at a relatively slow speed.

As the car moves, the distance advance panel advances but, as the pawl magnet is deenergized by contacts N3 being separated, the distance advance panel is brought to a stop by the engagement of the up pawl with the next stopping collar. From then on the synchronous panel catches up with the distance advance panel, causing the opening of the closed selector switches until selector switch SS13 closes. This completes a circuit for the coils of the first and second accelerating switches AA and AB, contacts MD2 and MDX4 being closed as a result of the operation of the motion device. The second accelerating switch engages contacts AB3, establishing a short-circuit for resistance section ISR2 as well as the other resistance sections in the starting circuit for the separately excited field winding, increasing the speed of the car. Switch AB also engages contacts AB9, completing the circuit for the pawl magnet, which operates to retract the stopping lugs. Contacts AB8 separate but the circuit for the coil of starting relay ST is maintained by contacts NM1 during the interval between the separation of contacts AB8 and the engagement of pawl magnet contacts SM1. With the stopping lugs retracted, the distance advance panel is now free to advance, causing the closing of the selector switches in sequence to increase the speed of the car.

Should a reversal button UB or DB be pressed to set the car for the opposite direction of car travel after an emergency stop has been made and the circuit restored for the potential switch, the car on operation of the start control switch to start position is started in the opposite direction. Under these conditions, the motor advance panel will be behind the distance advance panel and the distance advance panel in turn behind the synchronous panel. In order that it may be understood how the panels are caused to assume their proper relationship under such conditions, assume that the car has made an emergency stop during its upward travel and that after the circuit for the potential switch is reestablished the down reversal button DB is pressed to energize the unlatch coil of the direction determining switch R. This causes the direction circuits to be established for downward travel. Thus, when the start control switch is thrown to "on" position to start the car a circuit is completed through contacts WD11 and WD12 for the armature of the advancer motor to move the motor advance panel in the downward direction. The circuit for relay NM is not completed, however, owing to the fact that switch MAD is open under the conditions assumed. Therefore the motor advance panel catches up with and passes the distance advance panel. As this takes place, switch MAU is opened and switch MAD is closed. The closing of switch MAD completes the circuit for relay NM, which engages contacts NM5 to complete a circuit for pawl magnet SM. Contacts SM1 therefore close to complete a circuit for the coil of starting relay ST which, together with the operation of switches D and B, completes the starting circuit for the No. 1 generator separately excited field winding to start the car in the down direction. Relay O as before engages contacts O1 to cause the car to run at a relatively slow speed.

As the distance advance panel catches up with the synchronous panel, selector switch SS13 closes. This causes the operation of first and second accelerating switches AA and AB, switch AB short-circuiting further resistance in the starting circuit for the separately excited field winding, increasing the speed of the car. Switch AB also engages contacts AB9 to maintain the circuit for the pawl magnet. Also, switch DAU opens and switch DAD closes, completing a circuit for the coil of relay N. The distance advance panel is now free to advance with respect to the synchronous panel, causing the closing of the selector switches in sequence to increase the speed of the car.

It is to be noted that a call cannot be picked up during this operation for a floor behind the car owing to the fact that relay PMX cannot be operated before the motor advance panel catches up with the distance advance panel because relay NM is deenergized until this takes place and therefore contacts NM3 remain separated. Also, relay PMX cannot be operated until the distance advance panel assumes a normal relationship with respect to the synchronous panel owing to the fact that contacts O4 and AA6 remain separated until this takes place.

It may be desirable under certain conditions to operate the car at levelling speed independent of the start control switch. This may be done by closing the hand micro switch in the car for the desired direction of travel. As previously pointed out, this switch has four blades. Two of these blades, HMU1 and HMU2, are for up hand micro operation and are closed by movement of the switch in one direction, and the other two blades, HMD1 and HMD2, are for down micro operation and are closed by movement of the switch in the other direction. Blades HMU1 and HMD1 control the coil of hand micro relay HM while the other blades, HMU2 and HMD2, respectively control circuits for the coils of up direction switch U and down direction switch D. Assume for example, that it is desired to operate the car at levelling speed in the up direction. Closing the hand micro switch in the up direction completes a circuit through blade HMU1 for the coil of hand micro relay HM. Relay HM upon operation engages contacts HM3 to cause the closing of the doors, which completes a circuit through blade HMU2 for up direction switch U. Contacts HM1 establish a circuit for the brake release coil so that the car is started in the up direction. The voltage is applied to the elevator motor by the No. 1 generator, this generator being excited by the levelling field winding lGLV. Relay M is energized by the engagement of contacts U5, as previously explained, which engages contacts M2 to short-circuit resistance sections LR2, LR3 and LR4 to provide the desired excitation for starting the car. Relay M is deenergized as soon as the car starts by the separation of motion device contacts MD1U, thus effecting the separation of contacts M2. Owing to the fact that relay TC is not energized, relay GA is operated, engaging contacts GA3 which, as soon as the brake lifts, completes a circuit for the coil of switch S. Switch S engages contacts S1 to short-circuit resistance LR5 in the circuit for the levelling field winding, the car continuing during hand micro operation with this resistance short-circuited. Resistances LR4 and LR6 may also be short-circuited during this operation, depending on the condition of the current in the motor armature circuit. Also, the brake shoes are lightly applied to the drum by the operation of switch S for the remainder of the hand micro operation.

Relay HM also engages contacts HM2 to energize the pawl magnet, the circuit extending through contacts X2 of the main operating relay, these contacts being provided to prevent the energization of the pawl magnet by contacts HM2 if the car is operating on the main operation. As soon as the distance advance panel has moved a certain distance beyond the synchronous panel, switch DAU closes, completing a circuit for the coil of relay N, which separates contacts N3 to deenergize the pawl magnet. The up pawl thereupon catches on the next stopping lug, permitting the synchronous panel to catch up with the distance advance panel and thus open switch DAU. This deenergizes relay N to energize the pawl magnet. In this way the distance advance panel and the synchronous panel are maintained near proper relationship during hand micro operation regardless of the length of the run. When it is desired to stop the car the hand micro switch is opened, which deenergizes the up direction switch U and applies the brake to bring the car to a stop. Also, relay P is deenergized so that contacts P1 engage to cause the opening of the doors.

When it is desired to shut down the exciter set, key operated switch KS is turned clockwise to break the holding circuit of the coil of exciter switch EX. Contacts TA1 of the stop control time relay are provided to prevent the breaking of this circuit by switch KS until after the expiration of the time interval of relay TA after the car has been brought to a stop. Exciter switch EX upon dropping out separates contacts EX1, EX2 and EX3 to disconnect the stator windings EDMS of the exciter driving motor from the alternating current feed lines, bringing the exciter set to a stop. The shutting down of the exciter set deenergizes the tape motor and the tape motor brake coil TBR, permitting the tape motor brake to be applied. Should slack develop in the drive tape for the selector machine, slack tape switch STS opens to deenergize exciter switch EX, shutting down the exciter set and causing the car, if in operation, to be brought to an emergency stop.

It will be seen from previous description that in accordance with the invention the elevator motor is supplied with current from a variable voltage source. In the arrangement shown, this current is supplied from two generators whose armatures are connected in series relation to the armature of the elevator motor. The car is started in operation by exciting one of the generators, termed generator No. 1, from a separate source of excitation. The No. 1 generator takes the load during the initial starting but after a certain point in acceleration is reached the other generator, termed generator No. 2, is excited from a separate source of excitation to cause this generator to assume its share of the load. To equalize the load, the generators are caused to have the same excitation at full speed by connecting the separately excited field windings of the generators in parallel.

Retardation is effected by reducing the voltage applied to the elevator motor armature. The separately excited field windings are transferred from running circuits to slow down circuits as slow down is initiated. This facilitates effecting the desired control of retardation by the control switches. After a certain point in retardation is reached, the excitation of generator No. 2 is discontinued and the remainder of the slow down is accomplished by decreasing the voltage of the No. 1 generator.

Distance control of acceleration and retardation is provided. That is, during acceleration the voltage applied to the elevator motor armature is increased in steps as the car reaches points definite distances from the landing from which the car is started. Similarly, during retardation the voltage is decreased in steps as the car reaches points definite distances from the landing at which the stop is being made. The voltage steps are adjusted so as to give the desired speed-time curve under load conditions where the current in the motor armature circuit is a minimum. In certain installations, this condition, for acceleration, would exist under approximately full load down operation, that is, when the elevator car is loaded to its rated capacity and travelling downwardly, and for retardation it would exist under approximately full load up operation, that is, when the elevator car is loaded to its rated capacity and travelling upwardly.

Series field windings are provided on the generators to compensate for load. Negative current is caused to flow in the motor armature circuit during retardation. Armature reaction, however, does not change its polarity under negative current conditions. To compensate for this, the effectiveness of the series field windings is decreased for the retardation as compared with the strength of these windings for acceleration. The effect of the series field windings is momentarily further reduced in the event that the load on the elevator motor is above a certain positive value, to force the flow of negative current in the motor armature circuit.

Provision is made to smooth out the steps of acceleration and retardation and to damp out any oscillations that may tend to occur in the current in the motor armature circuit. This action is obtained by the use of a self-excited field winding for each generator which provides a portion of the excitation for any generator voltage but which has a resistance line the slope of which, plotted ampere turns against terminal voltage so as to have coordinates in common, is greater than that of the magnetization curve of the field. The action of this field winding is to delay any voltage changes sufficiently to damp out any oscillations in current in the armature circuit and to smooth out the steps of acceleration and retardation so that the number of steps is minimized. If one large generator were used and provided with such a self-excited field winding, the action of this field winding to delay any voltage changes would be too great and the desired rate of acceleration and retardation would not be obtained economically.

When the separately excited field winding is energized, the slope of the resistance line of that generator is not changed but in effect the position of this line is shifted to a point inside the magnetization curve. With each step of acceleration the position of the resistance line is shifted farther in the same direction so that the actual voltage to which the generator builds up for each of such steps is determined by the point at which this resistance line crosses the magnetization curve. Just before the car comes up to full speed the slope of this line is decreased, causing it to intercept the magnetization curve at a farther point on the curve, thereby increasing the generator voltage.

If, as the elevator car nears full speed, the load on the elevator motor should be above a certain amount, the slopes of the resistance lines of the self-excited field windings are further decreased to cause these lines to intersect their respective magnetization curves at still farther points on the curves, thereby further increasing the voltage of the generators. Also, the strength of the series field windings is maintained. If the load is below this amount the effect of the self-excited field windings is not increased and the effect of the series field windings is decreased. In this way the amount of speed variation at full speed due to varying load conditions is minimized.

When slow down of the elevator car is initiated, the slope of the resistance line is changed back to what it was during acceleration. This enables the desired retardation to be effected. After the discontinuance of the excitation of generator No. 2 the effect of the self-excited field winding of generator No. 1 to delay voltage changes is increased by connecting a discharge resistance across the winding. Also, resistance is connected across the separately excited field winding to cause this winding to assist the self-excited field winding in this function. These changes increase the damping action for the remainder of the slow down. With the connection of the discharge resistance in parallel with the self-excited field winding, a resistance is connected in series to this parallel circuit. The value of the latter resistance is such as to keep the slope of the resistance line of this self-excited winding substantially the same as before.

On short floor runs, where full speed is not attained, the car is caused to accelerate the same as if on a full speed run up to a certain point, whereupon the separate excitation of the fields of the generators is decreased and reverse excitation is applied to these fields, thereby forcing down the current in the motor armature circuit so that retardation may take place the same as if on a full speed run. This reverse excitation is provided by separately excited field windings connected for reverse excitation and is discontinued after the expiration of a fixed time interval. The point at which this forcing down begins is varied in accordance with the length of the run so as to enable this effect to be obtained within a fixed time regardless of the length of the run, thereby effecting the change from acceleration to retardation without causing objectionable oscillations in the current in the motor armature circuit during the remainder of the slow down. Should any oscillations tend to take place, they are quickly damped out by the effect of the self-excited field windings. The increase in damping is prevented until the reverse excitation is removed.

The car is caused to be brought to an exact level with the landing when stopping regardless of whether it tends to underrun or overrun the floor. Just before the car reaches the levelling zone, the separate excitation of the No. 1 generator is transferred from the separately excited field winding to a levelling field winding. The levelling field winding is utilized for the remainder of the operation to bring the car to the floor landing. If the current in the motor armature circuit is above a certain positive value during operation on the levelling field winding, this may cause sufficient voltage drop across the brushes to materially affect the levelling operation. Under such conditions the excitation of the levelling field winding is increased to compensate for this voltage drop. The strength of the series field winding of generator No. 1 is controlled so as to provide load compensation for the final slow down operation.

The operation of the elevator car during the final slow down is controlled in such way that, if the speed of the car is above a predetermined value as the car reaches a certain distance from the floor, the excitation of the levelling field winding is discontinued and the brake applied. If running at a slow speed, this operation is delayed until the car reaches a point still closer to the floor. In this way, the car is brought to a stop at the landing level, minimizing any tendency for the car to stop short of the floor or overrun the floor before coming to a stop.

Should the car, under conditions where excitation is discontinued and the brake applied at the greater distance from the floor, tend to stop short of the floor, the brake is released and the circuit for the levelling field winding is reestablished to cause the car to continue into the floor. Under such conditions resistance of high value is inserted in the levelling field winding circuit to prevent the armature current building up to a value while the brake is being released such as would cause the car to overrun the floor. The strength of the field winding is increased as soon as the brake lifts.

If the car overruns the floor, the brake cannot be released and power cannot be applied to return the car to the floor until the speed of the car in overrunning the floor has dropped to a low value. As soon as this condition is reached, sufficient excitation is applied to the levelling field winding to assure a quick starting of the car under all load conditions to return it to the floor. As soon as the car starts the amount of this excitation is reduced.

In starting the car the release coil of the electromechanical brake for the hoisting motor is partially energized before the car is actually started. The brake release coil is fully energized to release the brake when separate excitation is provided for generator No. 1 to start the car. With this arrangement the brake shoes are quickly lifted to enable the car to be immediately started away from the landing. Should the load on the elevator motor at the time that the brake release coil is partially energized be such as to pull through the brake before the car is started, the brake release coil is immediately deenergized and the brake shoes fully applied. In slowing down, as the car arrives at a certain distance from the landing at which the stop is being made, the current supplied to the brake release coil is decreased, permitting the brake shoes to rest lightly against the drum. As the car arrives at the landing, the brake release coil is deenergized to apply the brake shoes to bring the car to a stop. In this way, the quick application of the brake is obtained to assist in making an accurate stop at the landing.

Full field is maintained on the motor when the brake is applied. Also, no suicide connection is provided for the generator and the series field and self-excited field windings remain effective. Thus the change in the torque exerted by the motor during brake application is the same regardless of load. These factors enable the stopping to be effected from a higher speed with increased brake pressure. Thus the range of speeds from which the car may be stopped within the final stopping or dead zone is increased. Owing to the fact that current is supplied to the elevator motor from only one generator in the final slow down, thereby eliminating any variations due to the other generator, that compensation is made for the voltage drop across the brushes of the motor generators, that flat speed compounding is provided and that effective means are provided for damping out oscillations in the current in the motor armature circuit, variations in speed of the elevator car at the time the brake is applied are reduced to a minimum. This insures the car being brought within the speed range for the application of the brake. Thus the time consumed in effecting the final stop of the car is minimized.

In starting the elevator car, the field of generator No. 1 is forced, preferably utilizing the separately excited field winding, until movement of the car takes place. The motion device acts to discontinue the field forcing once the car moves. The motion device is a very accurate measurer of distances and is therefore utilized to control the initial acceleration of the car. Also, the motion device registers the instant that reverse movement takes place to return the car to a floor after an overrun. This action is utilized to effect the decrease in generator excitation as soon as the car starts its return to the floor.

The selector switches control the remainder of the acceleration and also control the steps of retardation. Inasmuch as each of the selector switches is operated by one cam which is moved in the same direction regardless of car movement, the cam when accurately set for one direction of travel will be properly set for the other direction of travel. If there should be a slight inaccuracy in the setting of any cam, this may be taken care of without resetting the cam by adjustment of the field winding resistance step controlled thereby. The preretardation brushes and the stationary contacts with which they cooperate also control the point at which the rate of acceleration is decreased so as to enable the system to be changed into a state of retardation and follow the dictated retardation curve without objectionable oscillations.

Full speed regulation according to the preferred arrangement is provided by a switch having two coils. One of these coils is a current coil and the other a voltage coil. The voltage coil is energized in the preparatory starting operation and causes the operation of the switch. The current coil acts to oppose the voltage coil when the current is positive in the motor armature circuit but, owing to the strength of the voltage coil, is ineffective to cause the switch to drop out during acceleration. When full speed running circuits are established, the voltage applied to the voltage coil is reduced and if the current in the motor armature circuit is at or above a predetermined value at this time the current coil counteracts the effect of the voltage coil sufficiently to cause this switch to drop out. With this arrangement the magnetic field of the switch is saturated by the voltage coil when it is operated so that the effects of the residual in this field are obviated, that is, the polarity of the field of this switch on its last previous operation is immaterial.

The measurement of the speed of the car during final slow down is preferably effected by relays the coils of which are connected so as to be excited in direct proportion to the counterelectromotive force of the tape motor. In the preferred arrangement, the coils are connected at one end to the midpoint of a potentiometer connected across the tape motor armature and a reactance in series therewith and at the other end between the armature and the resistance, thus forming a Wheatstone bridge. The tape motor armature and resistance are connected in parallel with the potentiometer across the armatures of the elevator motor and exciter in series relationship, this arrangement being to provide current in the tape motor armature to give proper torque for application to the tape wheel during operation of the car. Thus the voltage applied to the tape motor armature varies, depending upon the conditions of operation. However, the coils of the speed measuring relays are connected across a portion of the potentiometer and the tape motor armature in series relationship, with the amount of resistance drop across this portion of the potentiometer balanced with respect to the armature, that is, so that the voltage drop across the coils of the speed measuring relays is zero when the car is at rest. The speed measuring relays are thus directly responsive to the counter electromotive force of the tape motor and therefore are directly responsive to the speed of the car.

Upon the expiration of a predetermined time interval after the car is brought to a stop at a landing, both motor generator sets are shut down. These sets are started in operation again during the preliminary operations incident to restarting the car. As they are relatively small sets, they are started very quickly so that no time is lost in effecting their starting. These sets are preferably started in sequence and with polyphase alternating current induction motors provided for driving the generators it is preferable to start the No. 1 set first by connecting the stator windings of its driving motor in star relation to the supply source, then to change the connections of these windings from star to delta relation and to start the No. 2 set by connecting the stator windings of its driving motor in star relation to said source. This minimizes current surges. The stator windings of the driving motor for generator No. 2 are connected in delta relation prior to the No. 2 generator assuming its share of the load.

The selector machine is provided with three relatively movable panels termed the synchronous panel, the distance advance panel and the motor advance panel. The synchronous panel moves in synchronism with the car but at a reduced speed. The distance advance panel moves at twice the speed of the synchronous panel in its advance with respect thereto. The motor advance panel is moved immediately circuits are established preliminary to starting the car. The motor advance panel is brought to a stopping position with respect to the floor as soon as a call is picked up. The distance advance panel remains in motion until the car arrives at slow down distance from the floor, whereupon it is brought to a stop. The synchronous panel continues its motion until the car comes to a floor, whereupon it is brought to a stop. Should the car be brought to a stop, as under emergency operating conditions, with the panels out of proper relationship, the panels are caused to reassume their proper relationship in making the next start. In the arrangement shown the motor advance panel may be permitted to advance from the position in which it is stopped but normal operation of the car is prevented until the distance advance panel is brought into its proper relationship with respect to the car.

Power operation is provided for the car gate and hatchway doors. The door and gate operating mechanism is controlled to automatically open the gate and the door for the floor at which the stop is being made as the car arrives at a point a certain distance from the floor, provided the car is not operating above a predetermined speed, or as soon as the speed of the car falls to such value after the car reaches said point. This mechanism is operated to reclose the gate and door preliminary to starting the car away from the floor. During the closing of the gate and door various other preliminary operations are performed. These include the advance of the motor advance panel, partial energization of the brake, increase in the motor field strength to full value, the connection of the self-excited field winding of the No. 1 generator to the generator armature and the starting of the motor generator sets. This saves considerable time in getting the car away from the floor.

The terminal stopping switch comprises a plurality of switches, two of which are effective for the final stopping operation and the remainder for the retardation steps. Each switch for a retardation step is effective for both directions of car travel, being provided with two cams, one for operating the switch as the car arrives at the lower terminal floor and the other for operating the switch as the car arrives at the upper terminal floor.

Although the invention has been described as applied to a specific control system applicable to certain installations and duties, it is to be understood that it is also applicable to other installations and duties and that in making such applications various alterations may be made within the purview of the invention. For example, in an installation having a duty of 2000 lb. load in the car with a full speed rating of 800 feet per minute to which the invention has been applied, the current supplied to the hoisting motor was provided by two 15 kilowatt (continuous duty rating) motor generator sets with the armatures of the generators connected in series relation. In such arrangement the self-excited field winding and the separately excited field winding of each generator were made the same size, that is of the same size wire and equal number of turns. This relationship may vary, especially in installations of other characteristics. Also in installations of smaller duties, only one motor generator set may be employed, as for example in an installation of half the duty above mentioned, one 15 kilowatt set could be used instead of two. Also, in some installations more than two generators may be utilized. In other words, the dynamo electric generating means employed to supply current to the elevator hoisting motor would be determined by the characteristics of the particular installation.

Various changes may be made in the manner of effecting the control of the supply of power to the hoisting motor. For example, the strength of the generator series field may be varied in one or more steps during acceleration to facilitate obtaining flat speed compounding. This is especially the case where one generator is employed. Also, load regulation may be provided by controlling the effectiveness of the generator separately excited field winding or self-excited field winding or both these windings. The slope of the resistance line of the self-excited field winding may be different for retardation than for acceleration. In this connection, the slope of the self-excited field winding may be controlled at other points during acceleration or retardation or both to effect speed changes as well as to assist in obtaining the desired compounding. Also, the motor may be brought up to full speed by control of the separate excitation without changing the effectiveness of self-excitation. Again, the final operation prior to stopping may be effected with the generator excitation provided by the separately excited field winding instead of a levelling field winding although the latter arrangement is to be preferred, particularly from the standpoint of safety. The reverse excitation could be provided by a reverse field winding on one generator alone and made strong enough to produce the desired effect. Also, the reverse excitation might be utilized on full speed runs to bring the car from a state of acceleration to full speed operation and from full speed to a state of retardation. Furthermore, the forcing down of the current in the motor armature circuit to stop acceleration and to start retardation may be effected by weakening the generator separately excited field winding or self-excited field winding or both instead of employing reverse field excitation.

Changes may also be made in the control apparatus. Different forms of mechanism actuated in accordance with car movement and other control mechanisms may be utilized. Variations may be made in the form of selector machine described. For example, the distance advance crosshead of the selector machine may be operated at some other multiple of the speed of the synchronous panel, in other words, at some other proportion to car speed. Also, the synchronous crosshead may be omitted and the brushes carried by the synchronous panel arranged on the distance advance panel, subject to contacts of control switches operable to give the same operation. Also, contacts may be carried by the various panels for cooperation with contacts on the floor bars for purposes other than those specifically described.

It is not intended to enumerate all of the variations which may be made in the manner of effecting the control of the supply of power to the elevator hoisting motor, in the control system for effecting such control and in the control apparatus. Many variations other than those mentioned may be made which do not depart from the spirit and scope of the invention. Furthermore, it is contemplated that many of the features of the invention disclosed may be used in connection with apparatus and circuits different from those specifically described. Also, certain of the features are applicable to other forms of elevator control, as for example systems in which the starting as well as the stopping of the car is controlled by push buttons in the car and at the landings, or other systems in which slow-down and stopping of the car at the landings is automatic. Some of the features are applicable to arrangements in which the stopping of the car is controlled by the attendant's start control switch. Many elevator control systems are very complex and admit of many variations. In applying the invention to such control systems, variations in the manner of controlling voltage applied to the elevator hoisting motor may be made with the view of adapting the invention more readily to such systems. Therefore it is intended that all matter contained in the above description or shown in the accompanying drawings shall be interpreted as illustrative and not in a limiting sense.

What is claimed is:

1. In an elevator control system in which a direct current motor is employed for raising and lowering the car and in which current is supplied to said motor by a direct current generator, a separately excited field winding on said generator for providing a portion of the generator excitation, and a self-excited field winding on said generator of a number of turns and having the resistance of its circuit such that the slope of the resistance line of the self-excited field winding circuit is greater than the slope of the magnetization curve of the generator field for amplifying the excitation provided by said separately excited field winding.

2. An elevator control system in which a direct current motor is employed for raising and lowering the car and in which current is supplied to said motor by a direct current generator having a separately excited field winding and a self-excited field winding, characterized in that the number of turns of the self-excited field winding and the resistance of the circuit of the self-excited field winding are such that the slope of the resistance line of the circuit of that winding is greater than the slope of the magnetization curve of the generator field.

3. In an elevator control system in which a direct current motor is employed for raising and lowering the car and in which current is supplied to said motor by a direct current generator, a separately excited field winding on the generator, means for changing the generator excitation provided by said separately excited field winding in steps, and a self-excited field winding on said generator, the slope of the resistance line of the circuit of which is greater than the slope of the magnetization curve of the generator field and such as to delay the change in flux in the generator field upon each of said steps of change in excitation.

4. An elevator control system in which a direct current motor is employed for raising and lowering the car and in which current is supplied to said motor by a direct current generator, characterized in that the field of the generator is too fast to give an approximately smooth acceleration curve were its excitation increased in a given number of predetermined steps by separate excitation, that the generator also has a self-excited field winding for providing a portion of the excitation, that the excitation provided by the separately excited field winding is increased in said given number of steps in such amounts as to cause said predetermined steps of increase of excitation by the combined action of said field windings, and that the slope of the resistance line of the self-excited field winding circuit is greater than the slope of the magnetization curve of the generator field and such as to delay the increase of generator excitation for each of said steps to such extent as to give said approximately smooth acceleration curve.

5. An elevator control system in which a direct current motor is employed for raising and lowering the car and in which current is supplied to said motor by a direct current generator, characterized in that the field of the generator has a time constant such as would give a predetermined acceleration curve were its excitation increased in a given number of predetermined steps by separate excitation, that the generator also has a self-excited field winding for providing a portion of the generator excitation, the slope of the resistance line of the self-excited field winding circuit being greater than the slope of the magnetization curve of the generator field and such as to delay the increase of generator excitation so as to give said predetermined acceleration curve with a smaller number of steps.

6. In an elevator control system in which a direct current motor is employed for raising and lowering the car and in which current is supplied to said motor by a direct current generator, a separately excited field winding on said generator, means for increasing the generator excitation provided by said separately excited field winding in steps to accelerate the car, a self-excited field winding on said generator, the number of turns of which and the resistance of the circuit of which are such as to delay the building up of the generator excitation for each of such steps of increase of separate excitation and to increase the generator excitation for each of such steps by self-excitation.

7. In an elevator control system in which a direct current motor is employed for raising and lowering the car and in which current is supplied to said motor by a direct current generator, a separately excited field winding on said generator, means for increasing the generator excitation provided by said separately excited field winding in steps to accelerate the car, and a self-excited field winding on said generator, the number of turns of which and the resistance of the circuit of which are such as to delay the building up of the generator excitation for each of such steps of increase of separate excitation and to increase the amount of generator excitation for each of such steps by self-excitation and such that the slope of the resistance line of the self-excited field winding circuit is greater than the slope of the magnetization curve of the generator field so as to prevent the building up of the generator voltage to a high value by self-excitation upon the initial excitation of said generator by its separately excited field winding.

8. In an elevator control system in which a direct current motor is employed for raising and lowering the car and in which current is supplied to said motor by a direct current generator, a separately excited field winding on said generator, resistance, a source of direct current, means for connecting said winding to said source in circuit with said resistance to start the car and for decreasing said resistance to increase the speed of the car, additional resistance, a self-excited field winding on said generator connected in series with said last named resistance across the armature of said generator, the circuit of said self-excited field winding having a resistance line of a slope which is greater than that of the magnetization curve of the generator field, and means for decreasing said last named resistance to increase the speed of the car.

9. An elevator control system in which a direct current motor is employed for raising and lowering the car and in which current is supplied to said motor by a direct current generator having a separately excited field winding the strength of which is increased in steps to accelerate the car, characterized in that the generator is also provided with a self-excited field winding and that the number of turns of the self-excited field winding and the resistance of its circuit are such that the slope of the resistance line of the self-excited field winding circuit is greater than the slope of the magnetization curve of the generator field so that the voltage to which the generator builds up for each step of increase of separate excitation is dependent upon the amount of said separate excitation and the slope of said resistance line.

10. An elevator control system in which a direct current motor is employed for raising and lowering the car and in which current is supplied to said motor by a direct current generator having a separately excited field winding the strength of which is increased in steps to accelerate the car, characterized in that the generator also has a self-excited field winding, that the number of turns of the self-excited field winding and the resistance of its circuit are such that the slope of the resistance line of the self-excited field winding circuit is greater than the slope of the magnetization curve of the generator field so that the voltage to which the generator builds up for each step of increase of separate excitation is dependent upon the amount of said separate excitation and the slope of said resistance line, and that means are provided for decreasing the resistance of the circuit of said self-excited field winding to further increase the speed of the car.

11. In an elevator control system in which a direct current motor is employed for raising and lowering the car and in which current is supplied to said motor by a direct current generator, a separately excited field winding on said generator, a source of direct current, resistance, means for connecting said separately excited field winding to said source in series with said resistance to start the car and for decreasing said resistance in steps to increase the speed of the car, additional resistance, a self-excited field winding on said generator connected in series with said additional resistance across the generator armature, the number of turns of the self-excited field winding and the resistance of the circuit of that winding being such as to delay the building up of the generator excitation for each of such steps and to increase the generator excitation for each of such steps by self-excitation and such that the slope of the resistance line of the self-excited field winding circuit is greater than the slope of the magnetization curve of the generator field, and means operable after the decrease of the first named resistance to decrease the second named resistance to decrease the slope of said resistance line and thus increase the effect of the self-excited field winding to further increase the speed of the car.

12. An elevator control system in which a direct current motor is employed for raising and lowering the car and in which current is supplied to said motor by a direct current generator having a separately excited field winding the strength of which is increased in steps to accelerate the car, characterized in that the generator also has a self-excited field winding, that the number of turns of the self-excited field winding and the resistance of its circuit are such that the slope of the resistance line of the self-excited field winding circuit is greater than the slope of the magnetization curve of the generator field so that the voltage to which the generator builds up for each step of increase of separate excitation is dependent upon the amount of said separate excitation and the slope of said resistance line, that the resistance of the circuit of said self-excited field winding is decreased to further increase the speed of the car, and that the resistance of the self-excited field winding circuit is increased again to slow down the car.

13. In an elevator control system in which a direct current motor is employed for raising and lowering the car and in which current is supplied to said motor by a direct current generator, a separately excited field winding on said generator, means for increasing the strength of the separately excited field winding in steps to increase the speed of the car, a self-excited field winding on said generator, the number of turns of which and the resistance of the circuit of which are such that the slope of the resistance line of the self-excited field winding circuit is greater than the slope of the magnetization curve of the generator field, means for decreasing the resistance of the self-excited field winding circuit, thus decreasing the slope of said resistance line to increase the effect of the self-excited field winding and thus further increase the speed of the car, and means for increasing the resistance of the self-excited field winding circuit again for slowing down the car.

14. In an elevator control system in which a direct current motor is employed for raising and lowering the car and in which current is supplied to said motor by a direct current generator, a separately excited field winding on said generator, a source of direct current, resistance, means for connecting said separately excited field winding with said resistance in series therewith to said source to start the car and for decreasing said resistance in steps to increase the speed of the car, a second resistance, a self-excited field winding on said generator connected with said second resistance in series therewith across the generator armature, the number of turns of the self-excited field winding and the resistance of its circuit being such as to delay the building up of the generator excitation for each of such steps and to increase the generator excitation for each of such steps by self-excitation and such that the slope of the resistance line of the self-excited field winding circuit is greater than the slope of the magnetization curve of the generator field, means operable after the decrease of the first named resistance to decrease said second resistance, thereby decreasing the slope of said resistance line to increase the effect of the self-excited field winding to further increase the speed of the car, and means for re-inserting said second resistance in circuit with said self-excited field winding for slowing down the car.

15. In an elevator control system in which a direct current motor is employed for raising and lowering the car and in which current is supplied to said motor by a direct current generator, a separately excited field winding on said generator, a source of direct current, resistance, means for connecting said separately excited field winding with said resistance in series therewith to said source to start the car and for decreasing said resistance in steps to increase the speed of the car, a second resistance, a self-excited field winding on said generator connected with said second resistance in series therewith across the generator armature, the number of turns of the self-excited field winding and the resistance of its circuit being such as to delay the building up of the generator excitation for each of such steps and to increase the generator excitation for each of such steps by self-excitation and such that the slope of the resistance line of the self-excited field winding circuit is greater than the slope of the magnetization curve of the generator field, means operable after the decrease of the first named resistance to decrease said second resistance, thereby decreasing the slope of said resistance line to increase the effect of the self-excited field winding to further increase the speed of the car, a third resistance, and means for re-inserting said second resistance in circuit with said self-excited field winding and for inserting said third resistance in circuit with said separately excited field winding for slowing down the car.

16. An elevator control system in which a direct current motor is employed for raising and lowering the car and in which current is supplied to said motor by a direct current generator having a separately excited field winding the strength of which is increased in steps to accelerate the car, characterized in that the generator also has a self-excited field winding for providing a portion of its excitation, the voltage of the generator for each of said steps being dependent upon the strength of the separately excited field winding and the slope of the resistance line of the self-excited field winding, and that the number of turns of the self-excited field winding and the resistance of its circuit are such that the slope of the resistance line of that winding is greater than the slope of the magnetization curve of the generator field and enough so as to render the generator voltage for each step controllable.

17. In an elevator control system in which a direct current motor is employed for raising and lowering the car and in which current is supplied to said motor by a direct current generator, a separately excited field winding on said generator for providing a portion of the generator excitation, a series field winding on said generator, and a self-excited field winding on said generator of a number of turns and having the resistance of its circuit such that the slope of the resistance line of its circuit is greater than the slope of the magnetization curve of the generator field for amplifying the excitation provided by said separately excited field winding and for amplifying the series excitation provided by the series field winding to compensate for the load on the motor.

18. An elevator control system in which a direct current motor is employed for raising and lowering the car and in which current is supplied to said motor by a direct current generator having a separately excited field winding, the strength of which is increased in steps to accelerate the car, and a series field winding, characterized in that the generator excitation is provided by the combined action of said separately excited field winding, said series field winding and a self-excited field winding, the voltage of the generator for each of said steps being determined by the strength of the separately excited field winding, the load on the motor, and the slope of the resistance line of the self-excited field winding, and that the number of turns of the self-excited field winding and the resistance of its circuit are such that the slope of the resistance line of the self-excited field winding circuit is greater than the slope of the magnetization curve of the generator field and such as to delay voltage changes sufficiently to damp out any oscillations in the current supplied to the motor armature and to smooth out the steps of increase of separate excitation of the generator.

19. In an elevator control system in which a direct current motor is employed for raising and lowering the car and in which current is supplied to said motor by a direct current generator, a separately excited field winding on said generator, means for decreasing the excitation provided by the separately excited field winding in steps to slow down the car, a self-excited field winding on said generator, the number of turns of which and the resistance of the circuit of which are such that the slope of the resistance line of the self-excited field winding circuit is greater than the slope of the magnetization curve of the generator field and such that the self-excited field winding delays the decrease of generator excitation for each of such steps.

20. In an elevator control system in which a direct current motor is employed for raising and lowering the car and in which current is supplied to said motor by a direct current generator, a series field winding on said generator, a separately excited field winding on said generator, means for decreasing the excitation provided by the separately excited field winding in steps to slow down the car, a self-excited field winding on said generator, the number of turns of which and the resistance of the circuit of which are such that the slope of the resistance line of the self-excited field winding circuit is greater than the slope of the magnetization curve of the generator field and such that the self-excited field winding delays the decrease of generator excitation for each of such steps and damps out any oscillations in the current supplied to said motor.

21. In an elevator control system in which a direct current motor is employed for raising and lowering the car and in which current is supplied to said motor by a direct current generator, a separately excited field winding on said generator, means for decreasing the excitation provided by the separately excited field winding in steps to slow down the car, a self-excited field winding on said generator, the number of turns of which and the resistance of the circuit of which are such as to increase the amount of generator excitation for any given excitation provided by the separately excited field winding and to delay the decrease of generator excitation for each of such steps, and such that the slope of the resistance line of the self-excited field winding circuit is greater than the slope of the magnetization curve of the generator field.

22. In an elevator control system in which a direct current motor is employed for raising and lowering the car and in which current is supplied to said motor by a direct current generator, a separately excited field winding and a self-excited field winding on said generator, the number of turns of the self-excited field winding and the resistance of the circuit of that winding being such as to increase the amount of generator excitation for any given excitation provided by the separately excited field winding and such that the slope of the resistance line of the self-excited field winding circuit is greater than the slope of the magnetization curve of the generator field, resistance, means for inserting said resistance in circuit with the self-excited field winding to initiate slowing down of the car, additional resistance, and means for inserting said additional resistance in steps in circuit with the separately excited field winding to further slow down the car, the self-excited field winding acting to delay the decrease of generator excitation for each step of resistance inserted in circuit with the separately excited field winding.

23. An elevator control system in which a direct current motor is employed for raising and lowering the car and in which current is supplied to said motor by a direct current generator, characterized in that the field of the generator is too fast to give an approximately smooth acceleration-retardation curve were the generator excited by a separately excited field winding alone with the excitation provided thereby increased in a given number of predetermined steps for acceleration and decreased in a given number of predetermined steps for retardation, that the generator also has a self-excited field winding for providing a portion of the excitation, that means are provided for increasing the excitation provided by such separately excited field winding in said given number of steps specified for acceleration and in such amounts as to cause said predetermined steps of increase of excitation by the combined action of such field windings, and for decreasing the excitation provided by said separately excited field winding in said given number of steps specified for retardation and in such amounts as to cause said predetermined steps of decrease of excitation by the combined action of said field windings, and that the slope of the resistance line of the self-excited field winding circuit is greater than the slope of the magnetization curve of the generator field and such as to delay any change in generator excitation to such extent as to give said approximately smooth acceleration-retardation curve.

24. In an elevator control system in which a direct current motor is employed for raising and lowering the car and in which current is supplied to said motor by a direct current generator, a separately excited field winding on said generator, means for increasing the generator excitation provided by said separately excited field winding in steps to accelerate the car and for decreasing the generator excitation provided by said separately excited field winding in steps to retard the car, and a self-excited field winding on said generator, the number of turns of which and the resistance of the circuit of which are such as to increase the amount of generator excitation for any given excitation provided by the separately excited field winding and to delay the building up of the generator excitation for each of such steps of increase of separate excitation and to delay the decrease of the generator excitation for each of such steps of decrease of separate excitation and such that the slope of the resistance line of the self-excited field winding circuit is greater than the slope of the magnetization curve of the generator field.

25. In an elevator control system in which a direct current motor is employed for raising and lowering the car and in which current is supplied to said motor by a direct current generator, a separately excited field winding on said generator, a source of direct current, resistance, means for connecting said separately excited field winding with said resistance in circuit therewith to said source to start the car and for short-circuiting said resistance in steps to accelerate the car, additional resistance, means for inserting said additional resistance in circuit with the separately excited field winding in steps to retard the car, and a self-excited field winding on said generator, the number of turns of which and the resistance of the circuit of which are such as to increase the amount of generator excitation for any given excitation provided by the separately excited field winding and to delay the building up of the generator excitation for each of such steps of acceleration and to delay the decrease of the generator excitation for each of such steps of retardation and such that the slope of the resistance line of the self-excited field winding circuit is greater than the slope of the magnetization curve of the generator field.

26. In an elevator control system in which a direct current motor is employed for raising and lowering the car and in which current is supplied to said motor by a direct current generator, a separately excited field winding on said generator, a source of direct current, resistance, means for connecting said separately excited field winding with said resistance in series therewith to said source to start the car, means for short-circuiting said resistance in steps to accelerate the car, a second resistance, means for inserting said second resistance in circuit with the separately excited field winding in steps to retard the car, a self-excited field winding on said generator, the number of turns of which and the resistance of the circuit of which are such as to increase the amount of generator excitation for any given excitation provided by the separately excited field winding and to delay the building up of the generator excitation for each of such steps of acceleration and to delay the decrease of the generator excitation for each of such steps of retardation and such that the slope of the resistance line of the self-excited field winding circuit is greater than the slope of the magnetization curve of the generator field, a third resistance in the circuit for the self-excited field winding, and means for short-circuiting said third resistance to further increase the speed of the car after the short circuit of the first named resistance and for reinserting said third resistance in circuit with the self-excited field winding to initiate retardation of the car.

27. In an elevator control system in which a direct current motor is employed for raising and lowering the car and in which current is supplied to said motor by a plurality of direct current generators having their armatures connected in series relation, a separately excited field winding on each generator for providing a portion of the generator excitation, and a self-excited field winding on each generator of a number of turns and having the resistance of its circuit such that the slope of the resistance line of its circuit is greater than the slope of the magnetization curve of the generator field for amplifying the excitation provided by the generator separately excited field winding.

28. In an elevator control system in which a direct current motor is employed for raising and lowering the car, in which current is supplied to said motor by a plurality of direct current generators having their armatures connected in series relation, a separately excited field winding on each generator, means for changing the excitation of said separately excited field windings in steps, and a self-excited field winding on each generator, the resistance line of the circuit of which is of a slope greater than the slope of the magnetization curve of the generator field, for providing a portion of the excitation and for delaying the change in voltage applied to the motor upon each of said steps.

29. In an elevator control system in which a direct current motor is employed for raising and lowering the car, in which current is supplied to said motor by a plurality of direct current generators having their armatures connected in series relation, a separately excited field winding on each generator, means for changing the excitation of said separately excited field windings in steps, and a self-excited field winding on each generator, the resistance line of the circuit of which is of a slope greater than the slope of the magnetization curve of the generator field, for amplifying the excitation provided by the generator separately excited field winding for each change of excitation thereof.

30. In an elevator control system in which a direct current motor is employed for raising and lowering the car, in which current is supplied to said motor by two direct current generators having their armatures connected in series relation, a separately excited field winding on each generator, means for increasing the excitation of said separately excited field winding in steps to accelerate the car, and a self-excited field winding on each generator, the number of turns of which and the resistance of the circuit of which are such as to delay the building up of the generator excitation and to amplify the excitation provided by the generator separately excited field winding.

31. In an elevator control system in which a direct current motor is employed for raising and lowering the car, in which current is supplied to said motor by two direct current generators having their armatures connected in series relation, a separately excited field winding on each generator, a source of direct current, resistance for each winding, means for each winding for connecting it to said source of current with its said resistance in circuit therewith and for short-circuiting such resistance in steps, and a self-excited field winding on each generator, the number of turns of which and the resistance of the circuit of which are such that the slope of the resistance line of said circuit is greater than the slope of the magnetization curve of the generator field and such as to delay the building up of the generator excitation and to amplify the excitation of the generator upon each step of increase in separate excitation of the generator.

32. An elevator control system in which a direct current motor is employed for raising and lowering the car, in which current is supplied to said motor by two direct current generators having their armatures connected in series relation and each generator having a separately excited field winding, the strength of which is increased in steps to accelerate the car, characterized in that each generator also has a self-excited field winding for providing a portion of its excitation and that the number of turns of its self-excited field winding and the resistance in the circuit of that winding are such that the slope of the resistance line of the circuit of that winding is greater than the slope of the magnetization curve of the generator field so that the voltage to which the generator builds up on each step of increase of its separate excitation is dependent upon the amount of said separate excitation and the slope of the resistance line of its self-excited field winding.

33. In an elevator control system in which a direct current motor is employed for raising and lowering the car and in which current is supplied to said motor by a plurality of direct current generators having their armatures connected in series relation, a separately excited field winding on each generator, means for controlling the amount of excitation of the field of each generator provided by its separately excited field winding to control the operation of the car, and a series field winding on each generator to compensate for load.

34. In an elevator control system in which a direct current motor is employed for raising and lowering the car and in which current is supplied to said motor by a plurality of direct current generators having their armatures connected in series relation, a separately excited field winding on each generator, means for controlling the amount of excitation of the field of each generator provided by its separately excited field winding to control the operation of the car, a series field winding on each generator, and a self-excited field winding on each generator, the amount of excitation of each generator provided by the self-excited field winding being determined by the amount of excitation of that generator provided by its separately excited field winding and series field winding and the slope of the resistance line of the circuit of its self-excited field winding, said resistance line being of a slope which is greater than that of the magnetization curve of the generator field.

35. In an elevator control system in which a direct current motor is employed for raising and lowering the car, in which current is supplied to said motor by two direct current generators having their armatures connected in series relation, a separately excited field winding on each generator, means for controlling the strength of said windings to control the operation of the car, with a series field winding on each generator, and a self-excited field winding on each generator, the self-excited field windings acting to delay changes in the strength of the fields of the respective generators for which they are provided upon changes in separate excitation thereof and to delay any changes in current in the circuit to the motor armature to damp out any oscillations thereof which may tend to occur.

36. In an elevator control system in which a direct current motor is employed for raising and lowering the car, in which current is supplied to said motor by two direct current generators having their armatures connected in series relation, a separately excited field winding on each generator, means for changing the strength of said windings to control the operation of the car, a series field winding on each generator and a self-excited field winding on each generator for amplifying the excitation provided by the separately excited and series field windings of that generator, for smoothing out changes in the strength of the field upon changes in separate excitation, and for delaying any changes in current in the circuit to the motor armature to damp out any oscillations thereof which may tend to occur, the amount of amplification of excitation of each generator provided by its self-excited field winding being determined by the slope of the resistance line of the circuit of that winding, such slope being greater than the slope of the magnetization curve of the field so as to render the excitation of the generator controllable.

37. An elevator control system in which a direct current motor is employed for raising and lowering the car, in which current is supplied to said motor by a plurality of direct current generators having their armatures connected in series relation and each generator having a separately excited field winding, in which resistance is provided for each of said field windings which is short-circuited in steps to accelerate the car and in which resistance is inserted in circuit with said windings in steps to slow down the car, characterized in that the amount of resistance of said slow down steps is different from that of said accelerating steps.

38. In an elevator control sytem in which a direct current motor is employed for raising and lowering the car, in which current is supplied to said motor by two direct current generators having their armatures connected in series relation and each generator having a separately excited field winding, in which resistance is provided for each of said field windings and in which said field winding of one of said generators is connected to a source in series with its resistance to start the car and the resistance is short-circuited in steps to increase the speed of the car and said field winding of the other generator is thereupon connected to said source in series with its resistance and the resistance is short-circuited in steps to further increase the speed of the car, an additional resistance for each of said field windings, means for transferring said field windings to circuits including their respective additional resistances to slow down the car, means for increasing the amount of said additional resistances for one of said generators and then discontinuing the excitation of such one generator to further slow down the car, and means for thereafter increasing the amount of said additional resistance in circuit with the field winding of the other generator to further slow down the car and finally discontinuing the excitation of such other generator.

39. In an elevator control system in which a direct current motor is employed for raising and lowering the car, in which current is supplied to said motor by two direct current generators having their armatures connected in series relation and each generator having a separately excited field winding, in which resistance is provided for each of said field windings and in which said field winding of one of said generators is connected to a source in series with its resistance to start the car and a portion of the resistance is short-circuited to increase the speed of the car and said field winding of the other generator is thereupon connected to said source in series with its resistance and a portion of the resistance is short-circuited to further increase the speed of the car, means for short-circuiting the remaining portions of said resistances to connect said field windings in parallel to the source to further increase the speed of the car, additional resistance for each of said field windings, means for transferring said field windings to circuits including their respective additional resistances to slow down the car, means for increasing the amount of said additional resistances for one of said generators to further slow down the car and for discontinuing excitation of such one generator to still further slow down the car, and means for thereafter increasing the amount of said additional resistance in circuit with the field winding of the other generator to further slow down the car.

40. An elevator control system in which a direct current motor is employed for raising and lowering the car and in which current is supplied to said motor by two direct current generators having their armatures connected in series relation and each generator having a separately excited field winding and in which the separately excited field winding of one of the generators is connected to a source of direct current to start the car and the voltage applied thereto is increased to increase the speed of the car and thereupon the separately excited field winding of the other generator is connected to said source and the voltage applied thereto is increased to further increase the speed of the car, characterized in that each generator also has a self-excited field winding, the slope of the resistance line of which is greater than that of the magnetization curve of the generator.

41. In an elevator control system in which a direct current motor is employed for raising and lowering the car and in which current is supplied to said motor by two direct current generators having their armatures connected in series relation, a separately excited field winding for each generator, a source of direct current, means for connecting the separately excited field winding of one of the generators to said source to start the car and for increasing the voltage applied thereto to increase the speed of the car, means for thereupon connecting the separately excited field winding of the other generator to said source and for increasing the voltage applied thereto to further increase the speed of the car, a self-excited field winding for each generator, the slope of the resistance line of which is greater than that of the magnetization curve of the generator, for providing a portion of the generator excitation and for delaying the building up of the generator excitation, and means for decreasing the slope of the resistance line of the self-excited field winding of each generator to bring the car up to full speed.

42. In an elevator control system in which a direct current motor is employed for raising and lowering the car and in which current is supplied to said motor by two direct current generators having their armatures connected in series relation, a separately excited field winding on each generator, a source of direct current, resistance for each field winding, means for connecting said field winding of one of the generators in circuit with its resistance to said source to start the car and for short-circuiting the resistance to increase the speed of the car, means for thereupon connecting said field winding of the other generator in circuit with its resistance to said source and for short-circuiting said resistance to further increase the speed of the car, a self-excited field winding on each generator, the number of turns of which and the resistance of the circuit of which are such that the slope of its resistance line is greater than the slope of the magnetization curve of the generator, for delaying the building up of the generator excitation and for providing a portion of the generator excitation, the voltage to which the generator builds up being dependent upon the amount of its separate excitation and the slope of the resistance line of its self-excited field winding, and means for decreasing the resistance of the circuit of the self-excited field winding of each generator to decrease the slope of the resistance line of that winding to bring the car up to full speed.

43. In an elevator control system in which a direct current motor is employed for raising and lowering the car and in which current is supplied to said motor by two direct current generators having their armatures connected in series relation, a separately excited field winding on each generator, a source of direct current, resistance for each field winding, means for connecting said field winding of one of the generators in circuit with its resistance to said source of direct current to start the car and for short-circuiting a portion of the resistance to increase the speed of the car, means for thereupon connecting said field winding of the other generator in circuit with its resistance to said source and for short-circuiting a portion of the resistance to further increase the speed of the car, means for finally short-circuiting the remainder of said resistances to further increase the speed of the car, a self-excited field winding on each generator, resistance in circuit with each self-excited field winding, the number of turns of the self-excited field winding of each generator and the resistance of the circuit of that winding being such that the slope of its resistance line is greater than the slope of the magnetization curve of the generator, each self-excited field winding delaying the building up of the excitation of the generator on which it is provided and providing a portion of the generator excitation, the voltage to which each generator builds up being dependent upon the amount of its separate excitation and the slope of the resistance line of its self-excited field winding, and means for short-circuiting a portion of said resistance in circuit with the self-excited field winding of each generator to bring the car up to full speed.

44. In an elevator control system in which a direct current motor is employed for raising and lowering the car and in which current is supplied to said motor by a plurality of direct current generators having their armatures connected in series relation, a separately excited field winding on each generator, means for decreasing the excitation of said separately excited field windings in steps to retard the car, and a self-excited field winding on each generator for providing a portion of the generator excitation and for delaying the decrease of the generator excitation upon each step of decrease of excitation provided by the separately excited field winding of the generator.

45. In an elevator control system in which a direct current motor is employed for raising and lowering the car and in which current is supplied to said motor by two direct current generators having their armatures connected in series relation, a separately excited field winding on each generator, means for decreasing the excitation of said separately excited field windings in steps to retard the car, and a self-excited field winding on each generator for providing a portion of the excitation of the generator and for delaying the decrease of the generator excitation upon each step of decrease of the excitation provided by the separately excited field winding of the generator, the number of turns of the self-excited field winding of each generator and the resistance of its circuit being such that the slope of its resistance line is greater than the slope of the magnetization curve of the generator field.

46. In an elevator control system in which a direct current motor is employed for raising and lowering the car and in which current is supplied to said motor by two direct current generators having their armatures connected in series relation, a separately excited field winding on each generator, means for decreasing the excitation of said separately excited field windings in steps to retard the car, a series field winding on each generator, and a self-excited field winding on each generator for providing a portion of the excitation of the generator, for delaying the decrease of generator excitation upon each step of decrease of the excitation provided by the separately excited field winding of the generator and for damping any oscillations in the current supplied to said motor, the number of turns of the self-excited field winding of each generator and the resistance of its circuit being such that the slope of its resistance line is greater than the slope of the magnetization curve of the generator field.

47. In an elevator control system in which a direct current motor is employed for raising and lowering the car and in which current is supplied to said motor by two direct current generators having their armatures connected in series relation, a separately excited field winding on each generator, means for decreasing and then discontinuing the excitation of the separately excited field winding of one of said generators and thereupon decreasing the excitation of the separately excited field winding of the other generator to slow down the car, and a self-excited field winding on each generator for providing a portion of the generator excitation and for delaying the decrease of the generator excitation upon decrease of the excitation provided by the separately excited field winding of the generator, the number of turns of the self-excited field winding of each generator and the resistance of its circuit being such that the slope of its resistance line is greater than the slope of the magnetization curve of the generator field to enable the car to be slowed down.

48. An elevator control system in which a direct current motor is employed for raising and lowering the car and in which variable resistance is provided for controlling the speed of the motor to accelerate the car, characterized in that means in accordance with movement of the car is provided for causing said resistance to be of certain definite values at points predetermined distances from the floor from which the car is started in acceleration of the car.

49. An elevator control system in which a direct current motor is employed for raising and lowering the car, in which current is supplied to said motor by a direct current generator having a separately excited field winding connected to a source of direct current in circuit with resistance to start the car and in which said resistance is short-circuited in steps to accelerate the car, characterized in that means is provided which is controlled by movement of the car for causing said resistance steps to be short-circuited at predetermined distances from the floor from which the car is started.

50. In an elevator control system in which a direct current motor is employed for raising and lowering the car and in which current is supplied to said motor by a direct current generator having a separately excited field winding, a source of direct current, resistance, means for connecting said winding in circuit with said resistance to said source to start the car and for short-circuiting said resistance in steps to accelerate the car, means controlled by movement of the car for causing said resistance steps to be short-circuited at predetermined distances from the floor from which the car is started, and a self-excited field winding on said generator for providing a portion of the excitation, the number of turns of which and the resistance of the circuit of which are such as to delay the increase of generator excitation for each step and such that the slope of its resistance line is greater than the slope of the magnetization curve of the generator field.

51. In an elevator control system in which a direct current motor is employed for raising and lowering the car and in which current is supplied to said motor by a direct current generator having a separately excited field winding which is connected to a source of direct current in circuit with resistance to start the car, means controlled by movement of the car for short-circuiting said resistance in steps at predetermined distances from the floor from which the car is started to accelerate the car, and a series field winding on said generator for compensating for load.

52. In an elevator control system in which a direct current motor is employed for raising and lowering the car and in which current is supplied to said motor by a direct current generator, a separately excited field winding on said generator, a source of direct current, resistance, means for connecting said field winding in circuit with said resistance to said source to start the car, means controlled by movement of the car for short-circuiting said resistance in steps at predetermined distances from the floor from which the car is started to accelerate the car, a self-excited field winding on said generator for providing a portion of the excitation, the number of turns of which and the resistance of the circuit of which are such as to delay the increase of generator excitation for each said step and such that the slope of its resistance line is greater than the slope of the magnetization curve of the generator field, and a series field winding on said generator for compensating for load.

53. In an elevator control system in which a direct current motor is employed for raising and lowering the car and in which current is supplied to said motor by a direct current generator, a separately excited field winding on said generator, a source of direct current, resistance, means for connecting said field winding with said resistance in circuit therewith to said source to start the car, means controlled by movement of the car for short-circuiting said resistance in steps at predetermined distances from the floor from which the car is started to accelerate the car, a self-excited field winding on said generator for providing a portion of the excitation, the number of turns of which and the resistance of the circuit of which are such as to delay the increase of generator excitation for each of said steps and such that the slope of its resistance line is greater than the slope of the magnetization curve of the generator field, said means controlled by car movement acting as the car reaches a point a certain distance from said floor to decrease the resistance of the self-excited field winding circuit and thus to increase the effectiveness of said winding, and a series field winding on said generator for compensating for load.

54. An elevator control system in which a direct current motor is employed for raising and lowering the car, in which current is supplied to said motor by two direct current generators having their armatures connected in series relation and each having a separately excited field winding and in which means are provided for increasing the excitation of said windings to accelerate the car, characterized in that means controlled by movement of the car is provided for controlling the operation of said excitation increasing means to increase the voltage applied to said motor as the car reaches points predetermined distances from the floor from which it is started.

55. In an elevator control system in which a direct current motor is employed for raising and lowering the car, in which current is supplied to said motor by two direct current generators having their armatures connected in series relation and each having a separately excited field winding and in which means is provided for increasing the excitation of said windings to accelerate the car, means controlled by movement of the car for controlling the operation of said excitation increasing means to increase the voltage applied to said motor as the car reaches points predetermined distances from the floor from which it is started, and a series field winding on each generator for compensating for load.

56. In an elevator control system in which a direct current motor is employed for raising and lowering the car and in which current is supplied to said motor by two direct current generators having their armatures connected in series relation, a separately excited field winding on each generator, means controlled by movement of the car for causing increase in the excitation of said field windings to increase the voltage applied to said motor as the car reaches points predetermined distances from the floor from which it is started, and a self-excited field winding on each generator having a resistance line of a slope greater than that of the magnetization curve of the generator field for providing a portion of the excitation of the generator.

57. In an elevator control system in which a direct current motor is employed for raising and lowering the car and in which current is supplied to said motor by two direct current generators having their armatures connected in series relation, a separately excited field winding on each generator, means controlled by movement of the car for causing the excitation of said field windings to be increased to increase the voltage applied to said motor as the car reaches points predetermined distances from the floor from which it is started, a series field winding on each generator for compensating for load, and a self-excited field winding on each generator of a number of turns and having the resistance of its circuit such that the slope of its resistance line is greater than the slope of the magnetization curve of the generator field for amplifying the excitation provided by the separately excited field winding and series field winding of the generator.

58. An elevator control system in which a direct current motor is employed for raising and lowering the car, in which current is supplied to said motor by two direct current generators having their armatures connected in series relation and each having a separately excited field winding, in which means is provided for exciting said field windings, and in which the field winding of one of said generators is excited by said exciting means to start the car, characterized in that means controlled by movement of the car is provided for controlling said exciting means to cause an increase in the amount of such excitation as the car reaches a point a given distance from the floor from which it is started, the excitation of said field winding of the other generator as the car reaches another point a further given distance from said floor and an increase in the amount of the excitation of the last named field winding as the car reaches still another point a still further given distance from said floor.

59. In an elevator control system in which a direct current motor is employed for raising and lowering the car, in which current is supplied to said motor by two direct current generators having their armatures connected in series relation and each having a separately excited field winding, in which means is provided for exciting said field windings and in which the field winding of one of said generators is excited by said exciting means to start the car, means controlled by movement of the car for controlling said exciting means to cause an increase in the amount of such excitation as the car reaches a point a given distance from the floor from which it is started, the excitation of said field winding of the other generator as the car reaches another point a further given distance from said floor and an increase in the amount of the excitation of the last named field winding as the car reaches still another point a still further given distance from said floor, and a self-excited field winding on each generator, the slope of the resistance line of which is greater than that of the magnetization curve of the generator field, for providing a portion of the generator excitation and for delaying the building up of the field.

60. In an elevator control system in which a direct current motor is employed for raising and lowering the car and in which current is supplied to said motor by two direct current generators having their armatures connected in series relation and each having a separately excited field winding, resistance for each field winding, a source of direct current, means for connecting the field winding of one of said generators to said source in circuit with its said resistance to start the car, means controlled by movement of the car for short-circuiting such resistance as the car reaches a point a given distance from the floor from which it is started, for connecting said field winding of the other generator to said source in circuit with its said resistance as the car reaches another point a further given distance from said floor and for short-circuiting such resistance as the car reaches still another point a still further given distance from said floor, a self-excited field winding on each generator, the slope of the resistance line of which is greater than that of the magnetization curve of the generator field for providing a portion of the generator excitation and for delaying the building up of the field, and a series field winding on each generator for compensating for load.

61. In an elevator control system in which a direct current motor is employed for raising and lowering the car, in which current is supplied to said motor by two direct current generators having their armatures connected in series relation and each having a separately excited field winding, in which resistance is provided for each field winding, and in which the field winding of one of said generators is connected to a source of current in circuit with its resistance to start the car, means operated in accordance with movement of the car for short-circuiting said resistance for said one generator in steps as the car reaches points given distances from the floor from which it is started to increase the speed of the car, for connecting said field winding of the other generator to said source in circuit with its resistance as the car reaches another point a further given distance from said floor and for short-circuiting such resistance in steps as the car reaches points still further given distances from said floor to further increase the speed of the car, a self-excited field winding on each generator for providing a portion of the generator excitation and for delaying the building up of the field, and resistance in circuit with each self-excited field winding, the slope of the resistance line of the circuit of each self-excited field winding being greater than that of the magnetization curve of the generator field, said last named resistances being short-circuited by said means controlled by movement of the car as the car reaches a point a still further given distance from said floor to bring the car up to full speed.

62. In an elevator control system in which a direct current motor is employed for raising and lowering the car, in which current is supplied to said motor by a direct current generator, in which voltage is applied by said generator to said motor to start the car, and in which the applied voltage is increased to accelerate the car and decreased to retard the car, means controlled by movement of the car operable as the car arrives at points fixed distances from the floor from which it is started to cause increase in said applied voltage and operable as the car arrives at points fixed distances from the floor at which a stop is to be made to cause decrease in said applied voltage.

63. In an elevator control system in which a direct current motor is employed for raising and lowering the car, in which current is supplied to said motor by a direct current generator having a separately excited field winding which is connected in circuit with resistance to a source of direct current to start the car, in which said resistance is short-circuited in steps to accelerate the car, and in which resistance is inserted in circuit with said winding in steps to retard the car in stopping it at a floor, means controlled by movement of the car for causing said short-circuiting of resistance steps to occur at predetermined distances from the floor from which the car started and for causing said insertion of resistance steps to occur at predetermined distances from the floor at which the car is to be stopped.

64. In an elevator control system in which a direct current motor is employed for raising and lowering the car and in which current is supplied to said motor by a direct current generator having a separately excited field winding, resistance, means controlled by movement of the car for inserting said resistance in circuit with said winding in steps to retard the car as the car arrives at predetermined distances from the floor at which a stop is to be made, and a self-excited field winding on the generator for providing a portion of the excitation, the number of turns of which and the resistance of the circuit of which are such as to delay the change of generator excitation for each of such steps and such that the slope of the resistance line is greater than that of the magnetization curve of the generator field.

65. In an elevator control system in which a direct current motor is employed for raising and lowering the car, in which current is supplied to said motor by a direct current generator having a separately excited field winding and in which resistance is inserted in circuit with said winding in steps to retard the car in stopping it at a floor, means controlled by movement of the car for causing said insertion of resistance steps to occur at predetermined distances from said floor, a self-excited field winding on said generator for providing a portion of the excitation, the number of turns of which and the resistance of the circuit of which are such as to delay the change of generator excitation for each of such steps and such that the slope of the resistance line of its circuit is greater than that of the magnetization curve of the generator field, and a series field winding on said generator for compensating for load during said retardation.

66. In an elevator control system in which a direct current motor is employed for raising and lowering the car, in which current is supplied to said motor by a direct current generator having a separately excited field winding which is connected in circuit with resistance to a source of direct current to start the car, in which said resistance is short-circuited in steps to accelerate the car, and in which resistance is inserted in circuit with said winding in steps to retard the car in stopping it at a floor, means operated in accordance with car movement for causing said short-circuiting of resistance steps to occur at predetermined distances from the floor from which the car started and for causing said insertion of resistance steps to occur at predetermined distances from the floor at which the car is to be stopped, and a self-excited field winding on said generator for providing a portion of the excitation, the number of turns of which and the resistance of the circuit of which are such as to delay the change of generator excitation for each of said steps and such that the slope of the resistance line of its circuit is greater than that of the magnetization curve of the generator field.

67. In an elevator control system in which a direct current motor is employed for raising and lowering the car, in which current is supplied to said motor by a direct current generator having a separately excited field winding which is connected in circuit with resistance to a source of direct current to start the car, in which said resistance is short-circuited in steps to accelerate the car, and in which resistance is inserted in circuit with said winding in steps to retard the car in stopping it at a floor, said generator also having a series field winding, means operated in accordance with movement of the car for causing said short-circuiting of resistance steps to occur at predetermined distances from the floor from which the car started and for causing said insertion of resistance steps to occur at predetermined distances from the floor at which the car is to be stopped, a self-excited field winding on said generator for providing a portion of the excitation, the number of turns of which and the resistance of the circuit of which are such as to delay the change of generator excitation for each of said steps and such that the slope of the resistance line of its circuit is greater than that of the magnetization curve of the generator field, and means for controlling said series field winding to cause said acceleration and retardation to take place in accordance with a given speed-time curve determined by said resistance steps, regardless of load.

68. In an elevator control system in which a direct current motor is employed for raising and lowering the car, in which current is supplied to said motor by a direct current generator having a separately excited field winding which is connected in circuit with resistance to a source of direct current to start the car, in which said resistance is short-circuited in steps to accelerate the car, and in which resistance is inserted in circuit with said winding in steps to retard the car in stopping it at a floor, means operated in accordance with movement of the car for causing said short-circuiting of resistance steps to occur at predetermined distances from the floor from which the car started and for causing said insertion of resistance steps to occur at predetermined distances from the floor at which the car is to be stopped, a self-excited field winding on each generator for providing a portion of the excitation, the number of turns of which and the resistance of the circuit of which are such as to delay the change of generator excitation for each of said steps and such that the slope of its resistance line is greater than that of the magnetization curve of the generator field, said means operated in accordance with car movement acting during acceleration to decrease the resistance of the circuit of said self-excited field winding as the car reaches a point of further predetermined distance from said floor from which the car started and acting to increase the resistance of that circuit at the beginning of retardation.

69. In an elevator control system in which a direct current motor is employed for raising and lowering the car, in which current is supplied to said motor by two direct current generators having their armatures connected in series relation, each generator having a separately excited field winding, and in which the excitation of said separately excited field windings is decreased in steps to retard the car in bringing it to a stop at a floor, means controlled by movement of the elevator car for causing said steps of decrease of separate excitation to occur as the car reaches points predetermined distances from said floor, and a self-excited field winding on each generator for providing a portion of the excitation of the generator and for delaying the decrease of excitation, the number of turns of self-excited field winding of each generator and the resistance of its circuit being such that the slope of the resistance line of its circuit is greater than the slope of the magnetization curve of the generator field.

70. In an elevator control system in which a direct current motor is employed for raising and lowering the car, in which current is supplied to said motor by two direct current generators having their armatures connected in series relation, each generator having a separately excited field winding, and in which the excitation of said separately excited field windings is decreased in steps to retard the car in bringing it to a stop at a floor, means controlled by movement of the elevator car for causing said steps of decrease of separate excitation to occur as the car reaches points predetermined distances from said floor, a self-excited field winding on each generator for providing a portion of the excitation of the generator and for delaying the decrease of excitation, the number of turns of self-excited field winding of each generator and the resistance of its circuit being such that the slope of its resistance line is greater than the slope of the magnetization curve of the generator field, and a series field winding on each generator for compensating for load, said self-excited field windings also acting in conjunction with said series field windings to damp any oscillations in current in the motor armature circuit.

71. In an elevator control system in which a direct current motor is employed for raising and lowering the car and in which current is supplied to said motor by two direct current generators having their armatures connected in series relation, each generator having a separately excited field winding, means controlled by movement of the elevator car and operable in slowing down the car preparatory to bringing it to a stop at a floor for causing, as the car reaches points predetermined distances from said floor, the excitation of the separately excited field winding of one of said generators to be decreased and then discontinued and thereupon the excitation of the separately excited field winding of the other generator to be decreased, and a self-excited field winding on each generator for providing a portion of the excitation of the generator and for delaying the decrease of excitation, the number of turns of the self-excited field winding of each generator and the resistance of its circuit being such that the slope of its resistance line is greater than the slope of the magnetization curve of the generator field.

72. In an elevator control system in which a direct current motor is employed for raising and lowering the car and in which current is supplied to said motor by two direct current generators having their armatures connected in series relation, each generator having a separately excited field winding, means controlled by movement of the elevator car and operable in slowing down the car preparatory to bringing it to a stop at a floor for causing, as the car reaches points predetermined distances from said floor, the excitation of the separately excited field winding of one of said generators to be decreased and then discontinued and thereupon the excitation of the separately excited field winding of the other generator to be decreased, and a series field winding on each generator for compensating for load.

73. In an elevator control system in which a direct current motor is employed for raising and lowering the car and in which current is supplied to said motor by two direct current generators having their armatures connected in series relation, each generator having a separately excited field winding, means operated in accordance with movement of the elevator car and operable in slowing down the car preparatory to bringing it to a stop at a floor for causing, as the car reaches points predetermined distances from said floor, the excitation of the separately excited field winding of one of said generators to be decreased and then discontinued and thereupon the excitation of the separately excited field winding of the other generator to be decreased, a series field winding on each generator, a self-excited field winding on each generator for providing a portion of the excitation of the generator and acting due to its coupling with the generator separately excited field winding to delay the decrease of excitation and due to its coupling with the generator series field winding to damp any oscillations in current in the motor armature circuit, the number of turns of the self-excited field winding of each generator and the resistance of its circuit being such that the slope of its resistance line is greater than the slope of the magnetization curve of the generator field.

74. An elevator control system in which a direct current motor is employed for raising and lowering the car, in which current is supplied to said motor by a plurality of direct current generators having their armatures connected in series relation, each generator having a separately excited field winding, and in which the excitation of said separately excited field windings is increased in steps to accelerate the car and decreased in steps to retard the car, characterized in that each generator also has a self-excited field winding for providing a portion of the excitation of the generator, for delaying the increase in generator excitation during acceleration and for delaying the decrease in generator excitation during retardation.

75. An elevator control system in which a direct current motor is employed for raising and lowering the car, in which current is supplied to said motor by a plurality of direct current generators having their armatures connected in series relation, each generator having a separately excited field winding, and in which the excitation of said separately excited field windings is increased in steps to accelerate the car and decreased in steps to retard the car, characterized in that each generator also has a self-excited field winding for providing a portion of the excitation of the generator, for delaying the increase in generator excitation during acceleration and for delaying the decrease in generator excitation during retardation, the amount of excitation provided by the self-excited field winding of each generator being dependent upon the number of turns of the winding and the resistance of its circuit which are such that the resistance line of the winding is of a slope which is greater than that of the magnetization curve of the generator field.

76. In an elevator control system in which a direct current motor is employed for raising and lowering the car, in which current is supplied to said motor by two direct current generators having their armatures connected in series relation, each generator having a separately excited field winding, in which each separately excited field winding is connected to a source of current with resistance in circuit therewith which is short-circuited in steps to accelerate the car and in which each separately excited field winding has resistance inserted in circuit therewith in steps to retard the car, characterized in that each generator also has a self-excited field winding for providing a portion of the excitation of the generator, for delaying the increase in generator excitation upon each step of resistance in circuit therewith being short-circuited during acceleration and for delaying the decrease in generator excitation upon each step of resistance being inserted in circuit therewith during retardation, the amount of excitation provided by the self-excited field winding of each generator being dependent upon the number of turns of the winding and the resistance of its circuit which are such that the resistance line of the winding is of a slope which is greater than that of the magnetization curve of the generator field.

77. An elevator control system in which a direct current motor is employed for raising and lowering the car, in which current is supplied to said motor by two direct current generators having their armatures connected in series relation, each generator having a separately excited field winding, in which each separately excited field winding is connected to a source of current with resistance in circuit therewith which is short-circuited in steps to accelerate the car and in which each separately excited field winding has resistance inserted in circuit therewith in steps to retard the car, characterized in that each generator has a series field winding, and that each generator also has a self-excited field winding for providing a portion of the excitation of the generator, for delaying the increase in generator excitation upon each step of resistance in circuit therewith being short-circuited during acceleration, for delaying the decrease in generator excitation upon each step of resistance being inserted in circuit therewith during retardation and for damping any oscillations in the current supplied to said motor, the amount of excitation provided by the self-excited field winding of each generator, the amount of delay in change in generator excitation and the amount of damping provided thereby being dependent upon the number of turns of the winding and the resistance of its circuit which are such that the resistance line of the winding is of a slope which is greater than that of the magnetization curve of the generator field.

78. An elevator control system in which a direct current motor is employed for raising and lowering the car, in which current is supplied to said motor by two direct current generators having their armatures connected in series relation, each generator having a separately excited field winding, in which each separately excited field winding is connected to a source of current with resistance in circuit therewith which is short-circuited in steps to accelerate the car and in which each separately excited field winding has resistance inserted in circuit therewith in steps to retard the car, characterized in that each generator has a series field winding and that each generator also has a self-excited field winding for providing a portion of the excitation of the generator, for delaying the increase in generator excitation upon each step of resistance in circuit therewith being short-circuited during acceleration, for delaying the decrease in generator excitation upon each step of resistance being inserted in circuit therewith during retardation and for delaying any changes in current in the circuit to the motor armature to damp out any oscillations thereof which may tend to occur, the amount of excitation provided by the self-excited field winding of each generator and the amount of delay in change in generator excitation and in current in the motor armature circuit provided thereby being dependent upon the number of turns of the winding and the resistance of its circuit which are such that the resistance line of the self-excited field winding circuit is of a slope which is greater than that of the magnetization curve of the generator field.

79. An elevator control system in which a direct current motor is employed for raising and lowering the car, in which current is supplied to said motor by two direct current generators having their armatures connected in series relation and each generator having a separately excited field winding, in which the separately excited field winding of one of the generators is connected to a source of direct current to start the car and the voltage applied thereto is increased to increase the speed of the car, and thereupon the separately excited field winding of the other generator is connected to said source and the voltage applied thereto is increased to further increase the speed of the car, and in which to slow down the car the voltage applied to the separately excited field winding of one of said generators is decreased and then discontinued and thereupon the excitation of the separately excited field winding of the other generator is decreased, characterized in that each generator also has a self-excited field winding for providing a portion of the excitation of the generator and for delaying the change in generator excitation upon a change in the voltage applied to the separately excited field winding of the generator, the number of turns of the self-excited field winding of each generator and the resistance of its circuit being such that the slope of the resistance line of its circuit is greater than the slope of the magnetization curve of the generator field.

80. In an elevator control system in which a direct current motor is employed for raising and lowering the car, in which current is supplied to said motor by two direct current generators having their armatures connected in series relation and each generator having a separately excited field winding, in which the separately excited field winding of one of the generators is connected in circuit with resistance to a source of direct current to start the car and the resistance is short-circuited to increase the speed of the car, and thereupon the separately excited field winding of the other generator is connected in circuit with resistance to said source and the resistance is short-circuited to further increase the speed of the car, and in which to slow down the car resistance is inserted in circuit with the separately excited field winding of one of said generators and then such separately excited field winding is disconnected from said source and resistance is inserted in circuit with the separately excited field winding of the other generator, a self-excited field winding on each generator for providing a portion of the excitation of the generator and for delaying the change in generator voltage upon a change in the excitation provided by the separately excited field winding of the generator, the number of turns of the self-excited field winding of each generator and the resistance of its circuit being such that the slope of the resistance line of its circuit is greater than the slope of the magnetization curve of the generator field, and means for decreasing the resistance of the circuit of the self-excited field winding of each generator to bring the car up to full speed and for increasing the resistance of the circuit of the self-excited field winding of each generator for slowing down of the car.

81. In an elevator control system in which a direct current motor is employed for raising and lowering the car, in which current is supplied to said motor by two direct current generators having their armatures connected in series relation and each having a separately excited field winding, and in which the excitation of said windings is increased to accelerate the car and decreased to retard the car, means controlled by movement of the car for controlling the excitation of each generator provided by its separately excited field winding to cause the voltage applied to said motor to be increased as a function of the distance of the car from the floor from which it is started and to be decreased as a function of the distance of the car from the floor at which it is to be stopped, and a self-excited field winding on each generator for providing a portion of the excitation and for delaying any change in voltage applied to the motor upon a change in the separate excitation of the generator.

82. In an elevator control system in which a direct current motor is employed for raising and lowering the car, in which current is supplied to said motor by two direct current generators having their armatures connected in series relation and each having a separately excited field winding, and in which the excitation of said windings is increased to accelerate the car and decreased to retard the car, means controlled by movement of the car for controlling the excitation of each generator provided by its separately excited field winding to cause the voltage applied to said motor to be increased as a function of the distance of the car from the floor from which it is started and to be decreased as a function of the distance of the car from the floor at which it is to be stopped, a self-excited field winding on each generator, the number of turns of which and the resistance of the circuit of which being such that the resistance line of the self-excited field winding circuit is of a slope greater than that of the magnetization curve of the generator field, for providing a portion of the excitation and for delaying any change in voltage applied to the motor upon a change in the separate excitation of the generator, and a series field winding on each generator for compensating for load.

83. An elevator control system in which a direct current motor is employed for raising and lowering the car, in which current is supplied to said motor by two direct current generators having their armatures connected in series relation and each generator having a separately excited field winding, and in which the separately excited field winding of one of the generators is excited to start the car, characterized in that means controlled by car movement is provided for controlling acceleration of the car by causing, as the car reaches points predetermined distances from the floor from which it is started, an increase in the amount of such excitation, the separately excited field winding of the other generator to be excited and an increase in the amount of its excitation, and for controlling retardation of the car preparatory to bringing it to a stop at a floor by causing, as the car reaches points predetermined distances from such floor, the excitation of the separately excited field winding of one of said generators to be decreased and then discontinued and thereupon the excitation of the separately excited field winding of the other generator to be decreased.

84. An elevator control system in which a direct current motor is employed for raising and lowering the car, in which current is supplied to said motor by two direct current generators having their armatures connected in series relation and each generator having a separately excited field winding, and in which the separately excited field winding of one of the generators is excited to start the car, characterized in that means controlled by car movement is provided for controlling acceleration of the car by causing, as the car reaches points predetermined distances from the floor from which it is started, an increase in the amount of such excitation, the separately excited field winding of the other generator to be excited and an increase in the amount of its excitation, and for controlling retardation of the car preparatory to bringing it to a stop at a floor by causing, as the car reaches points predetermined distances from such floor, the excitation of the separately excited field winding of one of said generators to be decreased and then discontinued and thereupon the excitation of the separately excited field winding of the other generator to be decreased, and that each generator is also provided with a self-excited field winding, the slope of the resistance line of the circuit of which is greater than that of the magnetization curve of the generator field, for providing a portion of the generator excitation and for delaying the building up of the field.

85. An elevator control system in which a direct current motor is employed for raising and lowering the car, in which current is supplied to said motor by two direct current generators having their armatures connected in series relation and each generator having a separately excited field winding, and in which the separately excited field winding of one of the generators is excited to start the car, characterized in that means controlled by car movement is provided for controlling acceleration of the car by causing, as the car reaches points predetermined distances from the floor from which it is started, an increase in the amount of such excitation, the separately excited field winding of the other generator to be excited and an increase in the amount of its excitation, and for controlling retardation of the car preparatory to bringing it to a stop at a floor by causing, as the car reaches points predetermined distances from such floor, the excitation of the separately excited field winding of one of said generators to be decreased and then discontinued and thereupon the excitation of the separately excited field winding of the other generator to be decreased, that each generator is provided with a self-excited field winding, the slope of the resistance line of the circuit of which is greater than that of the magnetization curve of the generator field, for providing a portion of the generator excitation and for delaying the building up of the field, and that each generator is also provided with a series field winding for compensating for load.

86. An elevator control system in which a direct current motor is employed for raising and lowering the car, in which current is supplied to said motor by two direct current generators having their armatures connected in series relation and each generator having a separately excited field winding, and in which the separately excited field winding of one of the generators is connected to a source of direct current in circuit with resistance to start the car, characterized in that means controlled by car movement is provided for controlling acceleration of the car by short-circuiting said resistance as the car reaches a point a given distance from the floor from which it is started, by connecting the separately excited field winding of the other generator to said source in circuit with resistance as the car reaches another point a further given distance from said floor, and for short-circuiting the last named resistance as the car reaches still another point a further given distance from said floor, and for controlling retardation of the car preparatory to bringing it to a stop at a floor by inserting resistance in circuit with the separately excited field winding of one of said generators as the car reaches a point a given distance from such floor, by disconnecting such separately excited field winding from said source as the car reaches another point a less given distance from such floor and by inserting resistance in circuit with the separately excited field winding of the other generator as the car reaches a point a still less given distance from such floor, that each generator has a self-excited field winding for providing a portion of the generator excitation and for delaying a change in the strength of the generator field upon a change in separate excitation, the number of turns of the winding and the resistance of its circuit being such that the slope of the resistance line of its circuit is greater than that of the magnetization curve of the generator field, and that each generator also has a series field winding for compensating for load, said self-excited field winding of each generator also acting in conjunction with said series field winding of the generator to damp any oscillations in current in the motor armature circuit.

87. An elevator control system in which a direct current motor is employed for raising and lowering the car, in which current is supplied to said motor by two direct current generators having their armatures connected in series relation and each generator having a separately excited field winding, and in which said windings are both excited in operating the car, characterized in that means controlled by car movement is provided for controlling retardation of the car preparatory to bringing it to a stop at a floor by decreasing the excitation of both of said windings as the car reaches a point a given distance from such floor and by discontinuing the excitation of the winding of one of said generators as the car reaches another point a less given distance from such floor.

88. An elevator control system in which a direct current motor is employed for raising and lowering the car, in which current is supplied to said motor by two direct current generators having their armatures connected in series relation and each generator having a separately excited field winding, and in which said windings are both excited in operating the car, characterized in that means controlled by car movement is provided for controlling retardation of the car preparatory to bringing it to a stop at a floor by decreasing the excitation of both of said windings as the car reaches a point a given distance from such floor, by further decreasing the excitation of the winding of one of said generators as the car reaches a point a less given distance from such floor, by discontinuing the excitation of that winding as the car reaches another point a still less given distance from such floor and by further decreasing the excitation of the winding of the other generator as the car reaches a point a still less given distance from such floor.

89. An elevator control system in which a direct current motor is employed for raising and lowering the car, in which current is supplied to said motor by two direct current generators having their armatures connected in series relation and each generator having a separately excited field winding, and in which the separately excited field winding of one of the generators is excited to start the car, characterized in that means controlled by car movement is provided for controlling acceleration of the car by increasing said excitation as the car reaches a point a given distance from the floor from which it is started, by exciting the separately excited field winding of the other generator as the car reaches another point a further given distance from said floor, and by increasing said excitation of the last named field winding as the car reaches still another point a further given distance from said floor, and for controlling retardation of the car preparatory to bringing it to a stop at a floor by decreasing the excitation of the separately excited field windings of both generators as the car reaches a point a given distance from such floor, and by discontinuing the excitation of the separately excited field winding of one of said generators as the car reaches another point a still less given distance from such floor.

90. An elevator control system in which a direct current motor is employed for raising and lowering the car, in which current is supplied to said motor by two direct current generators having their armatures connected in series relation and each generator having a separately excited field winding, and in which the separately excited field winding of one of the generators is connected to a source of direct current in circuit with resistance to start the car, characterized in that each generator has a self-excited field winding connected across the armature of the generator in circuit with resistance for supplying a portion of the excitation of the generator, the number of turns of which and the resistance of the circuit of which are such that the slope of its resistance line is greater than the slope of the magnetization curve of the generator field, and that means controlled by car movement is provided for controlling acceleration of the car by short-circuiting a portion of said resistance in circuit with said separately excited field winding of said one generator as the car reaches a point a given distance from the floor from which it is started, by connecting the separately excited field winding of the other generator to said source in circuit with resistance as the car reaches another point a further given distance from said floor, for short-circuiting a portion of the last named resistance as the car reaches still another point a further given distance from said floor, and for short-circuiting the remainder of said resistances in circuit with said separately excited field windings as the car reaches still another point a further given distance from said floor and at the same time short-circuiting said resistances in circuit with said self-excited field windings, and for controlling retardation of the car preparatory to bringing it to a stop at a floor by inserting resistance in circuit with the self-excited field windings of both generators and also inserting resistance in circuit with the separately excited field windings of both generators as the car reaches a point a given distance from such floor, by increasing the amount of resistance in circuit with the separately excited field winding of one of said generators as the car reaches a point a less given distance from such floor, by disconnecting such separately excited field winding from said source as the car reaches another point a still less given distance from such floor and by decreasing the excitation of the separately excited field winding of the other generator as the car reaches a point a still less given distance from such floor.

91. An elevator control system in which a direct current motor is employed for raising and lowering the car and in which current is supplied to said motor by a direct current generator having a separately excited field winding, the strength of which is increased in steps to accelerate the car, and a series field winding, characterized in that means is provided for reducing the strength of the series field winding for full speed operation provided load on the motor is below a predetermined value.

92. An elevator control system in which a direct current motor is employed for raising and lowering the car and in which current is supplied to said motor by a plurality of direct current generators having their armatures connected in series relation and each generator having a separately excited field winding, and in which the excitation of said separately excited field windings is increased in steps to accelerate the car, characterized in that each of said generators is also provided with a series field winding and that means is provided for reducing the strength of said series field windings for full speed operation provided the load on said motor is below a predetermined value.

93. An elevator control system in which a direct current motor is employed for raising and lowering the car and in which current is supplied to said motor by a plurality of direct current generators having their armatures connected in series relation and each generator having a separately excited field winding, and in which the excitation of said separately excited field windings is increased to accelerate the car and decreased to retard the car, characterized in that each generator is also provided with a series field winding and that means is provided for causing the strength of said series field windings to be weaker for retardation than for acceleration.

94. An elevator control system in which a direct current motor is employed for raising and lowering the car and in which current is supplied to said motor by two direct current generators having their armatures connected in series relation and each generator having a separately excited field winding, and in which the separately excited field winding of one of the generators is connected to a source of direct current to start the car and the voltage applied thereto is increased to increase the speed of the car and thereupon the separately excited field winding of the other generator is connected to said source and the voltage applied thereto is increased to further increase the speed of the car, characterized in that each of said generators is also provided with a series field winding, the ampere-turns of the series field winding of said other generator being greater than the ampere-turns of the series field winding of said one generator.

95. An elevator control system in which a direct current motor is employed for raising and lowering the car and in which current is supplied to said motor by two direct current generators of the same size and characteristics having their armatures connected in series relation and each generator having a separately excited field winding, in which the separately excited field winding of one of the generators is connected to a source of direct current to start the car and the voltage applied thereto is increased to increase the speed of the car and thereupon the separately excited field winding of the other generator is connected to said source and the voltage applied thereto is increased to further increase the speed of the car, and in which to slow down the car the voltage applied to the separately excited field winding of said other generator is decreased and then discontinued and the voltage applied to the separately excited field winding of said one generator is decreased, characterized in that each of said generators is also provided with a series field winding, that resistance is connected in shunt with the series field winding of each generator, and said resistance in shunt with the series field winding of said other generator being of a greater value than said resistance in shunt with the series field winding of said one generator, and that means is provided for short-circuiting portions of both resistances to decrease the strengths of said series field windings during retardation.

96. An elevator control system in which a direct current motor is employed for raising and lowering the car, in which current is supplied to said motor by a direct current generator having a separately excited field winding and in which the strength of the separately excited field winding is increased to accelerate the car, characterized in that said generator also has a self-excited field winding, that the number of turns of the self-excited field winding and the resistance of its circuit are such that the slope of its resistance line is greater than the slope of the magnetization curve of the generator field and that means is provided which is responsive to the load on the motor for decreasing the resistance of said circuit to decrease the slope of said resistance line and thus increase the effect of the self-excited field winding.

97. An elevator control system in which a direct current motor is employed for raising and lowering the car, in which current is supplied to said motor by a direct current generator having a separately excited field winding and in which the strength of the separately excited field winding is increased to accelerate the car, characterized in that said generator also has a self-excited field winding, that the number of turns of the self-excited field winding and the resistance of its circuit are such that the slope of its resistance line is greater than the slope of the magnetization curve of the generator field, that means is provided which is responsive to the load on the elevator motor for decreasing the resistance of said circuit to decrease the slope of said resistance line and thus increase the effect of the self-excited field winding, and that means is provided for rendering said load responsive means ineffective until the car attains a predetermined speed.

98. An elevator control system in which a direct current motor is employed for raising and lowering the car, in which current is supplied to said motor by a direct current generator having a separately excited field winding and in which the strength of the separately excited field winding is increased to accelerate the car, characterized in that said generator also has a self-excited field winding, that the number of turns of the self-excited field winding and the resistance of its circuit are such that the slope of its resistance line is greater than the slope of the magnetization curve of the generator field, that means is provided which is operable as the car approaches full speed for decreasing the resistance of said circuit to decrease the slope of said resistance line and thus increase the effect of the self-excited field winding, and that load responsive means is provided which is rendered effective as the car approaches full speed for further decreasing the resistance of said circuit to further decrease the slope of said resistance line and thus further increase the effect of the self-excited field winding, provided the load on said motor is above a predetermined value.

99. An elevator control system in which a direct current motor is employed for raising and lowering the car, in which current is supplied to said motor by a direct current generator and in which a switch having a voltage coil and a coil subject to the current in the motor armature circuit is provided for controlling the excitation of said generator, characterized in that said coils act in opposition, that said voltage coil is energized in starting the car to cause the operation of said switch and is of a strength to prevent the dropping out of said switch by said current coil, that means operable as the car reaches a certain speed is provided for reducing the strength of the voltage coil sufficiently to enable the current coil to cause the dropping out of the switch provided the load on said motor is above a certain value, and that means is provided which is controlled by said switch to cause upon the switch dropping out an increase in the excitation of said generator.

100. An elevator control system in which a direct current motor is employed for raising and lowering the car, in which current is supplied to said motor by a direct current generator and in which a switch having a voltage coil and a current coil connected in the motor armature-generator armature circuit is provided for controlling the excitation of said generator, characterized in that said coils act in opposition, that said voltage coil is connected to a source of current in starting the car prior to the excitation of said generator to cause the operation of said switch and is of a strength to prevent the dropping out of said switch by said current coil, that means operable as the car reaches a certain speed is provided for inserting resistance in circuit with said voltage coil to reduce its strength sufficiently to enable the current coil to cause the dropping out of the switch when the load on said motor is above a certain value, and that means is provided which is controlled by said switch to cause upon the switch dropping out an increase in the excitation of said generator.

101. An elevator control system in which a direct current motor is employed for raising and lowering the car, in which current is supplied to said motor by a direct current dynamo electric generating means having exciting means for providing separate excitation, exciting means for providing series excitation, and exciting means for providing self-excitation, and in which the excitation provided by said separate exciting means is decreased in steps to retard the car, characterized in that the self-exciting means acts to damp out any oscillations in the motor armature circuit and that means are provided to increase the damping of any such oscillations during the latter portion of the retardation.

102. An elevator control system in which a direct current motor is employed for raising and lowering the car, in which current is supplied to said motor by at least one direct current generator having a separately excited field winding, a series field winding, and a self-excited field winding, and in which the excitation provided by said separately excited field winding is decreased in steps to retard the car, characterized in that the self-excited field winding acts to damp out any oscillations in the motor armature circuit and that means are provided to increase the damping action of said self-excited field winding during the latter portion of the retardation period.

103. An elevator control system in which a direct current motor is employed for raising and lowering the car, and in which current is supplied to said motor by two direct current generators having their armatures connected in series relation, each generator having a separately excited field winding which is excited in operating the car, characterized in that means operated in accordance with movement of the elevator car is provided for controlling slow down of the car preparatory to bringing it to a stop at a floor, said means including means for causing during such slow down the excitation of the separately excited field winding of one of said generators to be discontinued so that only the voltage of the other generator is applied to said motor for the remainder of the slow down, that each generator has a self-excited field winding for providing a portion of the excitation of the generator, the number of turns of the self-excited field winding of each generator and the resistance of its circuit being such that the slope of its resistance line is greater than the slope of the magnetization curve of the generator field, that each generator also has a series field winding for compensating for load, said self-excited field windings also acting to damp any oscillations in current in the motor armature circuit, and that means is provided for increasing the damping action of the self-excited field winding of said other generator after the discontinuance of the excitation of said one generator while maintaining the slope of the resistance line of said other generator substantially the same.

104. An elevator control system in which a direct current motor is employed for raising and lowering the car, in which current is supplied to said motor by two direct current generators having their armatures connected in series relation, each generator having a separately excited field winding which is excited in operating the car, characterized in that means operated in accordance with movement of the elevator car is provided for controlling slow down of the car preparatory to bringing it to a stop at a floor, said means including means for causing during such slow down the excitation of the separately excited field winding of one of said generators to be discontinued so that only the voltage of the other generator is applied to said motor for the remainder of the slow down, that each generator has a self-excited field winding with resistance in series therewith for providing a portion of the excitation of the generator, the number of turns of self-excited field winding of each generator and the resistance of its circuit being such that the slope of its resistance line is greater than the slope of the magnetization curve of the generator field, that each generator also has a series field winding for compensating for load, said self-excited field windings also acting in conjunction with said series field windings to damp any oscillations in current in the motor armature circuit, and that means is provided which is operable after discontinuance of the excitation of said one generator to connect resistance in parallel with the self-excited field winding of said other generator to increase the damping action provided thereby and for reducing the resistance in series with such self-excited field winding to a value to maintain the slope of its resistance line substantially the same.

105. An elevator control system in which a direct current motor is employed for raising and lowering the car, in which current is supplied to said motor by two direct current generators having their armatures connected in series relation, each generator having a separately excited field winding which is excited in operating the car, characterized in that means controlled by movement of the elevator car is provided for controlling slow down of the car preparatory to bringing it to a stop at a floor, said means including means for causing during slow down the excitation of the separately excited field winding of one of said generators to be discontinued and its connection across the generator armature with the polarity such as to oppose the generator voltage so that only the voltage of the other generator is applied to said motor for the remainder of the slow down, that each generator has a self-excited field winding with resistance in series therewith for providing a portion of the excitation of the generator, the number of turns of self-excited field winding of each generator and the resistance of its circuit being such that the slope of its resistance line is greater than the slope of the magnetization curve of the generator field, that each generator also has a series field winding for compensating for load, said self-excited field windings also acting in conjunction with said series field windings to damp any oscillations in current in the motor armature circuit while voltage is being applied to said motor by both generators, and that means are provided which are operable upon the connection of the separately excited field winding of said one generator across the generator armature to connect resistance in parallel with the self-excited field winding of said other generator to increase the damping action provided thereby and for connecting resistance in parallel with said resistance in series with such self-excited field winding of a value to maintain the slope of its resistance line substantially the same.

106. An elevator control system in which a direct current motor is employed for raising and lowering the car, and in which current is supplied to said motor by a direct current dynamo electric generating means having exciting means for providing separate excitation, characterized in that in order to cause acceleration and retardation to take place in accordance with a given speed-time curve the excitation provided by said separate exciting means is increased in steps to accelerate the car as the car reaches points predetermined distances from the floor from which it is started and decreased in steps to retard the car as the car reaches points predetermined distances from the floor at which a stop is to be made, that said generating means is also provided with series exciting means for compensating for load and with self-exciting means for providing a portion of the excitation and for damping any oscillations in current in the motor armature circuit, that means operable under conditions where the car due to the shortness of the run does not attain full speed is provided for decreasing for a given time the excitation of said generating means from that being provided to accelerate the car an amount to reduce the current supplied to said motor from an amount required to accelerate the car in accordance with said speed-time curve to a value required to retard the car in accordance with said curve, that means are provided for increasing the damping action during the latter portion of the retardation, and that means are provided for preventing the increase in damping prior to the expiration of said given time.

107. An elevator control system in which a direct current motor is employed for raising and lowering the car, in which current is supplied to said motor by at least one direct current generator having a separately excited field winding, characterized in that means controlled by car movement is provided for causing acceleration and retardation to take place in accordance with a given speed-time curve by causing the excitation provided by said winding to be increased in steps as the car reaches points predetermined distances from the floor from which it is started and by causing the excitation provided by said winding to be decreased in steps as the car reaches points predetermined distances from the floor at which a stop is to be made, characterized in that said generator is also provided with a series field winding for compensating for load and with a self-excited field winding for providing a portion of the excitation and for damping any oscillations in current in the motor armature circuit, that means operable under conditions where the car due to the shortness of the run does not attain full speed is provided for decreasing for a given time interval the excitation of said generator from that being provided to accelerate the car an amount to reduce the current supplied to said motor from an amount required to accelerate the car in accordance with said speed-time curve to a value required to retard the car in accordance with said curve, that means is provided for increasing the damping action as the car reaches one of said points a given distance from the floor at which a stop is being made, and that means is provided for preventing such increase in damping prior to the expiration of said given time interval.

108. An elevator control system in which a direct current motor is employed for raising and lowering the car, in which current is supplied to said motor by direct current dynamo electric generating means and the excitation of said generating means is increased to accelerate the car and decreased to retard the car, characterized in that means controlled by car movement is provided for causing said acceleration and retardation to take place in accordance with a given speed-time curve, said means including means operable during acceleration or a short floor run for applying reverse excitation to said generating means to reduce the excitation thereof an amount to force down the current supplied to said motor to a value to enable retardation to be effected in accordance with said curve.

109. An elevator control system in which a direct current motor is employed for raising and lowering the car, in which current is supplied to said motor by direct current dynamo electric generating means and in which the excitation of said generating means is increased in steps to accelerate the car and decreased in steps to retard the car, characterized in that means controlled by car movement is provided for causing said acceleration and retardation to take place in accordance with a given speed-time curve and that means, operable under conditions where the car due to the shortness of the run does not attain full speed, is provided for decreasing for a given time said excitation of said generating means from that being provided to accelerate the car an amount to reduce the current supplied to said motor from the amount required to accelerate the car in accordance with said curve to a value required to retard the car in accordance with said curve.

110. An elevator control system in which a direct current motor is employed for raising and lowering the car, in which current is supplied to said motor by direct current dynamo electric generating means and in which the excitation of said generating means is increased in steps to accelerate the car and decreased in steps to retard the car, characterized in that means controlled by car movement is provided for controlling said acceleration by causing said steps of increase of excitation to take place as the car reaches points predetermined distances from the floor from which it is started and for controlling retardation of the car by causing said steps of decrease of excitation to take place as the car reaches points predetermined distances from the floor at which the stop is being made, and that means is provided for applying reverse excitation to said generating means to reduce such excitation an amount to effect a change from acceleration to retardation under conditions where the car due to the shortness of the run does not attain full speed.

111. An elevator control system in which a direct current motor is employed for raising and lowering the car, in which current is supplied to said motor by direct current dynamo electric generating means having exciting means for connection to an external source of direct current to provide separate excitation, and in which such excitation is increased in steps to accelerate the car and decreased in steps to retard the car, characterized in that means controlled by car movement is provided for controlling said acceleration by causing said steps of increase of excitation to take place as the car reaches points predetermined distances from the floor from which it is started and for controlling retardation of the car by causing said steps of decrease of excitation to take place as the car reaches points predetermined distances from the floor at which the stop is being made, that said generating means is provided with additional exciting means for opposing said first named exciting means and that means is provided for rendering said last named exciting means ineffective in the event the car attains full speed in making a run but for rendering such means effective to bring about a change from acceleration to retardation under conditions where the car due to the shortness of the run does not attain full speed.

112. An elevator control system in which a direct current motor is employed for raising and lowering the car, in which current is supplied to said motor by direct current dynamo electric generating means having exciting means for connection to an external source of direct current to provide separate excitation, and in which such excitation is increased in steps to accelerate the car and decreased in steps to retard the car, characterized in that means is provided for controlling said steps to cause said acceleration and retardation to take place in accordance with a given speed-time curve under conditions where the car attains full speed, that said generating means is provided with additional exciting means for opposing said first named exciting means, that means is provided for rendering said last named exciting means ineffective in the event the car attains full speed in making a run, and that means controlled by car movement is provided for rendering said opposing exciting means effective, under conditions where the car due to the shortness of the run does not attain full speed, as the car reaches a point a certain distance from the floor at which a stop is to be made to bring about a change from acceleration to retardation.

113. An elevator control system in which a direct current motor is employed for raising and lowering the car, in which current is supplied to said motor by direct current dynamo electric generating means having exciting means for connection to an external source of direct current to provide separate excitation, and in which such excitation is increased in steps to accelerate the car and decreased in steps to retard the car, characterized in that means controlled by car movement is provided for controlling said steps to cause said acceleration and retardation to take place in accordance with a given speed-time curve under conditions where the car attains full speed, that said generating means is provided with additional exciting means for opposing said first named exciting means, that means is provided for rendering said last named exciting means ineffective in the event the car attains full speed in making a run, and that additional means controlled by car movement is provided for rendering said opposing exciting means effective, under conditions where the car due to the shortness of the run does not attain full speed, as the car reaches a point a certain distance from the floor at which a stop is to be made and for a given time interval thereafter to bring about a change from acceleration to retardation.

114. An elevator control system in which a direct current motor is employed for raising and lowering the car, in which current is supplied to said motor by direct current dynamo electric generating means having exciting means for connection to an external source of direct current to provide separate excitation, and in which such excitation is increased in steps to accelerate the car and decreased in steps to retard the car, characterized in that means controlled by car movement is provided for controlling said steps to cause said acceleration and retardation to take place in accordance with a given speed-time curve under conditions where the car attains full speed, that said generating means is provided with additional exciting means for opposing said first named exciting means, that means is provided for rendering said last named exciting means ineffective in the event the car attains full speed in making a run, that timed means is provided for rendering said opposing exciting means effective for a predetermined time interval, under conditions where the car due to the shortness of the run does not attain full speed, to bring about a change from acceleration to retardation, and that additional means controlled by car movement is provided for causing operation of said timed means to render said opposing exciting means effective as the car arrives at a distance from the floor at which a stop is to be made determined by the length of the run.

115. In an elevator control system in which a direct current motor is employed for raising and lowering the car, in which current is supplied to said motor by direct current dynamo electric generating means having exciting means for connection to an external source of direct current to provide separate excitation, and in which such excitation is increased in steps to accelerate the car and decreased in steps to retard the car, means controlled by car movement for controlling said steps to cause said acceleration and retardation to take place in accordance with a given speed-time curve, additional exciting means on said generating means for opposing said first named exciting means, means for rendering said opposing exciting means ineffective in the event the car attains full speed in making a run, timed means for rendering said opposing exciting means effective for a predetermined time interval, under conditions where the car due to the shortness of the run does not attain full speed, to bring about a change from acceleration to retardation, and additional means controlled by car movement for initiating operation of said timed means as the car arrives at a distance from the floor at which a stop is to be made such that said opposing exciting means is effective for substantially equal time intervals before and after the car reaches the mid-point of such short run.

116. In an elevator control system in which a direct current motor is employed for raising and lowering the car, in which current is supplied to said motor by at least one direct current generator having a separately excited field winding adapted for energization from an external source of direct current, and in which the excitation of said generator provided by said winding is increased in steps to accelerate the car and decreased in steps to retard the car, means controlled by car movement for controlling said acceleration by causing said steps of increase of excitation to take place as the car reaches points predetermined distances from the floor from which it is started and for controlling retardation of the car by causing said steps of decrease of excitation to take place as the car reaches points predetermined distances from the floor at which the stop is being made, an additional field winding on said generator for opposing said separately excited winding, and means for rendering said opposing winding ineffective in the event the car attains full speed in making a run but for rendering it effective to force down the current supplied to the motor and thus bring about a change from acceleration to retardation under conditions where the car due to the shortness of the run does not attain full speed.

117. In an elevator control system in which a direct current motor is employed for raising and lowering the car, in which current is supplied to said motor by at least one direct current generator having a separately excited field winding adapted for energization from an external source of direct current, and in which the excitation of said generator provided by said winding is increased in steps to accelerate the car and decreased in steps to retard the car, means controlled by car movement for dictating said acceleration by causing certain steps of increase of excitation to take place as the car reaches points predetermined distances from the floor from which it is started and for dictating retardation of the car by causing certain steps of decrease of excitation to take place as the car reaches points predetermined distances from the floor at which the stop is being made, an additional field winding on said generator, and means for rendering said additional winding ineffective in the event the car attains full speed in making a run but for connecting it to said source in opposition to said separately excited field winding under conditions where the car due to the shortness of the run does not attain full speed to force down the current supplied to the motor an amount to bring said car within a given time interval from a state of acceleration into a state of retardation as dictated by said means controlled by car movement.

118. In an elevator control system in which a direct current motor is employed for raising and lowering the car, in which current is supplied to said motor by at least one direct current generator having a separately excited field winding adapted for energization from an external source of direct current, and in which the excitation of said generator provided by said winding is increased in steps to accelerate the car and decreased in steps to retard the car, means controlled by car movement for dictating said acceleration by causing certain steps of increase of excitation to take place as the car reaches points predetermined distances from the floor from which it is started and for dictating retardation of the car by causing certain steps of decrease of excitation to take place as the car reaches points predetermined distances from the floor at which the stop is being made, an additional field winding on said generator, means for rendering said additional winding ineffective in the event the car attains full speed in making a run, additional means controlled by car movement and operable under conditions where the car due to the shortness of the run does not attain full speed for connecting said additional winding to said source in opposition to said separately excited field winding as the car arrives at a predetermined distance from the floor at which a stop is to be made greater than half the length of the run to force down the current supplied to the motor an amount to bring said car from a state of acceleration into a state of retardation, and timed means for causing said connection of said additional winding to exist for a given time interval such as to cause said retardation at the end of said interval to be substantially in accordance with said dictated retardation at that point.

119. In an elevator control system in which a direct current motor is employed for raising and lowering the car, in which current is supplied to said motor by at least one direct current generator having a separately excited field winding adapted for energization from an external source of direct current, and in which the excitation of said generator provided by said winding is increased in steps to accelerate the car and decreased in steps to retard the car, means controlled by car movement for dictating said acceleration by causing certain steps of increase of excitation to take place as the car reaches points predetermined distances from the floor from which it is started and for dictating retardation of the car by causing certain steps of decrease of excitation to take place as the car reaches points predetermined distances from the floor at which the stop is to be made, a reverse field winding on said generator, means for rendering said reverse field winding ineffective in the event the car attains full speed in making a run, timed means operable under conditions where the car due to the shortness of the run does not attain full speed for connecting said reverse field winding to said source in opposition to said separately excited field winding for a predetermined time interval, and means for initiating operation of said timed means as the car arrives at a distance from the floor at which a stop is to be made dependent upon the length of the run such as to divide said time interval equally before and after the car reaches the mid-point of the run, the strength of such reverse field winding being such as to force down the current supplied to the motor during such interval an amount to bring said car from its state of acceleration into a state of retardation as dictated by said means controlled by car movement.

120. In an elevator control system in which a direct current motor is employed for raising and lowering the car and in which current is supplied to said motor by two direct current generators having their armatures connected in series relation, means controlled by car movement for controlling acceleration of the car by causing the excitation of said generators to be increased in steps as the car reaches points predetermined distances from the floor from which it is started and for controlling retardation of the car preparatory to bringing it to a stop at a floor by causing the excitation of said generators to be decreased in steps as the car reaches points predetermined distances from such last named floor, and additional means controlled by car movement and operable under conditions where the car due to the shortness of the run does not attain full speed for causing the excitation of said generators to be reduced for a predetermined time interval in an amount to bring about the change from acceleration to retardation.

121. In an elevator control system in which a direct current motor is employed for raising and lowering the car and in which current is supplied to said motor by two direct current generators having their armatures connected in series relation and each generator having a separately excited field winding, means controlled by car movement for dictating acceleration of the car by controlling the excitation of said generators by said windings as the car reaches points predetermined distances from the floor from which it is started to cause the voltage applied to said motor to be increased and for dictating retardation of the car preparatory to bringing it to a stop at a floor by controlling the excitation of said generators by said windings as the car reaches points predetermined distances from such floor to cause the voltage applied to said motor to be decreased, and means controlled by car movement and operable under conditions where the car due to the shortness of the run does not attain full speed for causing decrease in the excitation of said generators for a predetermined time interval before and after the car arrives at the mid-point of the run in an amount to bring about the change from said dictated acceleration to said dictated retardation.

122. In an elevator control system in which a direct current motor is employed for raising and lowering the car and in which current is supplied to said motor by two direct current generators having their armatures connected in series relation and each generator having a separately excited field winding, means controlled by car movement for dictating acceleration of the car by controlling the excitation of said generators by said windings as the car reaches points predetermined distances from the floor from which it is started to cause the voltage applied to said motor to be increased and for dictating retardation of the car preparatory to bringing it to a stop at a floor by controlling the excitation of said generators by said windings as the car reaches points predetermined distances from such floor to cause the voltage applied to said motor to be decreased, additional means controlled by car movement and operable under conditions where the car due to the shortness of the run does not attain full speed for causing decrease in the amount of excitation of said generators as the car arrives at a point a distance from the floor at which a stop is to be made greater than half the length of the run by an amount determined by the length of the run, and means for rendering said excitation decreasing means ineffective upon the expiration of a predetermined time interval.

123. In an elevator control system in which a direct current motor is employed for raising and lowering the car and in which current is supplied to said motor by two direct current generators having their armatures connected in series relation and each generator having a separately excited field winding adapted for energization from a source of direct current, means controlled by car movement for dictating acceleration of the car by controlling the energization of said windings from said source as the car reaches points predetermined distances from the floor from which it is started to cause the voltage applied to said motor to be increased and for dictating retardation of the car preparatory to bringing it to a stop at a floor by controlling the energization of said windings from said source as the car reaches points predetermined distances from such floor to cause the voltage applied to said motor to be decreased, a reverse field winding on each generator adapted for energization from said source to oppose the separately excited field winding of the generator, additional means controlled by car movement and operable under conditions where the car due to the shortness of the run does not attain full speed for causing energization of said reverse field windings from said source as the car arrives at a point a distance from the floor at which a stop is to be made greater than half the length of the run by an amount determined by the length of the run, and means for maintaining said reverse field windings energized for a predetermined time interval.

124. In an elevator control system in which a direct current motor is employed for raising and lowering the car and in which current is supplied to said motor by two direct current generators having their armatures connected in series relation and each generator having a separately excited field winding adapted for energization from a source of direct current, means controlled by car movement for dictating acceleration of the car by controlling the energization of said windings from said source as the car reaches points predetermined distances from the floor from which it is started to cause the voltage applied to said motor to be increased and for dictating retardation of the car preparatory to bringing it to a stop at a floor by controlling the energization of said windings from said source as the car reaches points predetermined distances from such floor to cause the voltage applied to said motor to be decreased, a reverse field winding on each generator adapted for energization from said source, timed means operable under conditions where the car due to the shortness of the run does not attain full speed for causing energization of said reverse field windings from said source in opposition to the separately excited field windings of the respective generators for a predetermined time interval, and means to initiate operation of said timed means as the car arrives at a distance from the floor at which a stop is to be made determined by the length of the run such as to divide said time interval equally before and after the car reaches the mid-point of the run, the strength of such reverse field windings being such as to force down the current supplied to the motor during such interval an amount to bring said car from its state of acceleration into a state of retardation as dictated by said means controlled by car movement.

125. In an elevator control system in which a direct current motor is employed for raising and lowering the car, in which current is supplied to said motor by two direct current generators having their armatures connected in series relation and each generator having a separately excited field winding, and in which the separately excited field winding of one of the generators is excited to start the car, means controlled by car movement for dictating acceleration of the car by causing, as the car reaches points predetermined distances from the floor from which it is started, an increase in the amount of such excitation, the separately excited field winding of the other generator to be excited and an increase in the amount of its excitation, and for dictating retardation of the car preparatory to bringing it to a stop at a floor by causing, as the car reaches points predetermined distances from such floor, the excitation of the separately excited field winding of one of said generators to be decreased and then discontinued and thereupon the excitation of the separately excited field winding of the other generator to be decreased, a reverse field winding on each generator, means for rendering said reverse field windings ineffective in the event the car attains full speed in making a run, timed means operable under conditions where the car due to the shortness of the run does not attain full speed for causing energization of said reverse field winding of each generator in opposition to the separately excited field winding of the generator for a predetermined time interval, and means to initiate operation of said timed means as the car arrives at a distance from the floor at which a stop is to be made determined by the length of the run such as to divide said time interval equally before and after the car reaches the mid-point of the run, the duration of said time interval and the strength of such reverse field windings being such as to force down the current supplied to the motor an amount to bring said car from its state of acceleration into a state of retardation as dictated by said means controlled by car movement.

126. An elevator control system in which a direct current motor is employed for raising and lowering the car, in which current is supplied to said motor by a direct current generator and in which in slowing down the car to bring it to a stop at a floor the excitation of said generator is reduced to a low value for the slow speed operation just prior to bringing the car to a stop, characterized in that means is provided for increasing said excitation by an amount to compensate for the potential drop across the brushes of said motor and generator in the event the current supplied to said motor is above a certain value.

127. An elevator control system in which a direct current motor is employed for raising and lowering the car, in which current is supplied to said motor by a direct current generator and in which excitation of said generator for the slow speed operation just prior to bringing the car to a stop at a floor is provided by a separately excited field winding connected in series with resistance to a source of direct current so that the excitation is of a low value, characterized in that means responsive to the current in the motor armature circuit is provided for decreasing said resistance by an amount to effect compensation for the potential drop across the brushes of said motor and generator under conditions where the current in the motor armature circuit is above a predetermined positive value.

128. An elevator control system in which a direct current motor is employed for raising and lowering the car, in which current is supplied to said motor by a direct current generator, in which excitation of said generator during retardation prior to the car reaching slow speed prior to stopping is provided by a separately excited field winding connected to a source of current and in which such excitation for such slow speed operation is provided by an auxiliary separately excited field winding connected to said source in series with resistance to a source of direct current so that the excitation is of a low value, characterized in that means including a relay responsive to the current in the motor armature-generator armature circuit is provided for decreasing the resistance of the circuit of said auxiliary field winding to increase the excitation provided thereby by an amount to effect compensation for the potential drop across the brushes of said motor and generator under conditions where the current in said motor armature-generator armature circuit is above a predetermined positive value.

129. In an elevator control system in which a direct current motor is employed for raising and lowering the car, in which current is supplied to said motor by two direct current generators having their armatures connected in series relation, in which each generator has a separately excited field winding adapted for connection to a source of direct current, and in which during retardation said field winding of one of said generators is disconnected from said source and the voltage for the remainder of the retardation is applied by said other generator, an auxiliary separately excited field winding on said other generator, the excitation of said other generator for slow speed operation prior to stopping being provided by said auxiliary field winding connected to said source in series with resistance, and means including a relay responsive to the current in the motor armature-generator armature circuit for decreasing the resistance of the circuit of said auxiliary field winding to increase the excitation provided thereby by an amount to effect compensation for the potential drop across the brushes of said motor and generators under conditions where the current in said motor armature-generator armature circuit is above a predetermined positive value.

130. In an elevator control system in which a direct current motor is employed for raising and lowering the car, in which current is supplied to said motor by a direct current generator having a field winding connected to a source of current to provide low excitation for slow speed operation prior to stopping, in which an electromechanical brake is provided for said car and in which said winding is disconnected from said source and said brake applied to bring the car to a stop at a floor, means for causing the disconnection of said winding from said source and the application of said brake to occur upon the arrival of the car at a point of a predetermined distance from the floor at which the stop is being made under conditions where the speed of the car is at or above a predetermined value and for delaying such disconnection and brake application until the car arrives at a point a less distance from such floor under conditions where the speed of the car is below said predetermined value.

131. An elevator control system in which a direct current motor is employed for raising and lowering the car, in which current is supplied to said motor by a direct current generator having a field winding for providing low excitation for slow speed operation prior to stopping, in which an electromechanical brake is provided for said motor and in which said winding and brake release coil are deenergized upon the arrival of the car at a point a predetermined distance from the floor at which a stop is being made to bring the car to a stop, characterized in that means is provided which is operable under conditions where the car tends to stop short of the floor for causing reenergization of said brake release coil and said winding to continue the car to the floor and for causing said winding and coil to again be deenergized upon the arrival of the car at a point a less distance from said floor to bring the car to a stop, said means including means for preventing the building up of the generator excitation above a predetermined value until said brake is released.

132. An elevator control system in which a direct current motor is employed for raising and lowering the car, in which current is supplied to said motor by a direct current generator having a field winding connected to a source of current to provide low excitation for slow speed operation prior to stopping, in which an electromechanical brake having its release coil connected to said source is provided for said car and in which said winding and brake release coil are disconnected from said source upon the arrival of the car at a point a predetermined distance from the floor at which the stop is being made to bring the car to a stop, characterized in that means is provided which is operable under conditions where the car tends to stop short of the floor for reconnecting said brake release coil and said winding to said source to continue the car to the floor and for again disconnecting said winding and coil from said source upon the arrival of the car at a point a less distance from said floor to bring the car to a stop, said means including means for causing a high resistance to be inserted in circuit with said winding while said brake is being released to prevent the current supplied to said motor building up to a value which would tend to cause the car to overrun the floor.

133. An elevator control system in which a direct current motor is employed for raising and lowering the car and in which current is supplied to said motor by a direct current generator having a field winding for providing low excitation for slow speed operation prior to stopping, characterized in that means is provided which is responsive to the current in the motor armature circuit for causing the excitation provided by said winding to be decreased in the event that such current is of a negative value.

134. In an elevator control system in which a direct current motor is employed for raising and lowering the car, in which current is supplied to said motor by a direct current generator having a field winding for providing low excitation for slow speed operation prior to stopping, in which an electromechanical brake is provided for said motor and in which said winding and brake release coil are deenergized to bring the car to a stop, means operable under conditions where the car overruns the floor before being brought to a stop for causing reenergization of said brake release coil and energization of said winding of opposite polarity to cause the car to be returned to the floor, and means for preventing said reenergization of said brake release coil and winding until the speed of the car in overrunning the floor has dropped to a predetermined value.

135. In an elevator control system in which a direct current motor is employed for raising and lowering the car, in which current is supplied to said motor by a direct current generator having a field winding connected to a source of current to provide low excitation for slow speed operation prior to stopping, in which an electromechanical brake is provided for said motor and in which said winding is disconnected from said source and the brake release coil is deenergized to apply the brake upon the arrival of the car at a point a predetermined distance from the floor at which a stop is being made to bring the car to a stop, means controlled by car movement and operable under conditions where the car overruns the floor before being brought to a stop for causing reenergization of said brake release coil and the connection of said winding to said source with the polarity such as to cause the car to be returned to the floor, and speed responsive means for preventing said reenergization of said brake release coil and reconnection of said winding until the speed of the car in overrunning the floor has dropped to a predetermined value.

136. In an elevator control system in which a direct current motor is employed for raising and lowering the car, in which current is supplied to said motor by a direct current generator having a field winding for providing low excitation for slow speed operation prior to stopping and in which said winding is deenergized in bringing the car to a stop at a floor, means operable under conditions where the car overruns the floor before being brought to a stop for causing energization of said winding of opposite polarity and in sufficient amount to insure quick starting of the car on its return to the floor, and means for reducing the amount of said excitation as soon as the car starts.

137. In an elevator control system in which a direct current motor is employed for raising and lowering the car, in which current is supplied to said motor by a direct current generator having a field winding for providing low excitation for slow speed operation prior to stopping and in which said winding is deenergized in bringing the car to a stop at a floor, means operable under conditions where the car overruns the floor before being brought to a stop for causing energization of said winding of opposite polarity and in sufficient amount to insure quick starting of the car on its return to the floor, and means controlled by car movement and responsive to the reversal of the car for reducing the amount of said excitation.

138. An elevator control system in which a direct current motor is employed for raising and lowering the car, said motor having a field winding connected to a source of direct current, in which the strength of the motor field provided by said winding is weakened while the car is standing at a floor and brought up to full strength for operation of the car, and in which means is provided for bringing said car to a stop at a floor, characterized in that means is provided for maintaining full field strength on said motor until the expiration of a predetermined time interval after the car has been brought to a stop.

139. An elevator control system in which a direct current motor is employed for raising and lowering the car, said motor having a field winding connected to a source of direct current, in which the strength of the motor field provided by said winding is weakened while the car is standing at a floor and brought up to full strength for operation of the car, in which current is supplied to said motor by a direct current generator having a separately excited field winding, and in which the excitation of said generator field winding is discontinued and an electromechanical brake is applied to bring the car to a stop, characterized in that means is provided for maintaining full field strength on said motor after discontinuance of said excitation of said generator field winding and while said brake is being applied until the car comes to a stop.

140. An elevator control system in which a direct current motor is employed for raising and lowering the car, in which an electromechanical brake is provided for said motor which is applied to bring the car to a stop, in which current is supplied to said motor by a direct current generator provided with a series field winding having a certain strength for the slow speed operation of the car prior to stopping, and in which means is provided for reducing the strength of said series field winding, characterized in that means is provided for preventing the operation of said reducing means until the expiration of a predetermined time interval after the car has been brought to a stop.

141. An elevator control system in which a direct current motor is employed for raising and lowering the car, in which an electromechanical brake is provided for said motor which is applied to bring the car to a stop, in which current is supplied to said motor by a direct current generator having a separately excited field winding and a self-excited field winding, the separately excited field winding being deenergized and the brake applied to bring the car to a stop, and in which means is provided for disconnecting said self-excited field winding from across the generator armature, characterized in that means is provided for preventing the operation of said disconnecting means until the expiration of a predetermined time interval after the car has been brought to a stop.

142. In an elevator control system in which a direct current motor is employed for raising and lowering the car, in which an electromechanical brake is provided for said motor which is released in starting the car and applied to bring the car to a stop, and in which current is supplied to said motor by a direct current generator having a field winding which is connected to said source for operating the car and disconnected from said source when the brake is being applied to bring the car to a stop, said generator also having a series field winding, means for causing while the brake is being applied the effectiveness of the series field winding to remain the same as during the slow speed operation of the car prior to the application of the brake, and means operable after the car has been brought to a stop to cause the effectiveness of said series field winding to be reduced.

143. An elevator control system in which a direct current motor is employed for raising and lowering the car, said motor having a field winding connected to a source of direct current, in which the current supplied to said motor field winding while the car is standing at a floor is of a value to provide a weak motor field and is increased to bring said field up to full strength for operation of the car, in which an electromechanical brake is provided for said motor, the release coil of which is connected to said source to release the brake in starting and disconnected from said source to apply the brake in bringing the car to a stop, and in which current is supplied to said motor by a direct current generator having a field winding which is connected to said source for operating the car and is disconnected from said source when the brake release coil is deenergized to bring the car to a stop, characterized in that means is provided for maintaining full field strength of said motor while said brake is being applied until the car comes to a full stop.

144. In an elevator control system in which a direct current motor is employed for raising and lowering the car, said motor having a field winding connected to a source of direct current, in which the current supplied to said motor field winding from said source while the car is standing at a floor is of a value to provide a weak motor field and is increased to bring said field up to full strength for operation of the car, in which an electromechanical brake is provided for said motor, the release coil of which is connected to said source to release the brake in starting and disconnected from said source to apply the brake as the car arrives at a predetermined distance from the floor at which a stop is to be made to bring the car to a stop, and in which current is supplied to said motor by a direct current generator having a field winding which is connected to said source for operating the car and is disconnected from said source when the brake release coil is deenergized to bring the car to a stop, means for causing the current supplied to said motor field winding while the brake is being applied to be the same as during said operation of the car to maintain full field strength on said motor, and means operable after the car is brought to a stop to cause the current supplied to said motor field winding to be reduced to said value to provide said weak motor field.

145. In an elevator control system in which a direct current motor is employed for raising and lowering the car, said motor having a field winding which is controlled to provide a relatively weak field while the car is standing at a floor and to provide a strong field for operation of the car, in which an electromechanical brake is provided for said motor which is released in starting the car and applied to bring the car to a stop, and in which current is supplied to said motor by a direct current generator having a field winding which is connected to a source for operating the car and is disconnected from said source when the brake is applied to bring the car to a stop, said generator also having a series field winding, means for causing while the brake is being applied said motor field to be as strong as during said operation of the car and the effectiveness of said series field winding to remain the same as during slow speed operation of the car prior to the application of the brake, and means operable after the car is brought to a stop to cause a reduction of said motor field strength to said weak value and the effectiveness of said series field winding to be reduced.

146. In an elevator control system in which a direct current motor is employed for raising and lowering the car, said motor having a field winding connected to a source of direct current, in which the current supplied to said motor field winding from said source while the car is standing at a floor is of a value to provide a weak motor field and is increased to bring said field up to full strength for operation of the car, in which an electromechanical brake is provided for said motor, the release coil of which is connected to said source to release the brake in starting and disconnected from said source to apply the brake as the car arrives at a predetermined distance from the floor at which a stop is to be made to bring the car to a stop, in which current is supplied to said motor by a direct current generator having a field winding which is connected to said source for operating the car and is disconnected from said source when the brake release coil is deenergized to bring the car to a stop, said generator also having a series field winding, and in which no field winding is connected across the generator armature to oppose the generator voltage while the brake is being applied, means for causing while the brake is being applied the current supplied to said motor field winding to be the same as during said operation of the car to maintain full field strength on said motor and the effectiveness of said series field winding to remain the same as during slow speed operation of the car prior to the application of the brake, and means operable after the car is brought to a stop to cause the current supplied to said motor field winding to be reduced to said value to provide said weak motor field and the effectiveness of said series field winding to be reduced.

147. In an elevator control system in which a direct current motor is employed for raising and lowering the car, said motor having a field winding which is controlled to provide a relatively weak field while the car is standing at a floor and to provide a strong field for operation of the car, in which an electromechanical brake is provided for said motor, which is released in starting the car and applied to bring the car to a stop, and in which current is supplied to said motor by a direct current generator having a field winding which is connected to said source for operating the car and is disconnected from said source when the brake is applied to bring the car to a stop, a self-excited field winding on said generator for providing a portion of the generator excitation, means for causing while the brake is being applied the strength of said motor field to be maintained and the effectiveness of said self-excited field winding to remain the same as during slow speed operation of the car prior to the application of the brake, and means operable after the car is brought to a stop to cause a reduction of said motor field strength to said weak value and to render said self-excited field winding ineffective.

148. In an elevator control system in which a direct current motor is employed for raising and lowering the car, said motor having a field winding which is controlled to provide a relatively weak field while the car is standing at a floor and to provide a strong field for operation of the car, in which an electromechanical brake is provided for said motor, which is released in starting the car and supplied to bring the car to a stop, in which current is supplied to said motor by a direct current generator having a field winding which is connected to a source for operating the car and is disconnected from said source when the brake is applied to bring the car to a stop, and in which no field winding is connected across the generator armature to oppose the generator voltage while the brake is being applied, a self-excited field winding on said generator for assisting said first named field winding, means for causing while the brake is being applied said motor field to be as strong as during said operation of the car and the effectiveness of said self-excited field winding to remain the same as during slow speed operation of the car prior to the application of the brake, and means operable after the car is brought to a stop to cause a reduction of said motor field strength to said weak value and the disconnection of said self-excited field winding from across the generator armature.

149. In an elevator control system in which a direct current motor is employed for raising and lowering the car, said motor having a field winding which is controlled to provide a relatively weak field while the car is standing at a floor and to provide a strong field for operation of the car, in which an electromechanical brake is provided for said motor which is released in starting the car and applied to bring the car to a stop, in which current is supplied to said motor by a direct current generator having a field winding which is connected to a source for operating the car and is disconnected from said source when the brake is applied to bring the car to a stop, said generator also having a series field winding, and in which no field winding is connected across the generator armature to oppose the generator voltage while the brake is being applied, a self-excited field winding on said generator, means for causing while the brake is being applied said motor field to be as strong as during said operation of the car and the effectiveness of said self-excited field winding and said series field winding to remain the same as during slow speed operation of the car prior to the application of the brake, and means operable after the car is brought to a stop to cause a reduction of said motor field strength to said weak value, the effectiveness of said series field winding to be reduced and the disconnection of said self-excited field winding from across the generator armature.

150. In an elevator control system in which a direct current motor is employed for raising and lowering the car, said motor having a field winding connected to a source of direct current, in which the current supplied to said motor field winding from said source while the car is standing at a floor is of a value to provide a weak motor field and is increased to bring said field up to full strength for operation of the car, in which an electromechanical brake is provided for said motor, the release coil of which is connected to said source to release the brake in starting and disconnected from said source to apply the brake as the car arrives at a predetermined distance from the floor at which a stop is to be made to bring the car to a stop, in which current is supplied to said motor by a direct current generator having a field winding which is connected to said source for operating the car and is disconnected from said source for when the brake release coil is deenergized to bring the car to a stop, said generator also having a series field winding, and in which no field winding is connected across the generator armature to oppose the generator voltage while the brake is being applied, a self-excited field winding on said generator, means for causing while the brake is being applied the current supplied to said motor field winding to be the same as during said operation of the car to maintain full field strength on said motor and the effectiveness of said self-excited field winding and said series field winding to remain the same as during slow speed operation of the car prior to the application of the brake, and means operable after the car is brought to a stop to cause the current supplied to said motor field winding to be reduced to said value to provide said weak motor field and the effectiveness of said self-excited field winding and said series field winding to be reduced.

151. In an elevator control system in which a direct current motor is employed for raising and lowering the car, said motor having a field winding connected to a source of direct current, in which resistance is in circuit with said motor field winding while the car is standing at a floor to provide a weak motor field and said resistance is short-circuited to bring said field up to full strength for operation of the car, in which an electromechanical brake is provided for said motor, the release coil of which is connected to said source to release the brake in starting and disconnected from said source to apply the brake as the car arrives at a predetermined distance from the floor at which a stop is to be made to bring the car to a stop, in which current is supplied to said motor by a direct current generator having a field winding which is connected to said source for operating the car and is disconnected from said source when the brake release coil is deenergized to bring the car to a stop, said generator also having a series field winding with resistance connected in parallel therewith, and in which no field winding is connected across the generator armature to oppose the generator voltage while the brake is being applied, a self-excited field winding on said generator for providing a portion of the generator excitation, the number of turns of which and the resistance of the circuit of which are such that the slope of its resistance line is greater than that of the magnetization curve of the generator field, means for causing while the brake is being applied the current supplied to said motor field winding to be the same as during said operation of the car to maintain full field strength on said motor, the resistance of the circuit of the self-excited field winding to remain the same to maintain the effectiveness of said self-excited field winding the same as during said slow speed operation and the resistance in shunt to said series field winding to remain the same to maintain the effectiveness of said series field winding the same as during said slow speed operation, and means operable after the car is brought to a stop to reinsert said resistance in circuit with said motor field winding, to disconnect said self-excited field winding from across the generator armature and for decreasing said resistance in shunt to said series field winding.

152. In an elevator control system in which a motor is employed to raise and lower the car, in which a source of current is provided for said motor, in which means is provided for causing application of power from said source to said motor to start the car, and in which an electromechanical brake is provided for said motor, said brake having a release coil which is energized to release the brake in response to the operation of said starting means to cause the application of power to said motor to start the car and deenergized to apply the brake, means controlled by said starting means for causing partial energization of said brake release coil prior to the full energization thereof and the application of power to said motor to start the car, and means for automatically deenergizing the brake release coil should the load in the car be such as to pull through the brake while its release coil is partially energized.

153. An elevator control system in which a motor is employed to raise and lower the car, in which a source of current is provided for said motor, in which start control means is provided for causing application of power from said source to said motor to start the car, in which closure means are provided for controlling access to said car, in which means responsive to said start control means is provided for causing closure of said closure means prior to the starting of said car, and in which an electromechanical brake is provided for said motor, said brake having a release coil which is energized to release the brake upon the application of power to said motor to start the car and deenergized to apply the brake, characterized in that means is provided which is responsive to the operation of said start control means to effect closure of said closure means to cause partial energization of said brake release coil in order that the brake may be quickly released upon the full energization of its release coil.

154. In an elevator control system in which a direct current motor is employed for raising and lowering the car, in which current is supplied to said motor by a direct current generator having a field winding adapted for connection to a source of direct current and in which start control means is provided for causing the connection of said winding to said source to start the car, means for causing a high voltage to be initially applied from said source to said winding in response to the operation of said start control means to start the car, and means controlled by car movement for causing a reduction in said voltage upon the starting of the car.

155. In an elevator control system in which a direct current motor is employed for raising and lowering the car, in which current is supplied to said motor by a direct current generator having a field winding adapted for connection to a source of direct current and in which start control means is provided for causing the connection of said winding to said source in circuit with resistance to start the car, means for causing a portion of said resistance to be short-circuited upon the connection of said winding to said source in response to the operation of said start control means to start the car, and means responsive to car movement for causing the short circuit for said resistance portion to be removed as soon as the car starts.

156. An elevator control system in which a direct current motor is employed for raising and lowering the car, in which mechanism actuated from the car in accordance with car movement is provided for controlling the operation of the car, said mechanism having a rotatable driving member which is driven from the car by a flexible member and which is provided with a direct current torque motor for maintaining said flexible member taut, characterized in that the armature of said torque motor is connected as one arm of a Wheatstone bridge and that an electromagnetic switch for controlling the operation of the car has its coil connected across the equal potential points of the bridge, thereby rendering said coil subject to the counter electromotive force of the torque motor and thus the speed of the car.

157. An elevator control system in which a direct current motor is employed for raising and lowering the car, in which mechanism actuated from the car in accordance with car movement is provided for controlling the operation of the car, said mechanism having a rotatable driving member which is driven from the car by a flexible member and which is provided with a direct current torque motor for maintaining said flexible member taut, characterized in that an electromagnetic switch provided in said system is connected in circuit with said torque motor so that its net excitation is proportional to the counter electromotive force of the torque motor to provide a measurement of the speed of the car.

158. An elevator control system in which a direct current hoisting motor is employed for raising and lowering the car, in which mechanism actuated from the car in accordance with car movement is provided for controlling the operation of the car, said mechanism having a rotatable driving member which is driven from the car by a flexible member and which is provided with a direct current torque motor for maintaining said flexible member taut, characterized in that the armature of said torque motor is connected as one arm of a Wheatstone bridge, that said bridge is connected in series with the armature of said hoisting motor across a source of direct current so as to cause said torque motor to exert constant torque, and that an electromagnetic switch has its coil connected across the equal potential points of the bridge, thereby rendering said coil subject to the counter electromotive force of the torque motor.

159. In an elevator control system in which a direct current hoisting motor is employed for raising and lowering the car, in which mechanism actuated from the car in accordance with car movement is provided for controlling the operation of the car, said mechanism having a rotatable driving member which is driven from the car by a flexible member and which is provided with a direct current torque motor for maintaining said flexible member taut, means for connecting the armature of said torque motor in series with resistance to form two arms of a Wheatstone bridge, a potentiometer resistance forming the other two arms of the bridge, means for connecting said bridge in series with the armature of said hoisting motor across a source of direct current so as to cause said torque motor to exert constant torque, and an electromagnetic switch having its coil connected on one side to the junction point of said torque motor armature and said first named resistance and on the other side to a point on said potentiometer resistance such that it is subject to zero voltage when said hoisting motor is at rest, thereby rendering said coil subject to the counter electromotive force of the torque motor and thus to the speed of the car while the car is in operation.

160. In an elevator control system in which a direct current motor is employed for raising and lowering the car, in which current is supplied to said motor by two direct current generators having their armatures connected in series relation and in which start control means is provided for causing the starting of the car, a separate driving motor for each of said generators, and means for causing the starting of said driving motors prior to the starting of the car, said last named means including means for causing said driving motors to be started in sequence.

161. In an elevator control system in which a direct current motor is employed for raising and lowering the car, in which current is supplied to said motor by two direct current generators having their armatures connected in series relation and in which means is provided for causing the starting of the car and the stopping thereof at any one of a plurality of floors, a separate driving motor for each of said generators, means for causing the starting of said driving motors prior to the starting of the car, said last named means including means for causing said driving motors to be started in sequence, and means for causing the stopping of said driving motors upon the expiration of a predetermined time interval after the car is brought to a stop at any of said floors.

162. In an elevator control system in which a direct current motor is employed for raising and lowering the car, in which current is supplied to said motor by two direct current generators having their armatures connected in series relation, in which start control means is provided for causing the starting of the car, in which polyphase alternating current driving means is provided for said motors, and in which a source of polyphase alternating current is provided for said driving means, said driving means comprising a separate polyphase alternating current induction driving motor for each of said generators, means responsive to said start control means for causing the starting of said driving motors prior to the starting of the car, said last named means including means for connecting the stator windings of one of said driving motors in star relation to said source, then changing said connections from star to mesh relation and connecting the stator windings of the other driving motor in star relation to said source.

163. In an elevator control system in which a direct current motor is employed for raising and lowering the car, in which current is supplied to said motor by two direct current generators having their armatures connected in series relation, in which means is provided for causing the starting of the car and for causing the stopping of the car at any one of a plurality of floors, in which three-phase alternating current driving means is provided for said motors, and in which a source of three-phase alternating current is provided for said driving means, said driving means comprising a separate three-phase alternating current induction driving motor for each of said generators, means for causing the starting of said driving motors prior to the starting of the car, said last named means including means for connecting the stator windings of one of said driving motors in star relation to said source, then changing said connections from star to delta relation and connecting the stator windings of the other driving motor in star relation to said source, means for changing the connections of said other driving motor from star to delta relation after the starting of the car, and means responsive to the stopping of the car at any floor for stopping said driving motors.

164. In an elevator control system in which a direct current motor is employed for raising and lowering the car, in which current is supplied to said motor by a direct current generator, in which closure means is provided for controlling access to the car, in which start control means is provided for causing closure of said closure means and then the starting of the car, in which means is provided for stopping the car at any one of a plurality of floors and in which driving means is provided for said generator, means responsive to the operation of said start control means to cause the starting of said driving means during the closure of said closure means, and means for causing the stopping of said driving means upon the stopping of the car at any of said floors.

165. In an elevator control system in which a direct current motor is employed for raising and lowering the car, in which current is supplied to said motor by two direct current generators having their armatures connected in series relation, in which closure means is provided for controlling access to the car, in which start control means is provided for causing closure of said closure means and then the starting of the car, in which means is provided for stopping the car at any one of a plurality of floors and in which driving means is provided for said generators, said driving means comprising a separate driving motor for each of said generators, means responsive to the operation of said start control means to cause the starting of said driving motors in sequence during the closure of said closure means, and means for causing the stopping of said driving motors upon the stopping of the car at any of said floors.

166. In an elevator control system in which a direct current motor is employed for raising and lowering the car, in which current is supplied to said motor by two direct current generators having their armatures connected in series relation, in which start control means is provided for causing the starting of the car, in which closure means is provided for controlling access to the car, in which means responsive to said start control means is provided for causing closure of said closure means prior to the starting of the car, and in which polyphase alternating current driving means is provided for said generators, said driving means comprising a separate polyphase alternating current induction driving motor for each of said generators, and means responsive to the operation of said start control means to effect closure of said closure means to cause the starting of said driving motors in sequence.

167. In an elevator control system in which a direct current motor is employed for raising and lowering the car, in which current is supplied to said motor by two direct current generators having their armatures connected in series relation, in which start control means is provided for causing the starting of the car, in which closure means is provided for controlling access to the car, in which means responsive to said start control means is provided for causing closure of said closure means prior to the starting of the car, in which three-phase alternating current driving means is provided for said generators and in which a source of three-phase alternating current is provided for said driving means, said driving means comprising a separate three-phase alternating current induction driving motor for each of said generators, means responsive to the operation of said start control means to effect closure of said closure means to connect the stator windings of one of said driving motors in star relation to said source, then change said connections from star to mesh relation and connect the stator windings of the other driving motor in star relation to said source.

168. An elevator control system in which a direct current motor is employed for raising and lowering the car, in which a source of direct current is provided for the field winding of said motor, in which closure means is provided for controlling access to the car, in which start control means is provided for causing the closure of said closure means and then the starting of the car, and in which means is provided for causing voltage of a low value to be applied from said source to said field winding while the car is standing at a floor and the value of said voltage to be increased during operation of the car, characterized in that means responsive to the operation of said start control means is provided to cause the operation of said means to increase the voltage applied to said field winding from said source prior to the starting of the car.

169. An elevator control system in which a direct current motor is employed for raising and lowering the car, in which a source of direct current is provided for the field winding of said motor, in which closure means is provided for controlling access to the car, in which start control means is provided for causing the closure of said closure means and then the starting of the car, and in which resistance is provided which is in series with said motor field winding while the car is standing at a floor and short-circuited during operation of the car, characterized in that means is provided which is responsive to the operation of said start control means to short-circuit said resistance during closure of said closure means to effect the strengthening of said motor field prior to the starting of the car.

170. In an elevator control system in which a direct current motor is employed for raising and lowering the car, in which a source of direct current is provided for the field winding of said motor, in which current is supplied to the armature of said motor by a direct current generator, in which closure means is provided for controlling access to the car, in which start control means is provided for causing the closure of said closure means and then the starting of the car, and in which means is provided for causing voltage of a low value to be applied from said source to said field winding while the car is standing at a floor and the value of said voltage to be increased for operation of the car, means responsive to the operation of said start control means to effect closure of said closure means to cause the operation of said means to increase the voltage applied to said field winding from said source and thus effect the strengthening of said motor field prior to the starting of the car.

171. An elevator control system in which a motor is employed to raise and lower the car, in which an electromagnetic brake is provided for said motor which is released in starting the car and applied in bringing the car to a stop, in which closure means is provided for controlling access to the car, in which means is provided for operating said closure means and in which start control means is provided for causing operation of said closure operating means to effect the closure of said closure means and then the starting of the car, characterized in that means responsive to the operation of said start control means is provided to cause the partial energization of the release coil of said brake upon operation of said closure operating means to close said closure means and the full energization of said coil to effect the release of said brake and the energization of said motor to start the car upon said closure means reaching closed position.

JACOB DANIEL LEWIS.
WILLIAM HENRY BRUNS.